(12) United States Patent
Raleigh et al.

(10) Patent No.: US 8,924,543 B2
(45) Date of Patent: Dec. 30, 2014

(54) SERVICE DESIGN CENTER FOR DEVICE ASSISTED SERVICES

(75) Inventors: Gregory G. Raleigh, Woodside, CA (US); James Lavine, Corte Madera, CA (US); Alireza Raissinia, Monte Sereno, CA (US); Jeffrey Green, Sunnyvale, CA (US); Justin James, Poway, CA (US)

(73) Assignee: Headwater Partners I LLC, Redwood City, CA (US)

( * ) Notice: Subject to any disclaimer, the term of this patent is extended or adjusted under 35 U.S.C. 154(b) by 0 days.

(21) Appl. No.: 13/248,025

(22) Filed: Sep. 28, 2011

(65) Prior Publication Data

US 2012/0089727 A1    Apr. 12, 2012

Related U.S. Application Data

(63) Continuation-in-part of application No. 12/380,759, filed on Mar. 2, 2009, now Pat. No. 8,270,310, and a continuation-in-part of application No. 12/380,779, filed on Mar. 2, 2009, and a continuation-in-part of application No. 12/380,758, filed on Mar. 2, 2009, and a continuation-in-part of application No. 12/380,778, (Continued)

(51) Int. Cl.
G06F 15/173 (2006.01)

(52) U.S. Cl.
USPC ........................................ 709/224; 455/414.1

(58) Field of Classification Search
USPC .......... 709/203, 217, 220, 223, 224; 455/405, 455/406, 414.1, 456.3
See application file for complete search history.

(56) References Cited

U.S. PATENT DOCUMENTS 5,283,904 A    2/1994  Carson et al.
5,577,100 A   11/1996  McGregor et al.

(Continued)

FOREIGN PATENT DOCUMENTS

CN    1310401 A    8/2001
CN    1538730 A   10/2004

(Continued)

OTHER PUBLICATIONS

3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.

(Continued)

*Primary Examiner* — Andrew Joseph Rudy
(74) *Attorney, Agent, or Firm* — James E. Harris; Krista S. Jacobsen

(57) ABSTRACT

A technique involves modular storage of network service plan components and provisioning of same. A subset of the capabilities of a service design system can be granted to a sandbox system to enable customization of service plan offerings or other controls.

121 Claims, 38 Drawing Sheets

Related U.S. Application Data filed on Mar. 2, 2009, now Pat. No. 8,321,526, and a continuation-in-part of application No. 12/380,768, filed on Mar. 2, 2009, and a continuation-in-part of application No. 12/380,767, filed on Mar. 2, 2009, now Pat. No. 8,355,337, and a continuation-in-part of application No. 12/380,780, filed on Mar. 2, 2009, and a continuation-in-part of application No. 12/380,755, filed on Mar. 2, 2009, now Pat. No. 8,331,901, and a continuation-in-part of application No. 12/380,756, filed on Mar. 2, 2009, now Pat. No. 8,250,207, and a continuation-in-part of application No. 12/380,770, filed on Mar. 2, 2009, and a continuation-in-part of application No. 12/380,772, filed on Mar. 2, 2009, and a continuation-in-part of application No. 12/380,782, filed on Mar. 2, 2009, now Pat. No. 8,270,952, and a continuation-in-part of application No. 12/380,783, filed on Mar. 2, 2009, and a continuation-in-part of application No. 12/380,757, filed on Mar. 2, 2009, now Pat. No. 8,326,958, and a continuation-in-part of application No. 12/380,781, filed on Mar. 2, 2009, now Pat. No. 8,229,812, and a continuation-in-part of application No. 12/380,774, filed on Mar. 2, 2009, and a continuation-in-part of application No. 12/380,773, filed on Mar. 2, 2009, and a continuation-in-part of application No. 12/380,769, filed on Mar. 2, 2009, and a continuation-in-part of application No. 12/380,777, filed on Mar. 2, 2009, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, and a continuation-in-part of application No. 13/134,005, filed on May 25, 2011, and a continuation-in-part of application No. 13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/248,028, filed on Sep. 28, 2011, and a continuation-in-part of application No. 13/247,998, filed on Sep. 28, 2011, and a continuation-in-part of application No. 13/134,005, filed on May 25, 2011, said application No. 12/695,019 is a continuation-in-part of application No. 12/380,778, and a continuation-in-part of application No. 12/380,771, said application No. 12/695,020 is a continuation-in-part of application No. 12/380,780, said application No. 12/694,445 is a continuation-in-part of application No. 12/380,780, said application No. 12/694,451 is a continuation-in-part of application No. 12/380,780, said application No. 12/694,455 is a continuation-in-part of application No. 12/380,780, said application No. 12/695,021 is a continuation-in-part of application No. 12/380,780, said application No. 12/695,980 is a continuation-in-part of application No. 12/380,780, and a continuation-in-part of application No. 12/695,019, and a continuation-in-part of application No. 12/695,021, said application No. 13/134,028 is a continuation-in-part of application No. 12/380,759, and a continuation-in-part of application No. 13/380,779, and a continuation-in-part of application No. 12/380,758, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,758, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,771, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, and a continuation-in-part of application No. 13/134,005, said application No. 13/134,005 is a continuation-in-part of application No. 12/380,759, and a continuation-in-part of application No. 12/380,779, and a continuation-in-part of application No. 12/380,758, and a continuation-in-part of application No. 12/380,778, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,771, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, said application No. 13/229,580 is a continuation-in-part of application No. 12/380,759, and a continuation-in-part of application No. 12/380,779, and a continuation-in-part of application No. 12/380,758, and a continuation-in-part of application No. 12/380,778, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,771, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, and a continuation-in-part of application No. 13/134,005, and a continuation-in-part of application No. 13/134,028, said application No. 13/237,827 is a continuation-in-part of application No. 12/380,759, and a continuation-in-part of application No. 12/380,779, and a continuation-in-part of application No. 12/380,758, and a continuation-in-part of application No. 12/380,778, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, and a continuation-in-part of application No. 13/134,005, and a continuation-in-part of application No. 13/134,028, and a continuation-in-part of application No. 13/229,580, said application No. 13/239,321 is a continuation-in-part of application No. 12/380,759, and a continuation-in-part of application No. 12/380,779, and a continuation-in-part of application No. 12/380,758, and a continuation-in-part of application No. 12/380,778, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, and a continuation-in-part of application No. 13/134,002, and a continuation-in-part of application No. 13/134,028, and a continuation-in-part of application No. 13/229,580, and a continuation-in-part of application No. 13/237,827, said application No. 13/248,028 is a continuation-in-part of application No. 12/380,759, and a continuation-in-part of application No. 12/380,779, and a continuation-in-part of application No. 12/380,758, and a continuation-in-part of application No. 12/380,778, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, and a continuation-in-part of application No. 13/134,005, and a continuation-in-part of application No. 13/134,028, and a continuation-in-part of application No. 13/229,580, and a continuation-in-part of application No. 13/237,827, and a continuation-in-part of application No. 13/239,321, and a continuation-in-part of application No. 13/247,998, and a continuation-in-part of application No. 13/248,025, said application No. 13/247,998 is a continuation-in-part of application No. 12/380,759, and a continuation-in-part of application No. 12/382,779, and a continuation-in-part of application No. 12/380,758, and a continuation-in-part of application No. 12/380,778, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, and a continuation-in-part of application No. 13/134,005, and a continuation-in-part of application No. 13/134,028, and a continuation-in-part of application No. 13/229,580, and a continuation-in-part of application No. 13/237,827, and a continuation-in-part of application No. 13/239,321, and a continuation-in-part of application No. 13/248,028, and a continuation-in-part of application No. 13/248,025.

(60) Provisional application No. 61/387,243, provisional application No. 61/387,247, provisional application No. 61/389,547, provisional application No. 61/407,358, provisional application No. 61/418,507, provisional application No. 61/418,509, provisional application No. 61/420,727, provisional application No. 61/422,565, provisional application No. 61/422,572, provisional application No. 61/422,574, provisional application No. 61/435,564, provisional application No. 61/472,606, provisional application No. 61/206,354, provisional application No. 61/206,944, provisional application No. 61/207,393, provisional application No. 61/207,739, provisional application No. 61/270,353, provisional application No. 61/264,126, provisional application No. 61/275,208, provisional application No. 61/237,753, provisional application No. 61/252,151, provisional application No. 61/381,159, provisional application No. 61/381,162, provisional application No. 61/384,456, provisional application No. 61/385,020, provisional application No. 61/348,022.

(56) References Cited

U.S. PATENT DOCUMENTS

| | | |
|---|---|---|
| 5,594,777 A | 1/1997 | Makkonen et al. |
| 5,630,159 A | 5/1997 | Zancho |
| 5,633,484 A | 5/1997 | Zhancho et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,983,270 A | 11/1999 | Abraham et al. |
| 6,035,281 A | 3/2000 | Crosskey et al. |
| 6,038,452 A | 3/2000 | Strawczynski et al. |
| 6,047,268 A | 4/2000 | Bartoli et al. |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,141,686 A | 10/2000 | Jackowski et al. |
| 6,148,336 A | 11/2000 | Thomas et al. |
| 6,154,738 A * | 11/2000 | Call .............................. 705/20 |
| 6,185,576 B1 | 2/2001 | Mcintosh |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,418,147 B1 | 7/2002 | Wiedeman |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,542,992 B1 | 4/2003 | Peirce et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,581,092 B1 | 6/2003 | Motoyama et al. |
| 6,598,034 B1 | 7/2003 | Kloth |

(56) References Cited

U.S. PATENT DOCUMENTS

| | | |
|---|---|---|
| 6,603,969 B1 | 8/2003 | Vuoristo et al. |
| 6,606,744 B1 | 8/2003 | Mikurak |
| 6,631,122 B1 | 10/2003 | Arunachalam et al. |
| 6,639,975 B1 | 10/2003 | O'Neal et al. |
| 6,640,097 B2 | 10/2003 | Corrigan et al. |
| 6,650,887 B2 | 11/2003 | McGregor et al. |
| 6,651,101 B1 | 11/2003 | Gai et al. |
| 6,654,814 B1 | 11/2003 | Britton et al. |
| 6,658,254 B1 | 12/2003 | Purdy et al. |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,725,031 B2 | 4/2004 | Watler et al. |
| 6,748,195 B1 | 6/2004 | Phillips |
| 6,754,470 B2 | 6/2004 | Hendrickson et al. |
| 6,763,000 B1 | 7/2004 | Walsh |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Herrmann et al. |
| 6,876,653 B2 | 4/2005 | Ambe et al. |
| 6,885,997 B1 | 4/2005 | Roberts |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,947,723 B1 | 9/2005 | Gurnani et al. |
| 6,952,428 B1 | 10/2005 | Necka et al. |
| 6,957,067 B1 | 10/2005 | Iyer et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,013,469 B2 | 3/2006 | Smith et al. |
| 7,024,200 B2 | 4/2006 | McKenna et al. |
| 7,027,408 B2 | 4/2006 | Nabkel et al. |
| 7,032,072 B1 | 4/2006 | Quinn et al. |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,226 B2 | 5/2006 | Yamauchi |
| 7,043,268 B2 | 5/2006 | Yukie et al. |
| 7,058,968 B2 | 6/2006 | Rowland et al. |
| 7,068,600 B2 | 6/2006 | Cain |
| 7,069,248 B2 | 6/2006 | Huber |
| 7,092,696 B1 | 8/2006 | Hosain et al. |
| 7,102,620 B2 | 9/2006 | Harries et al. |
| 7,113,780 B2 | 9/2006 | Mckenna et al. |
| 7,113,997 B2 | 9/2006 | Jayapalan et al. |
| 7,139,569 B2 | 11/2006 | Kato |
| 7,142,876 B2 | 11/2006 | Trossen et al. |
| 7,158,792 B1 | 1/2007 | Cook et al. |
| 7,167,078 B2 | 1/2007 | Pourchot |
| 7,174,174 B2 | 2/2007 | Boris et al. |
| 7,180,855 B1 | 2/2007 | Lin |
| 7,181,017 B1 | 2/2007 | Nagel et al. |
| 7,197,321 B2 | 3/2007 | Erskine et al. |
| 7,203,169 B1 | 4/2007 | Okholm et al. |
| 7,212,491 B2 | 5/2007 | Koga |
| 7,228,354 B2 | 6/2007 | Chambliss et al. |
| 7,236,780 B2 | 6/2007 | Benco et al. |
| 7,242,920 B2 | 7/2007 | Morris |
| 7,245,901 B2 | 7/2007 | McGregor et al. |
| 7,251,218 B2 | 7/2007 | Jorgensen |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,317,699 B2 | 1/2008 | Godfrey et al. |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,373,136 B2 | 5/2008 | Watler et al. |
| 7,373,179 B2 | 5/2008 | Stine et al. |
| 7,388,950 B2 | 6/2008 | Elsey et al. |
| 7,401,338 B1 | 7/2008 | Bowen et al. |
| 7,403,763 B2 | 7/2008 | Maes |
| 7,418,253 B2 | 8/2008 | Kavanagh |
| 7,418,257 B2 | 8/2008 | Kim |
| 7,421,004 B2 | 9/2008 | Feher |
| 7,444,669 B1 | 10/2008 | Bahl et al. |
| 7,450,591 B2 | 11/2008 | Korling et al. |
| 7,450,927 B1 | 11/2008 | Creswell et al. |
| 7,457,265 B2 | 11/2008 | Julka et al. |
| 7,460,837 B2 | 12/2008 | Diener |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,515,608 B2 | 4/2009 | Yuan et al. |
| 7,516,219 B2 | 4/2009 | Moghaddam et al. |
| 7,529,204 B2 | 5/2009 | Bourlas et al. |
| 7,535,880 B1 | 5/2009 | Hinman et al. |
| 7,539,132 B2 | 5/2009 | Werner et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,555,757 B2 | 6/2009 | Smith et al. |
| 7,565,141 B2 | 7/2009 | Macaluso |
| 7,574,509 B2 | 8/2009 | Nixon et al. |
| 7,574,731 B2 | 8/2009 | Fascenda |
| 7,580,356 B1 | 8/2009 | Mishra et al. |
| 7,580,857 B2 | 8/2009 | VanFleet et al. |
| 7,583,964 B2 | 9/2009 | Wong |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,610,396 B2 | 10/2009 | Taglienti et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,633,438 B2 | 12/2009 | Tysowski |
| 7,634,388 B2 | 12/2009 | Archer et al. |
| 7,636,574 B2 | 12/2009 | Poosala |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |

(56) References Cited

U.S. PATENT DOCUMENTS

| | | |
|---|---|---|
| 7,653,394 B2 | 1/2010 | McMillin |
| 7,668,176 B2 | 2/2010 | Chuah |
| 7,668,903 B2 | 2/2010 | Edwards et al. |
| 7,685,131 B2 | 3/2010 | Batra et al. |
| 7,685,254 B2 | 3/2010 | Pandya |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,720,464 B2 | 5/2010 | Batta |
| 7,720,505 B2 | 5/2010 | Gopi et al. |
| 7,720,960 B2 | 5/2010 | Pruss et al. |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,711 B1 | 7/2010 | Kung et al. |
| 7,760,861 B1 | 7/2010 | Croak et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,538 B2 | 9/2010 | Kozisek |
| 7,792,708 B2 | 9/2010 | Alva |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,985 B1 | 9/2010 | Pitkow et al. |
| 7,802,724 B1 | 9/2010 | Nohr |
| 7,805,140 B2* | 9/2010 | Friday et al. ............... 455/436 |
| 7,805,606 B2 | 9/2010 | Birger et al. |
| 7,822,837 B1 | 10/2010 | Urban et al. |
| 7,826,427 B2 | 11/2010 | Sood et al. |
| 7,826,607 B1 | 11/2010 | De Carvalho Resende et al. |
| 7,844,728 B2 | 11/2010 | Anderson et al. |
| 7,848,768 B2 | 12/2010 | Omori et al. |
| 7,853,255 B2 | 12/2010 | Karaoguz et al. |
| 7,856,226 B2 | 12/2010 | Wong et al. |
| 7,865,182 B2 | 1/2011 | Macaluso |
| 7,868,778 B2 | 1/2011 | Kenwright |
| 7,873,344 B2 | 1/2011 | Bowser et al. |
| 7,873,705 B2 | 1/2011 | Kalish |
| 7,877,090 B2* | 1/2011 | Maes ....................... 455/432.1 |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,890,084 B1 | 2/2011 | Dudziak et al. |
| 7,890,111 B2 | 2/2011 | Bugenhagen |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,937,069 B2 | 5/2011 | Rassam |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,969,950 B2 | 6/2011 | Iyer et al. |
| 7,970,350 B2 | 6/2011 | Sheynman et al. |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,510 B2 | 7/2011 | Kocher et al. |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,988 B2 | 8/2011 | Maes |
| 8,010,080 B1 | 8/2011 | Thenthiruperai et al. |
| 8,010,081 B1 | 8/2011 | Roskowski |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,409 B1 | 10/2011 | Mikurak |
| 8,032,899 B2 | 10/2011 | Archer et al. |
| 8,036,600 B2 | 10/2011 | Garrett et al. |
| 8,045,973 B2 | 10/2011 | Chambers |
| 8,046,449 B2 | 10/2011 | Yoshiuchi |
| 8,050,275 B1 | 11/2011 | Iyer |
| 8,059,530 B1 | 11/2011 | Cole |
| 8,060,463 B1 | 11/2011 | Spiegel |
| 8,064,896 B2 | 11/2011 | Bell et al. |
| 8,068,824 B2 | 11/2011 | Shan et al. |
| 8,068,829 B2 | 11/2011 | Lemond et al. |
| 8,073,721 B1 | 12/2011 | Lewis |
| 8,078,140 B2 | 12/2011 | Baker et al. |
| 8,078,163 B2 | 12/2011 | Lemond et al. |
| 8,086,497 B1 | 12/2011 | Oakes, III |
| 8,090,359 B2 | 1/2012 | Proctor, Jr. et al. |
| 8,090,616 B2 | 1/2012 | Proctor, Jr. et al. |
| 8,094,551 B2 | 1/2012 | Huber et al. |
| 8,095,112 B2 | 1/2012 | Chow et al. |
| 8,095,124 B2 | 1/2012 | Balia |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,108,520 B2 | 1/2012 | Ruutu et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |

(56) References Cited

U.S. PATENT DOCUMENTS

| | | | |
|---|---|---|---|
| 8,131,256 B2 | 3/2012 | Martti et al. |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,144,591 B2 | 3/2012 | Ghai et al. |
| 8,149,823 B2 | 4/2012 | Turcan et al. |
| 8,150,431 B2 | 4/2012 | Wolovitz et al. |
| 8,155,155 B1 | 4/2012 | Chow et al. |
| 8,155,620 B2 | 4/2012 | Wang et al. |
| 8,155,670 B2 | 4/2012 | Fullam et al. |
| 8,156,206 B2 | 4/2012 | Kiley et al. |
| 8,160,015 B2 | 4/2012 | Rashid et al. |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,970 B2 | 5/2012 | Adamczyk et al. |
| 8,175,574 B1 | 5/2012 | Panda et al. |
| 8,180,881 B2 | 5/2012 | Seo et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,675 B2 | 5/2012 | Tribbett |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,195,093 B2 | 6/2012 | Garrett et al. |
| 8,195,163 B2 | 6/2012 | Gisby et al. |
| 8,196,199 B2 | 6/2012 | Hrastar et al. |
| 8,200,509 B2 | 6/2012 | Kenedy et al. |
| 8,200,775 B2 | 6/2012 | Moore |
| 8,204,190 B2 | 6/2012 | Bang et al. |
| 8,204,505 B2 | 6/2012 | Jin et al. |
| 8,204,794 B1 | 6/2012 | Peng et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,230,061 B2 | 7/2012 | Hassan et al. |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah et al. |
| 8,242,959 B2 | 8/2012 | Mia et al. |
| 8,244,241 B2 | 8/2012 | Montemurro |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,264,965 B2 | 9/2012 | Dolganow et al. |
| 8,265,004 B2 | 9/2012 | Toutonghi |
| 8,266,681 B2 | 9/2012 | Deshpande et al. |
| 8,270,972 B2 | 9/2012 | Otting et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,291,238 B2 | 10/2012 | Ginter et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 * | 11/2012 | Gailloux et al. ............... 455/418 |
| 8,307,067 B2 | 11/2012 | Ryan |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,326,319 B2 | 12/2012 | Davis |
| 8,326,359 B2 | 12/2012 | Kauffman |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,340,718 B2 | 12/2012 | Colonna et al. |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,356,336 B2 | 1/2013 | Johnston et al. |
| 8,358,638 B2 | 1/2013 | Scherzer et al. |
| 8,363,658 B1 | 1/2013 | Delker et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,385,896 B2 | 2/2013 | Proctor, Jr. et al. |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,396,929 B2 | 3/2013 | Helfman et al. |
| 8,402,540 B2 | 3/2013 | Kapoor et al. |
| 8,406,427 B2 | 3/2013 | Chand et al. |
| 8,411,587 B2 | 4/2013 | Curtis et al. |
| 8,411,691 B2 | 4/2013 | Aggarwal |
| 8,422,988 B1 * | 4/2013 | Keshav ........................ 455/405 |
| 8,423,016 B2 * | 4/2013 | Buckley et al. ............. 455/432.1 |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,452,858 B2 | 5/2013 | Wu et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,489,720 B1 | 7/2013 | Morford et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,504,729 B2 | 8/2013 | Pezzutti |
| 8,509,082 B2 | 8/2013 | Heinz et al. |
| 8,516,552 B2 | 8/2013 | Raleigh |
| 8,520,589 B2 | 8/2013 | Bhatt et al. |
| 8,521,110 B2 | 8/2013 | Rofougaran |
| 8,522,039 B2 | 8/2013 | Hyndman et al. |

(56) References Cited

U.S. PATENT DOCUMENTS

| | | | |
|---|---|---|---|
| 8,526,329 B2 | 9/2013 | Mahany et al. | |
| 8,526,350 B2 | 9/2013 | Xue et al. | |
| 8,527,410 B2 | 9/2013 | Markki et al. | |
| 8,528,068 B1 | 9/2013 | Weglein et al. | |
| 8,539,561 B2 | 9/2013 | Gupta et al. | |
| 8,543,265 B2 | 9/2013 | Ekhaguere et al. | |
| 8,544,105 B2 | 9/2013 | Mclean et al. | |
| 8,548,427 B2 | 10/2013 | Chow et al. | |
| 8,548,428 B2 | 10/2013 | Raleigh | |
| 8,554,876 B2 | 10/2013 | Winsor | |
| 8,561,138 B2 | 10/2013 | Rothman et al. | |
| 8,566,236 B2 | 10/2013 | Busch | |
| 8,571,474 B2 | 10/2013 | Chavez et al. | |
| 8,571,993 B2 | 10/2013 | Kocher et al. | |
| 8,572,117 B2 | 10/2013 | Rappaport | |
| 8,583,499 B2 | 11/2013 | De Judicibus et al. | |
| 8,589,541 B2 | 11/2013 | Raleigh et al. | |
| 8,589,955 B2 | 11/2013 | Roundtree et al. | |
| 8,601,125 B2 | 12/2013 | Huang et al. | |
| 8,605,691 B2 * | 12/2013 | Soomro et al. | 370/338 |
| 8,626,115 B2 | 1/2014 | Raleigh et al. | |
| 8,635,164 B2 | 1/2014 | Rosenhaft et al. | |
| 8,655,357 B1 * | 2/2014 | Gazzard et al. | 455/435.1 |
| 8,660,853 B2 | 2/2014 | Robb et al. | |
| 8,666,395 B2 | 3/2014 | Silver | |
| 8,706,863 B2 | 4/2014 | Fadell | |
| 2001/0048738 A1 | 12/2001 | Baniak et al. | |
| 2001/0053694 A1 | 12/2001 | Igarashi et al. | |
| 2002/0022472 A1 | 2/2002 | Watler et al. | |
| 2002/0049074 A1 | 4/2002 | Eisinger et al. | |
| 2002/0116338 A1 | 8/2002 | Gonthier et al. | |
| 2002/0120540 A1 | 8/2002 | Kende et al. | |
| 2002/0131404 A1 | 9/2002 | Mehta et al. | |
| 2002/0138601 A1 | 9/2002 | Piponius et al. | |
| 2002/0161601 A1 | 10/2002 | Nauer et al. | |
| 2002/0164983 A1 | 11/2002 | Raviv et al. | |
| 2002/0176377 A1 | 11/2002 | Hamilton | |
| 2002/0188732 A1 | 12/2002 | Buckman et al. | |
| 2002/0199001 A1 | 12/2002 | Wenocur et al. | |
| 2003/0004937 A1 | 1/2003 | Salmenkaita et al. | |
| 2003/0005112 A1 | 1/2003 | Krautkremer | |
| 2003/0013434 A1 | 1/2003 | Rosenberg et al. | |
| 2003/0018524 A1 | 1/2003 | Fishman et al. | |
| 2003/0046396 A1 | 3/2003 | Richter | |
| 2003/0050070 A1 | 3/2003 | Mashinsky et al. | |
| 2003/0050837 A1 | 3/2003 | Kim | |
| 2003/0088671 A1 | 5/2003 | Klinker et al. | |
| 2003/0133408 A1 | 7/2003 | Cheng et al. | |
| 2003/0161265 A1 | 8/2003 | Cao et al. | |
| 2003/0171112 A1 | 9/2003 | Lupper et al. | |
| 2003/0182420 A1 | 9/2003 | Jones et al. | |
| 2003/0182435 A1 | 9/2003 | Redlich et al. | |
| 2003/0188006 A1 | 10/2003 | Bard | |
| 2003/0188117 A1 | 10/2003 | Yoshino et al. | |
| 2003/0220984 A1 | 11/2003 | Jones et al. | |
| 2003/0224781 A1 | 12/2003 | Milford et al. | |
| 2003/0229900 A1 | 12/2003 | Reisman | |
| 2003/0233332 A1 | 12/2003 | Keeler et al. | |
| 2003/0236745 A1 | 12/2003 | Hartsell et al. | |
| 2004/0019539 A1 | 1/2004 | Raman et al. | |
| 2004/0021697 A1 | 2/2004 | Beaton et al. | |
| 2004/0030705 A1 | 2/2004 | Bowman-Amuah et al. | |
| 2004/0044623 A1 | 3/2004 | Wake et al. | |
| 2004/0047358 A1 | 3/2004 | Chen et al. | |
| 2004/0073672 A1 | 4/2004 | Fascenda | |
| 2004/0082346 A1 | 4/2004 | Skytt et al. | |
| 2004/0098715 A1 | 5/2004 | Aghera et al. | |
| 2004/0102182 A1 | 5/2004 | Reith et al. | |
| 2004/0103193 A1 | 5/2004 | Pandya et al. | |
| 2004/0107360 A1 | 6/2004 | Herrmann et al. | |
| 2004/0127200 A1 | 7/2004 | Shaw et al. | |
| 2004/0132427 A1 | 7/2004 | Lee et al. | |
| 2004/0168052 A1 | 8/2004 | Clisham et al. | |
| 2004/0170191 A1 | 9/2004 | Guo et al. | |
| 2004/0198331 A1 | 10/2004 | Coward et al. | |
| 2004/0203755 A1 | 10/2004 | Brunet et al. | |
| 2004/0203833 A1 | 10/2004 | Rathunde et al. | |
| 2004/0225898 A1 | 11/2004 | Frost et al. | |
| 2004/0236547 A1 | 11/2004 | Rappaport et al. | |
| 2004/0249918 A1 | 12/2004 | Sunshine | |
| 2004/0255145 A1 | 12/2004 | Chow | |
| 2005/0007993 A1 | 1/2005 | Chambers et al. | |
| 2005/0009499 A1 | 1/2005 | Koster | |
| 2005/0021995 A1 | 1/2005 | Lal et al. | |
| 2005/0048950 A1 | 3/2005 | Morper | |
| 2005/0055291 A1 | 3/2005 | Bevente et al. | |
| 2005/0055309 A1 | 3/2005 | Williams et al. | |
| 2005/0055595 A1 | 3/2005 | Frazer et al. | |
| 2005/0060266 A1 | 3/2005 | DeMello et al. | |
| 2005/0075115 A1 | 4/2005 | Corneille et al. | |
| 2005/0079863 A1 | 4/2005 | Macaluso | |
| 2005/0097516 A1 | 5/2005 | Donnelly et al. | |
| 2005/0107091 A1 | 5/2005 | Vannithamby et al. | |
| 2005/0128967 A1 | 6/2005 | Scobbie | |
| 2005/0166043 A1 | 7/2005 | Zhang et al. | |
| 2005/0183143 A1 | 8/2005 | Anderholm et al. | |
| 2005/0186948 A1 | 8/2005 | Gallagher et al. | |
| 2005/0198377 A1 | 9/2005 | Ferguson et al. | |
| 2005/0216421 A1 | 9/2005 | Barry et al. | |
| 2005/0228985 A1 | 10/2005 | Ylikoski et al. | |
| 2005/0238046 A1 | 10/2005 | Hassan et al. | |
| 2005/0246282 A1 | 11/2005 | Naslund et al. | |
| 2005/0250508 A1 | 11/2005 | Guo et al. | |
| 2005/0254435 A1 | 11/2005 | Moakley et al. | |
| 2005/0266825 A1 | 12/2005 | Clayton | |
| 2005/0266880 A1 | 12/2005 | Gupta | |
| 2006/0014519 A1 | 1/2006 | Marsh et al. | |
| 2006/0019632 A1 | 1/2006 | Cunningham et al. | |
| 2006/0026679 A1 | 2/2006 | Zakas | |
| 2006/0034256 A1 | 2/2006 | Addagatla et al. | |
| 2006/0040642 A1 | 2/2006 | Boris et al. | |
| 2006/0045245 A1 | 3/2006 | Aaron et al. | |
| 2006/0048223 A1 | 3/2006 | Lee et al. | |
| 2006/0068796 A1 | 3/2006 | Millen et al. | |
| 2006/0072646 A1 | 4/2006 | Feher et al. | |
| 2006/0085543 A1 | 4/2006 | Hrastar et al. | |
| 2006/0112016 A1 | 5/2006 | Ishibashi | |
| 2006/0114832 A1 | 6/2006 | Hamilton et al. | |
| 2006/0135144 A1 | 6/2006 | Jothipragasam | |
| 2006/0143098 A1 | 6/2006 | Lazaridis | |
| 2006/0156398 A1 | 7/2006 | Ross et al. | |
| 2006/0160536 A1 | 7/2006 | Chou | |
| 2006/0165060 A1 | 7/2006 | Dua | |
| 2006/0168128 A1 | 7/2006 | Sistla et al. | |
| 2006/0173959 A1 | 8/2006 | Mckelvie et al. | |
| 2006/0174035 A1 | 8/2006 | Tufail | |
| 2006/0178918 A1 | 8/2006 | Mikurak | |
| 2006/0183462 A1 | 8/2006 | Kolehmainen et al. | |
| 2006/0190314 A1 | 8/2006 | Hernandez | |
| 2006/0199608 A1 | 9/2006 | Dunn et al. | |
| 2006/0206904 A1 | 9/2006 | Watkins et al. | |
| 2006/0218395 A1 | 9/2006 | Maes | |
| 2006/0233108 A1 | 10/2006 | Krishnan | |
| 2006/0233166 A1 | 10/2006 | Bou-Diab et al. | |
| 2006/0236095 A1 | 10/2006 | Smith et al. | |
| 2006/0242685 A1 | 10/2006 | Heard et al. | |
| 2006/0258341 A1 | 11/2006 | Miller et al. | |
| 2006/0291477 A1 | 12/2006 | Croak et al. | |
| 2007/0019670 A1 | 1/2007 | Falardeau | |
| 2007/0022289 A1 | 1/2007 | Alt et al. | |
| 2007/0025301 A1 | 2/2007 | Petersson et al. | |
| 2007/0033194 A1 | 2/2007 | Srinivas et al. | |
| 2007/0033197 A1 | 2/2007 | Scherzer et al. | |
| 2007/0036312 A1 | 2/2007 | Cai et al. | |
| 2007/0055694 A1 | 3/2007 | Ruge et al. | |
| 2007/0061243 A1 | 3/2007 | Ramer et al. | |
| 2007/0061878 A1 | 3/2007 | Hagiu et al. | |
| 2007/0076616 A1 | 4/2007 | Ngo et al. | |
| 2007/0093243 A1 | 4/2007 | Kapadekar et al. | |
| 2007/0100981 A1 | 5/2007 | Adamczyk et al. | |
| 2007/0101426 A1 | 5/2007 | Lee et al. | |
| 2007/0104126 A1 | 5/2007 | Calhoun et al. | |
| 2007/0109983 A1 | 5/2007 | Shankar et al. | |
| 2007/0130315 A1 | 6/2007 | Friend et al. | |

(56) References Cited

U.S. PATENT DOCUMENTS

| | | |
|---|---|---|
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0168499 A1 | 7/2007 | Chu |
| 2007/0198656 A1 | 8/2007 | Mazzaferri et al. |
| 2007/0220251 A1 | 9/2007 | Rosenberg et al. |
| 2007/0226225 A1 | 9/2007 | Yiu et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley et al. |
| 2007/0282896 A1 | 12/2007 | Wydroug et al. |
| 2007/0294395 A1 | 12/2007 | Strub et al. |
| 2007/0298764 A1 | 12/2007 | Clayton |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0022354 A1 | 1/2008 | Grewal et al. |
| 2008/0025230 A1 | 1/2008 | Patel et al. |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0070550 A1 | 3/2008 | Hose |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0095339 A1 | 4/2008 | Elliott et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | Deatley |
| 2008/0319879 A1 | 12/2008 | Carroll et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0013157 A1 | 1/2009 | Beaule |
| 2009/0044185 A1 | 2/2009 | Krivopaltsev |
| 2009/0046723 A1 | 2/2009 | Rahman et al. |
| 2009/0054030 A1 | 2/2009 | Golds |
| 2009/0067372 A1 | 3/2009 | Shah et al. |
| 2009/0068984 A1 | 3/2009 | Burnett |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0157792 A1 | 6/2009 | Fiatal |
| 2009/0172077 A1 | 7/2009 | Roxburgh et al. |
| 2009/0180391 A1 | 7/2009 | Petersen et al. |
| 2009/0197585 A1 | 8/2009 | Aaron |
| 2009/0219170 A1 | 9/2009 | Clark et al. |
| 2009/0248883 A1 | 10/2009 | Suryanarayana et al. |
| 2009/0257379 A1 | 10/2009 | Robinson et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0299857 A1 | 12/2009 | Brubaker |
| 2009/0307746 A1 | 12/2009 | Di et al. |
| 2009/0315735 A1 | 12/2009 | Bhavani et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0131584 A1 | 5/2010 | Johnson |
| 2010/0144310 A1 | 6/2010 | Bedingfield, Sr. et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |

(56) References Cited

U.S. PATENT DOCUMENTS

| | | |
|---|---|---|
| 2010/0195503 A1 | 8/2010 | Raleigh |
| 2010/0197268 A1 | 8/2010 | Raleigh et al. |
| 2010/0198698 A1 | 8/2010 | Raleigh et al. |
| 2010/0198939 A1 | 8/2010 | Raleigh et al. |
| 2010/0227632 A1 | 9/2010 | Bell et al. |
| 2010/0241544 A1 | 9/2010 | Benson et al. |
| 2010/0284327 A1 | 11/2010 | Miklos |
| 2010/0325420 A1 | 12/2010 | Kanekar |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0159818 A1 | 6/2011 | Scherzer et al. |
| 2011/0173678 A1 | 7/2011 | Kaippallimalil et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0264923 A1 | 10/2011 | Kocher et al. |
| 2012/0020296 A1 | 1/2012 | Scherzer et al. |
| 2012/0029718 A1 | 2/2012 | Davis |
| 2012/0155296 A1 | 6/2012 | Kashanian |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |

FOREIGN PATENT DOCUMENTS

| | | |
|---|---|---|
| CN | 101035308 A | 3/2006 |
| CN | 1802839 A | 7/2006 |
| CN | 1889777 A | 7/2006 |
| CN | 101155343 A | 9/2006 |
| CN | 1878160 A | 12/2006 |
| CN | 1937511 A | 3/2007 |
| CN | 101123553 A | 9/2007 |
| CN | 101115248 A | 1/2008 |
| CN | 101341764 A | 1/2009 |
| EP | 1463238 | 9/2004 |
| EP | 1739518 | 1/2007 |
| EP | 1772988 | 4/2007 |
| EP | 1978772 | 10/2008 |
| EP | 2466831 A1 | 6/2012 |
| WO | 9858505 | 12/1998 |
| WO | 9927723 A1 | 6/1999 |
| WO | 9965185 | 12/1999 |
| WO | 03014891 | 2/2003 |
| WO | 03058880 | 7/2003 |
| WO | 2004028070 | 4/2004 |
| WO | 2004064306 | 7/2004 |
| WO | 2004077797 | 9/2004 |
| WO | 2004095753 | 11/2004 |
| WO | 2005008995 | 1/2005 |
| WO | 2006004467 | 1/2006 |
| WO | 2006050758 | 5/2006 |
| WO | 2006073837 | 7/2006 |
| WO | 2006077481 | 7/2006 |
| WO | 2006120558 A1 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 | 8/2007 |
| WO | 2007107701 | 9/2007 |
| WO | 2007124279 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 | 7/2008 |
| WO | 2008099802 | 8/2008 |
| WO | 2010088413 | 8/2010 |
| WO | 2011149532 A1 | 12/2011 |

OTHER PUBLICATIONS

3rd Generation Partnership Project, "Technical Specification Group Services and System Aspects; Policy and Charging Control Architecture," Release 8, Document No. 3GPP TS 23.203, V8.4.0, Dec. 2008.

Alonistioti et al., "Intelligent Architectures Enabling Flexible Service Provision and Adaptability," 2002.

Amazon Technologies, Inc., "Kindle™ User's Guide," 3rd Edition, Copyright 2004-2009.

Chandrasekhar et al., "Femtocell Networks: A Survey," Jun. 28, 2008.

Chaouchi et al., "Policy Based Networking in the Integration Effort of 4G Networks and Services," 2004 IEEE.

Cisco Systems, Inc., "Cisco Mobile Exchange (CMX) Solution Guide: Chapter 2—Overview of GSM, GPRS, and UMTS," Nov. 4, 2008.

Dikaiakos et al., "A Distributed Middleware Infrastructure for Personalized Services," Nov. 24, 2003.

Farooq et al., "An IEEE 802.16 WiMax Module for the NS-3 Simulator," Mar. 2-6, 2009.

Han et al., "Information Collection Services for Qos-Aware Mobile Applications," 2005.

Hartmann et al., "Agent-Based Banking Transactions & Information Retrieval—What About Performance Issues?" 1999.

Hewlett-Packard Development Company, LP, "IP Multimedia Services Charging," white paper, Jan. 2006.

Hossain et al., "Gain-Based Selection of Ambient Media Services in Pervasive Environments," Mobile Networks and Applications. Oct. 3, 2008.

Knight et al., "Layer 2 and 3 Virtual Private Networks: Taxonomy, Technology, and Standarization Efforts," IEEE Communications Magazine, Jun. 2004.

Koutsopoulou et al., "Middleware Platform for the Support of Charging Reconfiguration Actions," 2005.

Kyriakakos et al., "Ubiquitous Service Provision in Next Generation Mobile Networks," Proceedings of the 13th IST Mobile and Wireless Communications Summit, Lyon, France, Jun. 2004.

Li, Yu, "Dedicated E-Reading Device: The State of the Art and the Challenges," Scroll, vol. 1, No. 1, 2008.

Nilsson et al., "A Novel MAC Scheme for Solving the QoS Parameter Adjustment Problem in IEEE802.11e EDCA," Feb. 2006.

Oppliger, Rolf, "Internet Security: Firewalls and Bey," Communications of the ACM, May 1997, vol. 40. No. 5.

Rao et al., "Evolution of Mobile Location-Based Services," Communication of the ACM, Dec. 2003.

Steglich, Stephan, "I-Centric User Interaction," Nov. 21, 2003.

Van Eijk, et al., "GigaMobile, Agent Technology for Designing Personalized Mobile Service Brokerage," Jul. 1, 2002.

Zhu et al., "A Survey of Quality of Service in IEEE 802.11 Networks," IEEE Wireless Communications, Aug. 2004.

European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."

Search Report and Written Opinion mailed Jan. 17, 2012 from International Serial No. PCT/US2011/001675 filed Sep. 28, 2011.

Anton, B. et al., "Best Current Practices for Wireless Internet Service Provider (WISP) Roaming"; Release Date Feb. 2003, Version 1.0; Wi-Fi Alliance—Wireless ISP Roaming (WISPr).

(56) References Cited

OTHER PUBLICATIONS

Ruckus Wireless—White Paper; "Smarter Wi-Fi for Mobile Operator Infrastructures" 2010.

Accuris Networks, "The Business Value of Mobile Data Offload—a White Paper", 2010.

Wireless Broadband Alliance, "WISPr 2.0, Apr. 8, 2010"; Doc. Ref. No. WBA/RM/WISPr, Version 01.00.

Thurston, Richard, "WISPr 2.0 Boosts Roaming Between 3G and Wi-Fi"; Jun. 23, 2010; Web page from zdnet. com; Zdnet.com/wispr-2-0-boosts-roaming-between-3g-and-wi-fi-3040089325/.

European Search Report and Opinion mailed May 15, 2013; 11831032.5-1957; PCT/US2011001675.

"Communication Concepts for Mobile Agent Systems," by Joachim Baumann et al.; Inst. Of Parallel and Distributed High-Performance Systems, Univ. of Stuttgart, Germany, pp. 123-135, 1997.

VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.

"The Construction of Intelligent Residential District in Use of Cable Television Network," Shandong Science, vol. 13, No. 2, Jun. 2000.

"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.

"ASA/PIX: Allow Split Tunneling for VPN Clients on the ASA Configuration Example," Document ID 70917, Jan. 10, 2008.

\* cited by examiner

SERVICE DESIGN CENTER FOR DEVICE ASSISTED SERVICES

CROSS-REFERENCE TO RELATED APPLICATIONS

This application is a continuation-in-part of and incorporates by reference the following U.S. pending non-provisional patent applications: U.S. Ser. No. 12/380,759 filed Mar. 2, 2009 now U.S. Pat. No. 8,270,310, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009 now U.S. Pat. No. 8,321,526, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009 now U.S. Pat. No. 8,355,337, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. Ser. No. 12/380,774 filed Mar. 2, 2009, entitled "Verifiable and Accurate Service Usage Monitoring for Intermediate Networking Devices," U.S. Ser. No. 12/380,773 filed Mar. 2, 2009, entitled "Verifiable Service Policy Implementation for Intermediate Networking Devices," U.S. Ser. No. 12/380,769 filed Mar. 2, 2009, entitled "Service Profile Management with User Preference, Adaptive Policy, Network Neutrality and User Privacy for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," U.S. Ser. No. 12/695,980 filed Jan. 28, 2010, entitled "Enhanced Roaming Services and Converged Carrier Networks with Device Assisted Services and a Proxy," U.S. Ser. No. 13/134,028 filed May 25, 2011, entitled "Device-Assisted Services for Protecting Network Capacity," U.S. Ser. No. 13/134,005 filed May 25, 2011, entitled "System and Method for Wireless Network Offloading," U.S. Ser. No. 13/229,580 filed Sep. 9, 2011, entitled "Wireless Network Service Interfaces," U.S. Ser. No. 13/237,827 filed Sep. 20, 2011, entitled "Adapting Network Policies Based on Device Service Processor Configuration," U.S. Ser. No. 13/239,321 filed Sep. 21, 2011, entitled "Service Offer Set Publishing to Device Agent with On-Device Service Selection," U.S. Ser. No. 13/248,028 filed Sep. 28, 2011, entitled "Enterprise Access Control and Accounting Allocation for Access Networks" and U.S. Ser. No. 13/247,998 filed Sep. 28, 2011, entitled "Secure Device Data Records." This application claims priority to and incorporates by reference the following U.S. pending provisional patent applications: U.S. provisional Ser. No. 61/387,243 filed Sep. 28, 2010, entitled "Enterprise and Consumer Billing Allocation for Wireless Communication Device Service Usage Activities," U.S. provisional Ser. No. 61/387,247 filed Sep. 28, 2010, entitled "Secured Device Data Records," U.S. provisional Ser. No. 61/389,547 filed Oct. 4, 2010, entitled "User Notifications for Device Assisted Services," U.S. provisional Ser. No. 61/407, 358 filed Oct. 27, 2010, entitled "Service Controller and Service Processor Architecture," U.S. provisional Ser. No. 61/418,507 filed Dec. 1, 2010, entitled "Application Service Provider Interface System," U.S. provisional Ser. No. 61/418, 509 filed Dec. 1, 2010, entitled "Service Usage Reporting Reconciliation and Fraud Detection for Device Assisted Services," U.S. provisional Ser. No. 61/420,727 filed Dec. 7, 2010, entitled "Secure Device Data Records," U.S. provisional Ser. No. 61/422,565 filed Dec. 13, 2010, entitled "Service Design Center for Device Assisted Services," U.S. provisional Ser. No. 61/422,572 filed Dec. 13, 2010, entitled "System Interfaces and Workflows for Device Assisted Services," U.S. provisional Ser. No. 61/422,574 filed Dec. 13, 2010, entitled "Security and Fraud Detection for Device Assisted Services," U.S. provisional Ser. No. 61/435,564 filed Jan. 24, 2011, entitled "Framework for Device Assisted Services," and U.S. provisional Ser. No. 61/472,606 filed Apr. 6, 2011, entitled "Managing Service User Discovery and Service Launch Object Placement on a Device."

Further, this application incorporates by reference the following U.S. provisional patent applications: U.S. provisional Ser. No. 61/206,354 filed Jan. 28, 2009, entitled "Services Policy Communication System and Method," U.S. provisional Ser. No. 61/206,944 filed Feb. 4, 2009, entitled "Services Policy Communication System and Method," U.S. provisional Ser. No. 61/207,393 filed Feb. 10, 2009, entitled "Services Policy Communication System and Method," U.S. provisional Ser. No. 61/207,739 filed Feb. 13, 2009, entitled "Services Policy Communication System and Method," U.S. provisional Ser. No. 61/270,353 filed Jul. 6, 2009, entitled "Device Assisted CDR Creation, Aggregation, Mediation and Billing," U.S. provisional Ser. No. 61/275,208 filed Aug. 25, 2009, entitled "Adaptive Ambient Services," U.S. provisional Ser. No. 61/237,753 filed Aug. 28, 2009, entitled "Adaptive Ambient Services," U.S. provisional Ser. No. 61/252,151 filed Oct. 15, 2009, entitled "Security Techniques for Device Assisted Services," U.S. provisional Ser. No. 61/252,153 filed Oct. 15, 2009, entitled "Device Group Partitions and Settlement Platform," U.S. provisional Ser. No. 61/264,120 filed Nov. 24, 2009, entitled "Device Assisted Services Install," U.S. provisional Ser. No. 61/264,126 filed Nov. 24, 2009, entitled "Device Assisted Services Activity Map," U.S. provisional Ser. No. 61/348,022 filed May 25, 2010, entitled "Device Assisted Services for Protecting Network Capacity,"

U.S. provisional Ser. No. 61/381,159 filed Sep. 9, 2010, entitled "Device Assisted Services for Protecting Network Capacity," U.S. provisional Ser. No. 61/381,162 filed Sep. 9, 2010, entitled "Service Controller Interfaces and Workflows," U.S. provisional Ser. No. 61/384,456 filed Sep. 20, 2010, entitled "Securing Service Processor with Sponsored SIMs," and U.S. provisional Ser. No. 61/385,020 filed Sep. 21, 2010, entitled "Service Usage Reconciliation System Overview."

The following applications, U.S. Ser. No. 12/380,759 filed Mar. 2, 2009, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. Ser. No. 12/380,774 filed Mar. 2, 2009, entitled "Verifiable and Accurate Service Usage Monitoring for Intermediate Networking Devices," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,773 filed Mar. 2, 2009, entitled "Verifiable Service Policy Implementation for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/206,354 filed Jan. 28, 2009, entitled "Services Policy Communication System and Method." The following applications, U.S. Ser. No. 12/380,759 filed Mar. 2, 2009, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. Ser. No. 12/380,774 filed Mar. 2, 2009, entitled "Verifiable and Accurate Service Usage Monitoring for Intermediate Networking Devices," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,773 filed Mar. 2, 2009, entitled "Verifiable Service Policy Implementation for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/206,944 filed Feb. 4, 2009, entitled "Services Policy Communication System and Method." The following applications, U.S. Ser. No. 12/380,759 filed Mar. 2, 2009, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. serial No, 12/380,774 filed Mar. 2, 2009, entitled "Verifiable and Accurate Service Usage Monitoring for Intermediate Networking Devices," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,773 filed Mar. 2, 2009, entitled "Verifiable Service Policy Implementation for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/207,393 filed Feb. 10, 2009, entitled "Services Policy Communication System and Method." The following applications, U.S. Ser. No. 12/380,759 filed Mar. 2, 2009, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. Ser. No. 12/380,774 filed Mar. 2, 2009, entitled "Verifiable and Accurate Service Usage Monitoring for Intermediate Networking Devices," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,773 filed Mar. 2, 2009, entitled "Verifiable Service Policy Implementation for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/207,739 filed Feb. 13, 2009, entitled "Services Policy Communication System and Method." The following applications, U.S. Ser. No. 12/695,019 filed Jan. 27, 2010, entitled "Device Assisted CDR Creation, Aggregation, Mediation, and Billing," U.S. Ser. No. 12/694,451 filed Jan. 27, 2010, entitled "Device Group Partitions and Settlement Platform," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/270,353 filed Jul. 6, 2009, entitled "Device Assisted CDR Creation, Aggregation, Mediation and Billing." The following application, U.S. Ser. No. 12/695,020 filed Jan. 27, 2010, entitled "Adaptive Ambient Services," claims priority to U.S. provisional Ser. No. 61/275,208 filed Aug. 25, 2009, entitled "Adaptive Ambient Services." The following application, U.S. Ser. No. 12/695,020 filed Jan. 27, 2010, entitled "Adaptive Ambient Services," claims priority to U.S. provisional Ser. No. 61/237,753 filed Aug. 28, 2009, entitled "Adaptive Ambient Services." The following applications, U.S. Ser. No. 12/694,445 filed Jan. 27, 2010, entitled "Security Techniques for Device Assisted Services," and U.S. Ser. No. 12/695,021 filed Jan. 27, 2010 entitled "Quality of Service for Device Assisted Services," claim priority to U.S. provisional Ser. No. 61/252,151 filed Oct. 15, 2009, entitled "Security Techniques for Device Assisted Services." The following applications, U.S. Ser. No. 12/694,451 filed Jan. 27, 2010, entitled "Device Group Partitions and Settlement Platform," and U.S. Ser. No. 12/695,021 filed Jan. 27, 2010, entitled "Quality of Service for Device Assisted Services," claim priority to U.S. provisional Ser. No. 61/252,153 filed Oct. 15, 2009, entitled "Device Group Partitions and Settlement Platform." The following application, U.S. Ser. No. 12/694,455 filed Jan. 27, 2010, entitled "Device Assisted Services Install," claims priority to U.S. provisional Ser. No. 61/264,120 filed Nov. 24, 2009, entitled "Device Assisted Services Install." The following application, U.S. Ser. No. 12/695,019 filed Jan. 27, 2010, entitled "Device Assisted CDR Creation, Aggregation, Mediation, and Billing," claims priority to U.S. provisional Ser. No. 61/264,126 filed Nov. 24, 2009, entitled "Device Assisted Services Activity Map." The following applications, U.S. Ser. No. 13/134,028 filed May 25, 2011, entitled "Device-Assisted Services for Protecting Network Capacity," and U.S. Ser. No. 13/134,005 filed May 25, 2011, entitled "System and Method for Wireless Network Offloading," claim priority to U.S. provisional Ser. No. 61/348,022 filed May 25, 2010, entitled "Device Assisted Services for Protecting Network Capacity." The following application, U.S. serial No. 13,229,580 filed Sep. 9, 2011, entitled "Wireless Network Service Interfaces," claims priority to U.S. provisional Ser. No. 61/381,159 filed Sep. 9, 2010, entitled "Device Assisted Services for Protecting Network Capacity." The following application, U.S. serial No. 13,229,580 filed Sep. 9, 2011, entitled "Wireless Network Service Interfaces," claims priority to U.S. provisional Ser. No. 61/381,162 filed Sep. 9, 2010, entitled "Service Controller Interfaces and Workflows." The following application, U.S. Ser. No. 13/237,827 filed Sep. 20, 2011, entitled "Adapting Network Policies Based on Device Service Processor Configuration," claims priority to U.S. provisional Ser. No. 61/384,456 filed Sep. 20, 2010, entitled "Securing Service Processor with Sponsored SIMs." The following application, U.S. Ser. No. 13/239,321 filed Sep. 21, 2011, entitled "Service Office Set Publishing to Device Agent with On-Device Service Selection," claims priority to U.S. provisional Ser. No. 61/385,020 filed Sep. 21, 2010, entitled "Service Usage Reconciliation System Overview."

All of the above patents and applications are hereby incorporated by reference.

BACKGROUND

Today, end user devices (such as a mobile phone, tablet computer, or notebook computer) sign up for one or more mutually exclusive service plans (e.g., text messages, voice, or data) before being allowed to use an access network. The service plans usually are either pre-paid or post-pay. Depending on which service plans a user subscribes, a cost of using the access network can vary. The access network determines whether the requested use is for the mutually exclusive categories of text messages, voice, or data. Once the appropriate service plan is determined, the access network can use a policy of the service plan to determine the cost for the use. However, a user is limited to selecting one service plan from each of these three mutually exclusive categories, and thus the user is limited in selecting how he/she wants to use the access network. For example, a user cannot select multiple data plans for various data services to customize an end user device's use of the access network.

The configuration of the access network to implement a particular service plan is also very difficult. For example, to create a service plan for data services, employees of the carrier that operate the access network will discuss basic attributes of the plan (e.g., whether to charge by MB or to be unlimited), and the cost of the plan. Then, an employee will enter into a network device the policy to track use of the access network (e.g., if the former is chosen) for end user devices that subscribe to the particular data plan. An employee also enters a policy into another network device for allowing end user devices that subscribe to the data plan to use the access network. This cumbersome process makes the design of the service plan rigid, time-consuming, and prone to errors, thereby taking a long time to complete and have users begin selecting the data plan for their data services.

The foregoing example of trends and issues is intended to be illustrative and not exclusive. Other limitations of the art will become apparent to those of skill in the relevant art upon a reading of the specification and a study of the drawings.

DETAILED DESCRIPTION

Figure 1:
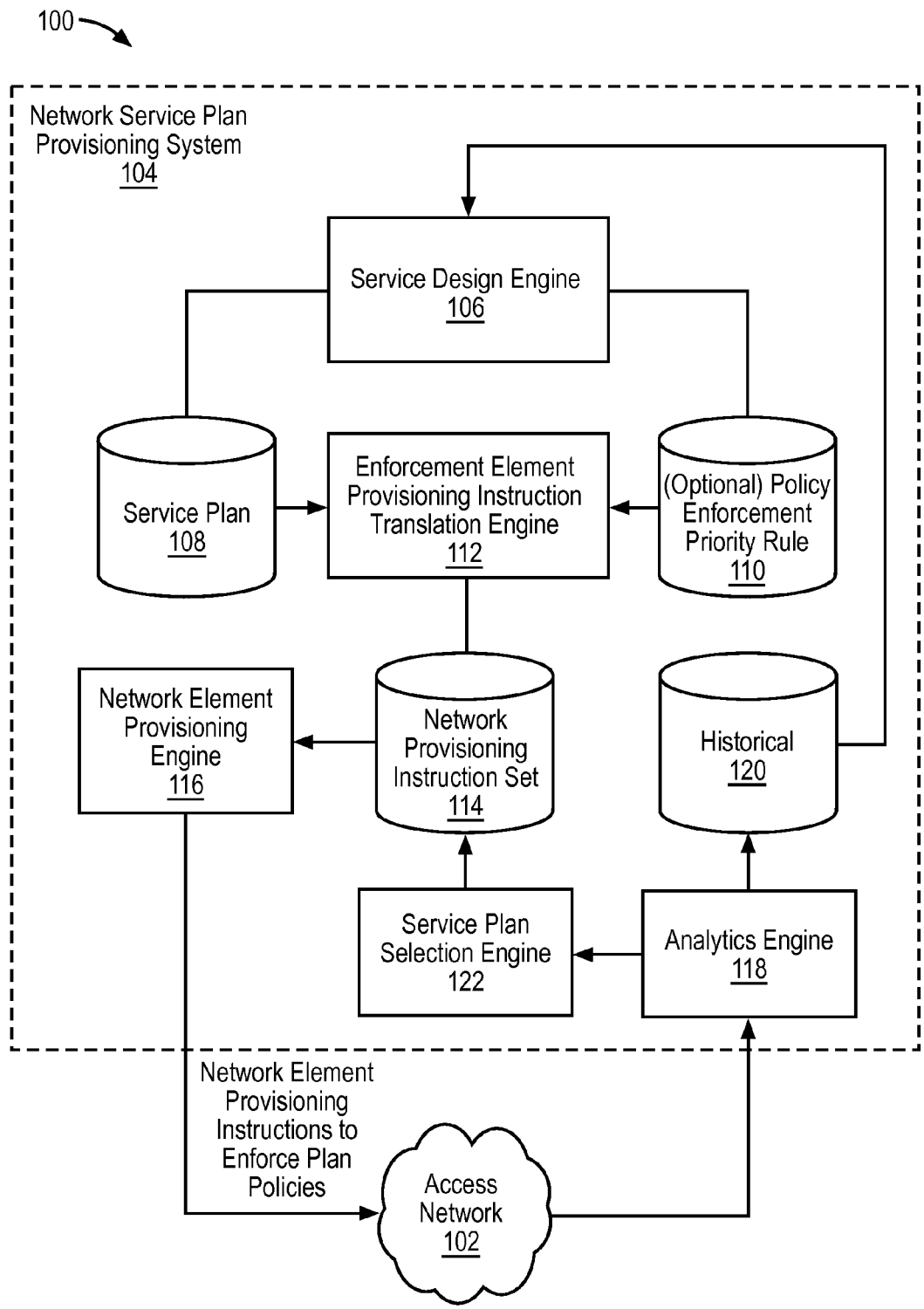
FIG. 1 depicts an example of a system including an access network and a network service plan provisioning system.

FIG. 1 depicts an example of a system 100 including an access network 102 and a network service plan provisioning system 104. In the example of FIG. 1, the access network 102 receives network element provisioning instructions to enforce plan policies from the network service plan provisioning system 104. In a specific implementation, the network service plan provisioning system 104 can receive service plan selection data from the access network, and provide new instructions based upon the selection.

The access network 102 can include a network that can provide network services to a device. The access network 102 can include a wireless network (e.g., WiFi, cellular, or some other wireless technology) and/or a wired network (e.g., LAN or DSL). Wireless or wired devices can be referred to as "on" the access network 102 when the devices complete relevant association, authentication, and/or other procedures that enable to devices to obtain the services offered on the access network 102 in accordance with applicable known or convenient techniques. Advantageously, the devices can have inter-network policies that are provided by the network service plan provisioning system 104 in accordance with techniques described in this paper. Inter-network policies, as the term is used in this paper, refer to traffic control, charging, and notification policies that remain in effect after a device passes from one network to another (e.g., by roaming). Intra-network policies, on the other hand, refer to control traffic control limited to the boundaries of a network (e.g., in-network traffic control, charging, and/or notification policies, plus an optional traffic control policy that permits or prevents roaming to another network).

It is likely that it will be desirable to couple the access network 102 to another network. Networks can include enterprise private networks and virtual private networks (collectively, private networks), which are well known to those of skill in computer networks. As the name suggests, private networks are under the control of an entity rather than being open to the public. Private networks include a head office and optional regional offices (collectively, offices). Many offices enable remote users to connect to the private network offices via some other network, such as the Internet, a public switched telephone network (PSTN), or the like. As used in this paper, a private network is intended to mean a network that is under the control of a single entity or hierarchy of entities. This is typically the case for cellular networks, wireless infrastructure networks, company LANs and WANs, and the like.

In the example of FIG. 1, the access network 102 and the network service plan provisioning system 104 may or may not be on the same private network, or a first entity may own or control a portion of the access network 102 and a second entity may own or control a portion of the access network 102 as well as the network service plan provisioning system 104. For example, a carrier may include the network service plan provisioning system 104, but the access network 102 may include a WiFi network owned by a local business entity. Advantageously, in a specific implementation, the carrier can continue to provide policy control while a subscriber is on the access network 102. Where the access network 102 includes a cellular network of the carrier in this example, even greater policy control may be possible.

It should be noted that a subscriber can be defined broadly to include any applicable device on the access network 102. For example, the access network 102 could include parking meter devices, food-dispensing machines, and automobile onboard computers, as well as smart phones and other devices frequently used by humans.

In the example of FIG. 1, the network service plan provisioning system 104 includes a service design engine 106, a service plan datastore 108, an optional policy enforcement priority rule datastore 110, an enforcement element provisioning instruction translation engine 112, a network provisioning instruction set 114, a network element provisioning engine 116, and analytics engine 118, a historical datastore 120 and a service plan selection engine 122.

The service design engine 106 inputs service plan data structures and other related data that is described later in more detail into the service plan datastore 108. Engines, as described in this paper, refer to computer-readable media coupled to a processor. The computer-readable media have data, including executable files, that the processor can use to transform the data and create new data. An engine can include a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Datastores, as described in this paper, can be implemented, for example, as software embodied in a physical computer-readable medium on a general- or specific-purpose machine, in firmware, in hardware, in a combination thereof, or in an applicable known or convenient device or system. Datastores in this paper are intended to include any applicable organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

The service plan datastore 108 can store service plan data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In an example of a system where the service plan datastore 108 is implemented as a database, a database management system (DBMS) can be used to manage the service plan datastore 108. In such a case, the DBMS may be thought of as part of the service plan datastore 108 or as part of the service design engine 106 and/or the enforcement element provisioning instruction translation engine 112, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

In a specific implementation, the service design engine 106 inputs policy enforcement priority rule data structures in the policy enforcement priority rule datastore 110. An aspect of policy control described in this paper entails the superposition of a first traffic classification filter of a service plan over a second traffic classification filter of the service plan. There is more than one way to accomplish this superposition including, for example, ordering the first and second traffic classification filter such that the first traffic classification filter is applied to a traffic event before the second traffic classification filter, trapping a match of the first traffic classification filter in a kernel until the second traffic classification filter is matched (then applying a first relevant action of an action list), or applying an explicit policy enforcement priority rule. Because implicit policy enforcement priorities can be used, the policy enforcement priority rule datastore 110 is optional. It should be noted that explicit policy enforcement priorities can be mandated in accordance with implementation- and/or configuration-specific parameters or a combination of implicit and explicit policy enforcement priorities can be used. In a specific implementation, explicit priorities trump implicit priorities (e.g., ordering).

In the example of FIG. 1, the enforcement element provisioning instruction translation engine 112 converts service plan data structures in the service plan datastore 108 into respective network provisioning instruction set data structures, which are stored in the network provisioning instruction set datastore 114. The translation engine 112 can also convert the relevant policy enforcement priority rule data structures from the policy enforcement priority rule datastore 110, if applicable, for inclusion in the network provisioning instruction set data structures.

In the example of FIG. 1, the network element provisioning engine 116 provides network element provisioning instructions to enforce plan policies to the access network 102. The network element provisioning instructions are applicable to one or more devices that may or may not currently be on the access network 102. In a specific implementation, the network element provisioning instructions are sent to the access network 102 only when the applicable one or more devices are on the access network 102.

In the example of FIG. 1, the analytics engine 118 receives data from the access network 102, which can include subscriber feedback or instructions. For the purposes of this example, the data is presumed to include service plan selection data, which is used by the service plan selection engine 122. The analytics engine 118 can modify the data in a manner that is useful to the network service plan provisioning system 104, which can include triggering actions based upon feedback or instructions from the access network 102. The data can be stored in the historical datastore 120, which can be used by the service design engine 106. For example, the service design engine 106 can specify whether more or less data should be requested from the device (e.g., based upon network state), determine whether to reduce counts or other notifications, specify parameters that are to be recorded within classifications, or the like.

Network state can be associated with a network busy state (or, conversely, a network availability state). A network availability state can include, for example, a state or measure of availability/capacity of a segment of a network (e.g., a last edge element of a wireless network). A network busy state can include, for example, a state or measure of the network usage level or network congestion of a segment of a network (e.g., a last edge element of a wireless network). In some embodiments, network availability state and network busy state are inverse measures. As used herein with respect to certain embodiments, network availability state and network busy state can be used interchangeably based on, for example, a design choice (e.g., designing to assign background policies based on a network busy state or a network availability state yields similar results, but they are different ways to characterize the network performance and/or capacity and/or congestion). In some embodiments, network availability state and network busy state are dynamic measures as such states change based on network usage activities (e.g., based on a time of day, availability/capacity level, congestion level, and/or performance level). In some embodiments, differential network service usage control of a network service usage activity is based on a network busy state or network availability state. In a specific implementation, there are four levels of network busy state (not busy, light, medium, critical).

In the example of FIG. 1, the service plan selection engine 122 receives service plan selection data from the analytics engine 118. The service plan selection data can be from a device on the access network 102, originate from the access network 102, or a combination thereof. In a specific implementation, the service plan selection data is entered at a device by a user and forwarded to the service plan selection engine 122 through the access network 102.

Upon receipt of the service plan selection data, the service plan selection engine 122 can, if appropriate, select a new network provisioning instruction set in the network provisioning instruction set 114 for provisioning to the access network 102 in the manner described previously. (The service plan selection engine 122 may or may not be capable of triggering the service design engine 106 to modify a service plan, which is translated into a network provisioning instruction set for selection by the service plan selection engine 122.)

Figure 2:
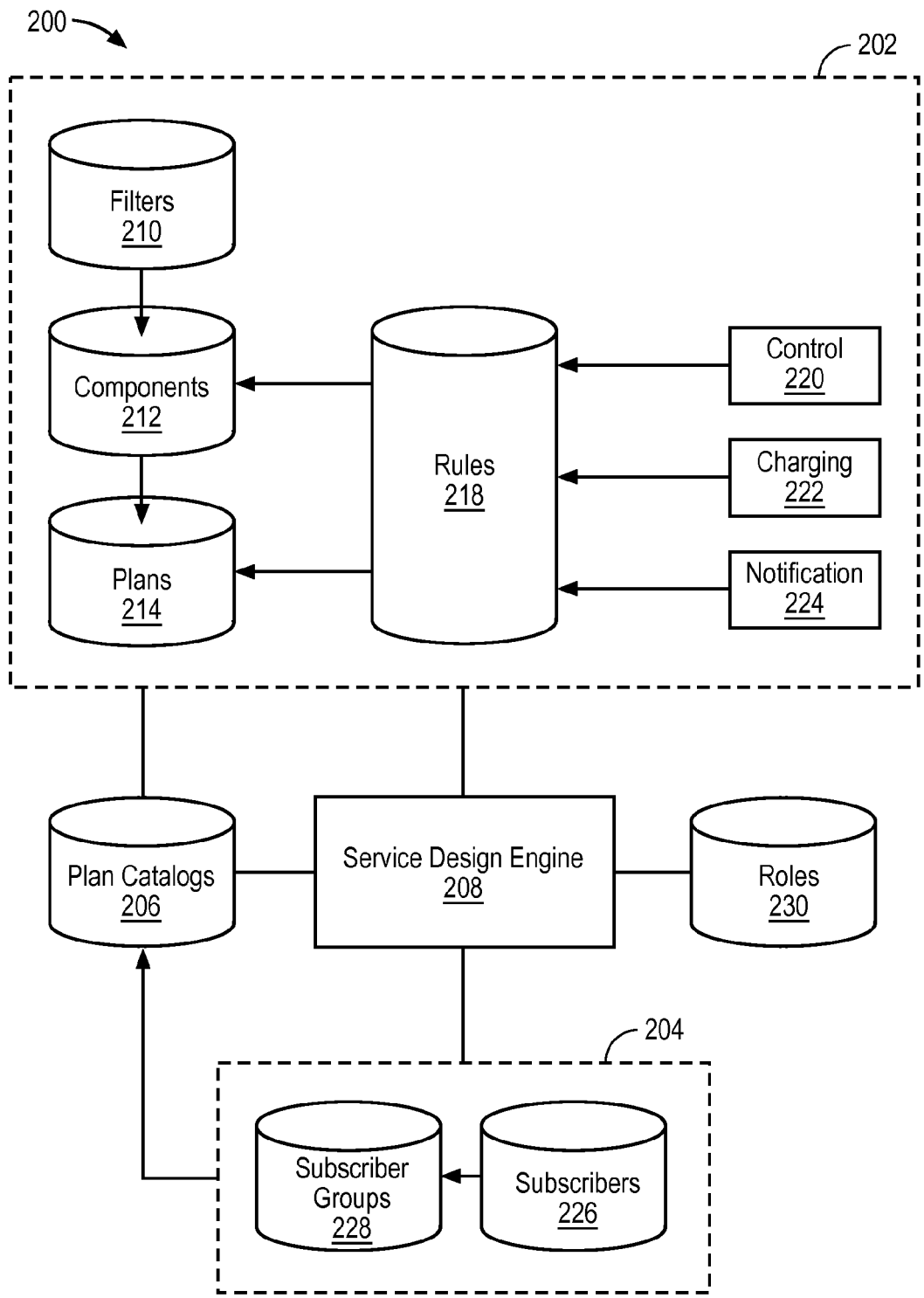
FIG. 2 depicts a conceptual diagram of an example of a hierarchical structure useful for understanding service plan design and provisioning.

FIG. 2 depicts a conceptual diagram 200 of an example of a hierarchical structure useful for understanding service plan design and provisioning. The conceptual diagram 200 includes a collection of datastores associated with service plans 202, a collection of datastores associated with subscribers 204, a plan catalogs datastore 206, and a service design engine 208.

The collection of datastores 202 includes a filters datastore 210, a components datastore 212, a plans datastore 214, a rules datastore 218, a traffic control rule data structure 220, a charging data structure 222, and a notification data structure 224. The filters datastore 210 can include, for example, traffic control filter data structures that, when used, allow, block, throttle, delay (for a fixed period of time), and defer (until an event) a matched traffic event. Aspects of a traffic event to which a filter is mapped can include, for example, by remote destination, by application, by content (e.g., generic content such as streaming, specific content identifiable using regular expressions, etc.), by protocol, by port, by target operating system, to name several. In the context of service design, it has proven convenient to offer designers filter packages that combine a traffic control filter with an action. Such actions can include notify (which triggers a notification to be sent to a notification destination), cap (which increments a count), trap (which traps a match at the kernel level to see if another filter is matched later), and instructions (which can result in some other instruction to be executed).

The components datastore 212 can include, for example, a set of filter packages, including at least one filter, and a set of policies. Because components can inherit policy, it is not an explicit requirement that a component include at least one policy. However, when a component is assembled in a service plan offering, the component will have either a policy in the set of policies or will inherit a policy.

The rules datastore 218 includes policy rules. For illustrative purposes, three policy type data structures are depicted as directed toward the rules datastore 218: traffic control policy data structure 220, charging policy data structure 222, and notification policy data structure 224. The traffic control policy data structure 220 can include a variety of filter packages designed to control the flow of traffic, such as allow or block, and take certain actions in association with the traffic control, such as cap-and-match. The charging policy data structure 222 can be directed to a user or a sponsor (who can subsidize network service usage) and can include a charging code.

The rules datastore 218 includes policy rules. For illustrative purposes, three policy type data structures are depicted as directed toward the rules datastore 218, traffic control policy data structure 220, charging policy data structure 222, and notification policy data structure 224. The traffic control policy data structure 220 can include a variety of filter packages designed to control the flow of traffic, such as allow or block, and take certain actions in association with the traffic control, such as cap-and-match. The charging policy data structure 222 can be directed to a user or a sponsor (who can subsidize network service usage) and can include a charging code.

The notification policy data structure 224 can be directed to a user, a sponsor, or an engine that takes further action in accordance with variables or constant parameters in the notification and can include content for use by the target of the notification and a trigger (e.g., a selectable button that results in the execution of relevant instructions). Notification types include plan limit thresholds (plan has reached a specified % of charging policy cap), plan cap limit (requested network activity has been capped because charging policy cap has been reached), plan limit overage (overage has reached a specified %; offer the option of overage, new service plan, block ongoing usage, etc.), plan expiration (plan expired; offer option to buy a new plan), activity block event (activity blocked by filter or activity state change), no capable plan (plan does not support the requested network activity, which has been blocked), marketing interceptor (specific message or offer based on current activity or status), promotional message (overview of what plan provides), upsell offer (upsell tiered plan based on current usage). Notification actions can be added to notifications to make them "actionable," which means that a recipient of the notification can provide feedback or instructions in response to the notification. Notification actions can include, for example, OK/dismiss, cancel, acknowledge, buy (links to buy workflow), more info (e.g., more information regarding why a traffic event was blocked, suggestions for traffic activity changes or service plan purchase), back (call a previous workflow screen), next (call a next workflow screen), launch (launch URL or application). Notification customizations can include foreground, background, foreground/background (display in foreground if activity is in foreground and in background otherwise), title, subtitle, text, icon, buttons/actions, "do not show again" (will not show again for a specified time), default target button (specifies a default response action), or the like.

The collection of datastores associated with subscribers 204 includes a subscribers datastore 226 and a subscriber groups datastore 228. The subscribers datastore 226 includes subscriber data structures that include information about subscribers. A minimalist subscriber data structure is likely to at least include a subscriber identification that is unique within the system 200 or universally, such as an International Mobile Subscriber Identity (IMSI). It may also be useful to include such information as a phone number, device type, and/or International Mobile Equipment Identity (IMEI).

The subscriber groups datastore 228 includes subscriber group data structures that include groupings of subscribers. The types of groupings that can be done in a system depends upon the amount of information that is known about subscribers. For example, subscribers can be grouped by device type, device characteristics, demographic characteristics of the subscriber, region, etc.

The plan catalogs datastore 206 includes plan catalog data structures that are available to consumers or providers of network service plans. The plan catalog data structures are combinations of components from the collection of datastores associated with service plans 202 and the collection of datastores associated with subscribers 204.

The service design engine 208 can manage the datastores depicted in the example of FIG. 2. Aspects of service design and/or provisioning can be assigned to agents of the system 200. The amount of control over the system that an agent is granted is based upon the role of the agent, which can be recorded in the roles datastore 230. Roles can be set to super user, portal admin, system admin, or some other role that is applicable to the capabilities of the design center (e.g., whether it is a carrier design center, or a sandbox for an enterprise, applications developer, community-based organization, gifting organization, Mobile Virtual Network Operator (MVNO), etc.) and the human agent who is using the system.

Screenshots of a user interface for a specific implementation of a service design engine, such as the service design engine 208, can be used to illustrate some of the functionality of the service design engine 208. FIG. 3 depicts screenshots of a User Interface (UI) for a specific implementation of a service design system.

Figure 3A:
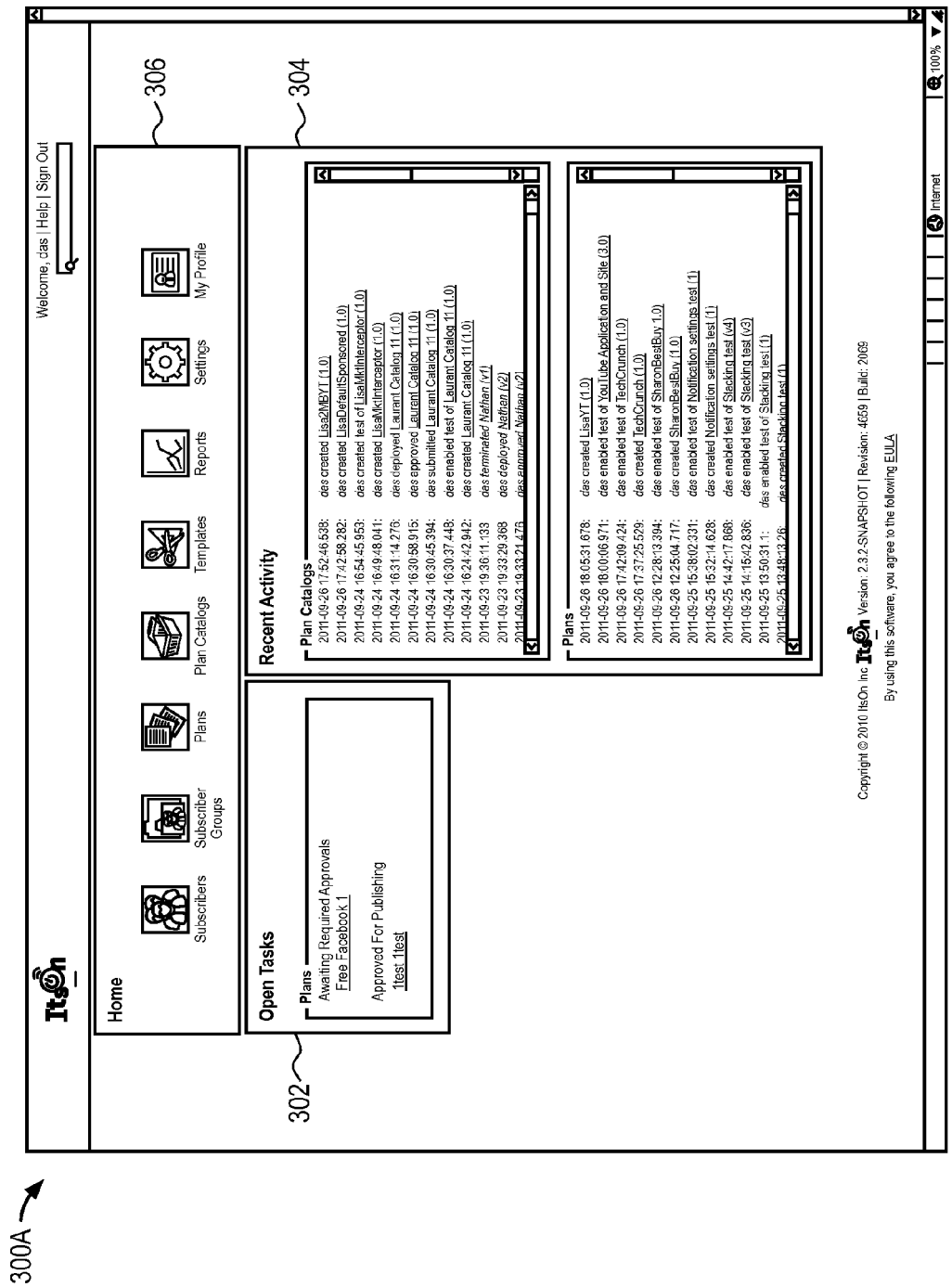
FIGS. 3A through 3AB depict screenshots of a specific implementation of a service design system.
Figure 3B:
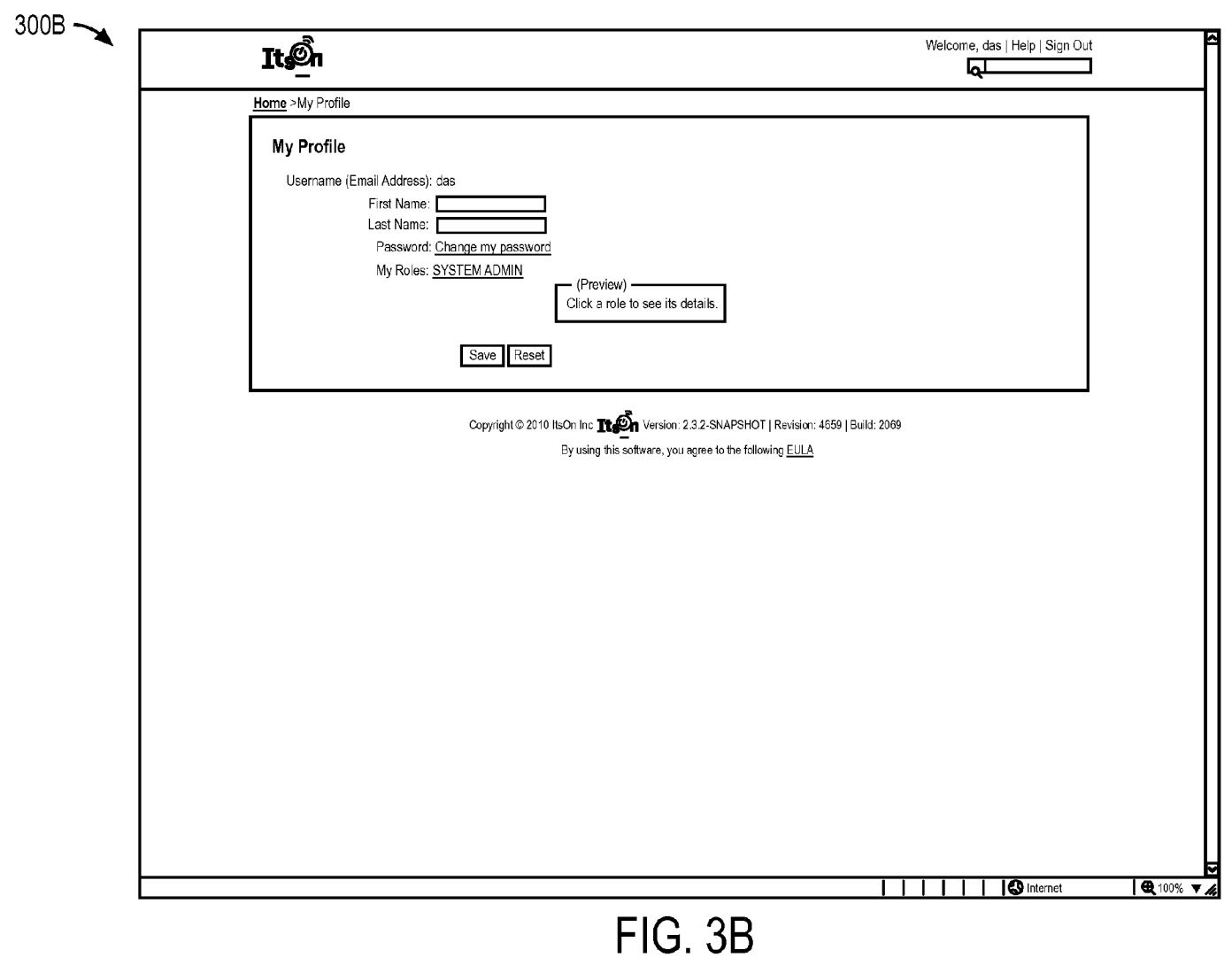
Figure 3C:
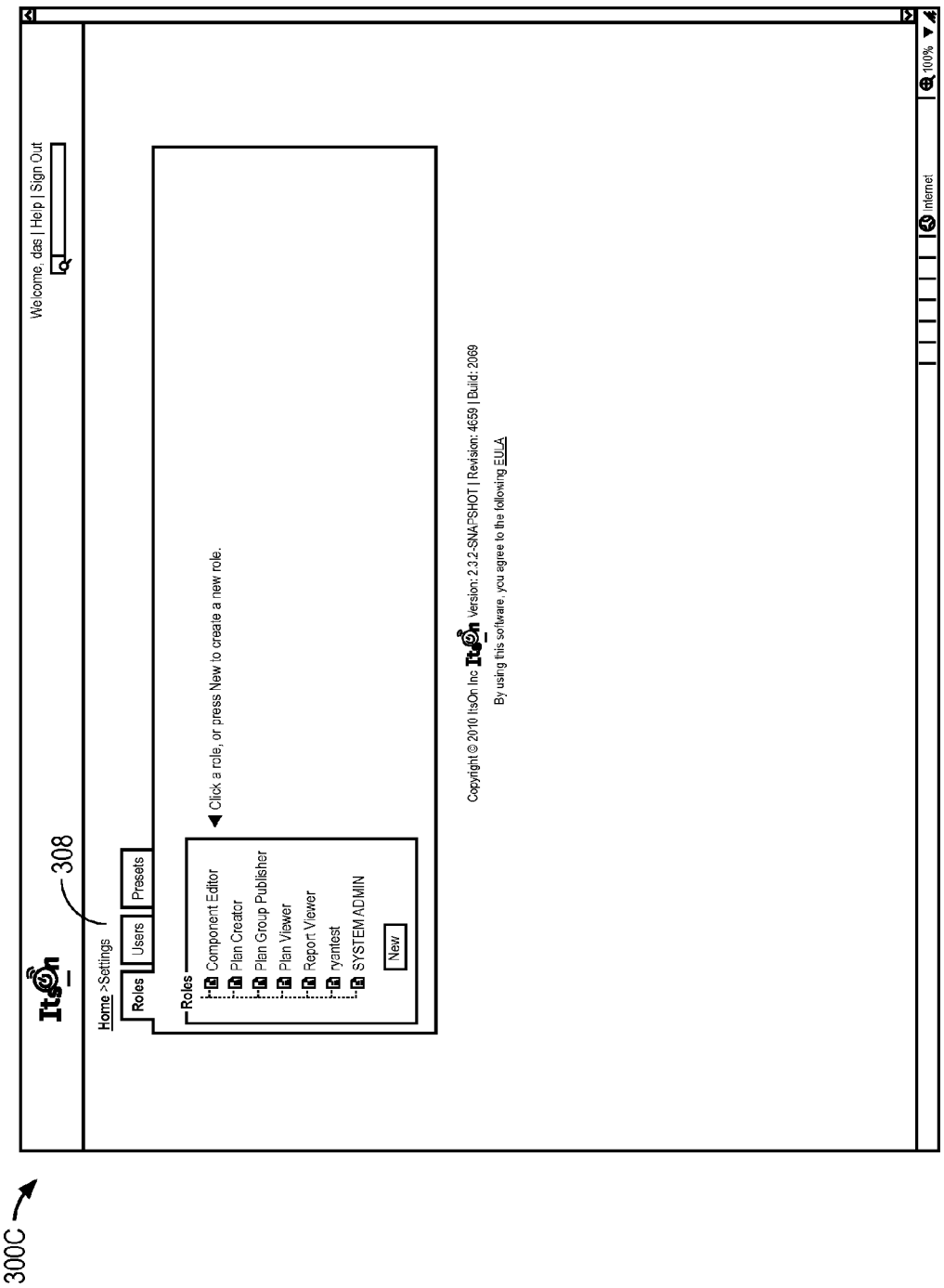

In the example of FIG. 3A, following login, a designer is directed to a service design center UI home page with an open tasks field 302, a recent activity field 304, and a menu buttons field 306. The open tasks field 302 can include drafts that are awaiting approval, beta tests that are awaiting publication/deployment, and deployed plans that are targeted for termination, or other open tasks. The recent activity field 304 can include as much or as little information as is deemed useful to designers.

The menu buttons field 306 includes eight buttons, a subscribers button, a subscriber group button, a plans button, a plan catalogs button, a templates button, a reports button, a settings button, and a my profile button. Selecting the my profile button brings a designer to screenshot 300B (FIG. 3B), where the designer can enter information such as first name, last name, password, and role. Roles can be set to super user, portal admin, system admin, or some other role that is applicable to the capabilities of the design center (e.g., whether it is a carrier design center, or a sandbox for an enterprise, applications developer, community-based organization, gifting organization, Mobile Virtual Network Operator (MVNO), etc.) and the particular designer who is using the system.

Figure 3D:
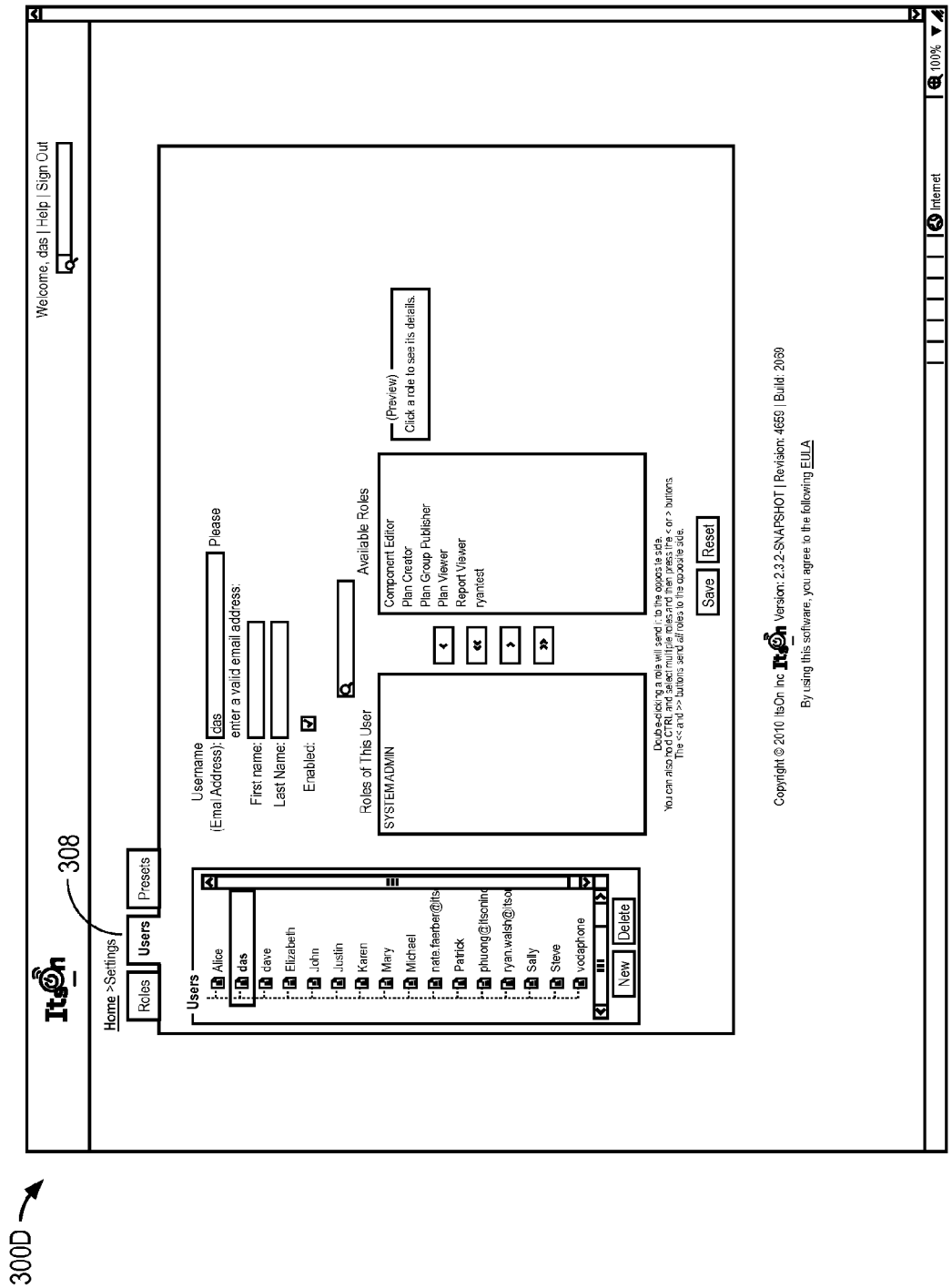
Figure 3E:
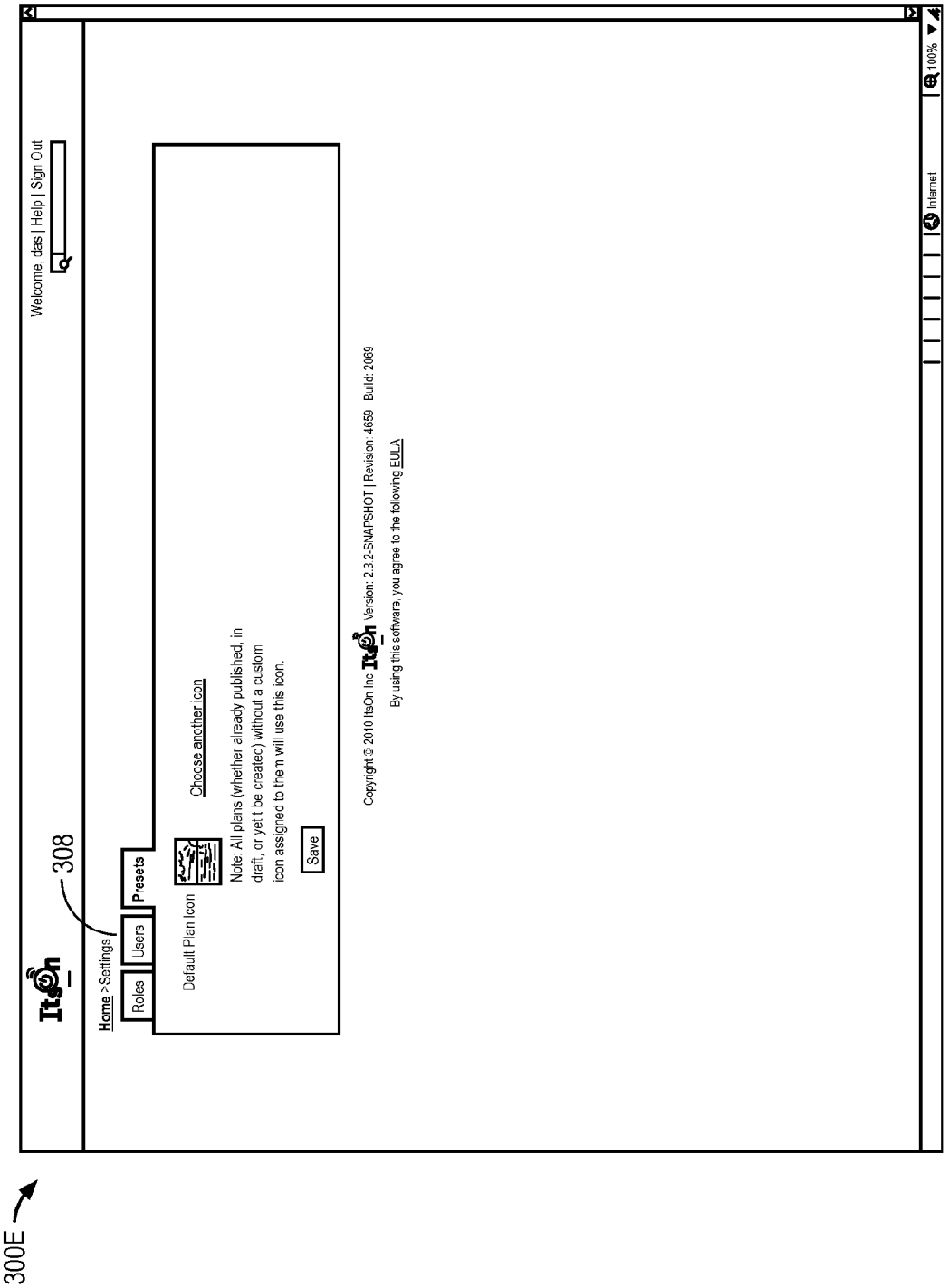
Figure 3F:
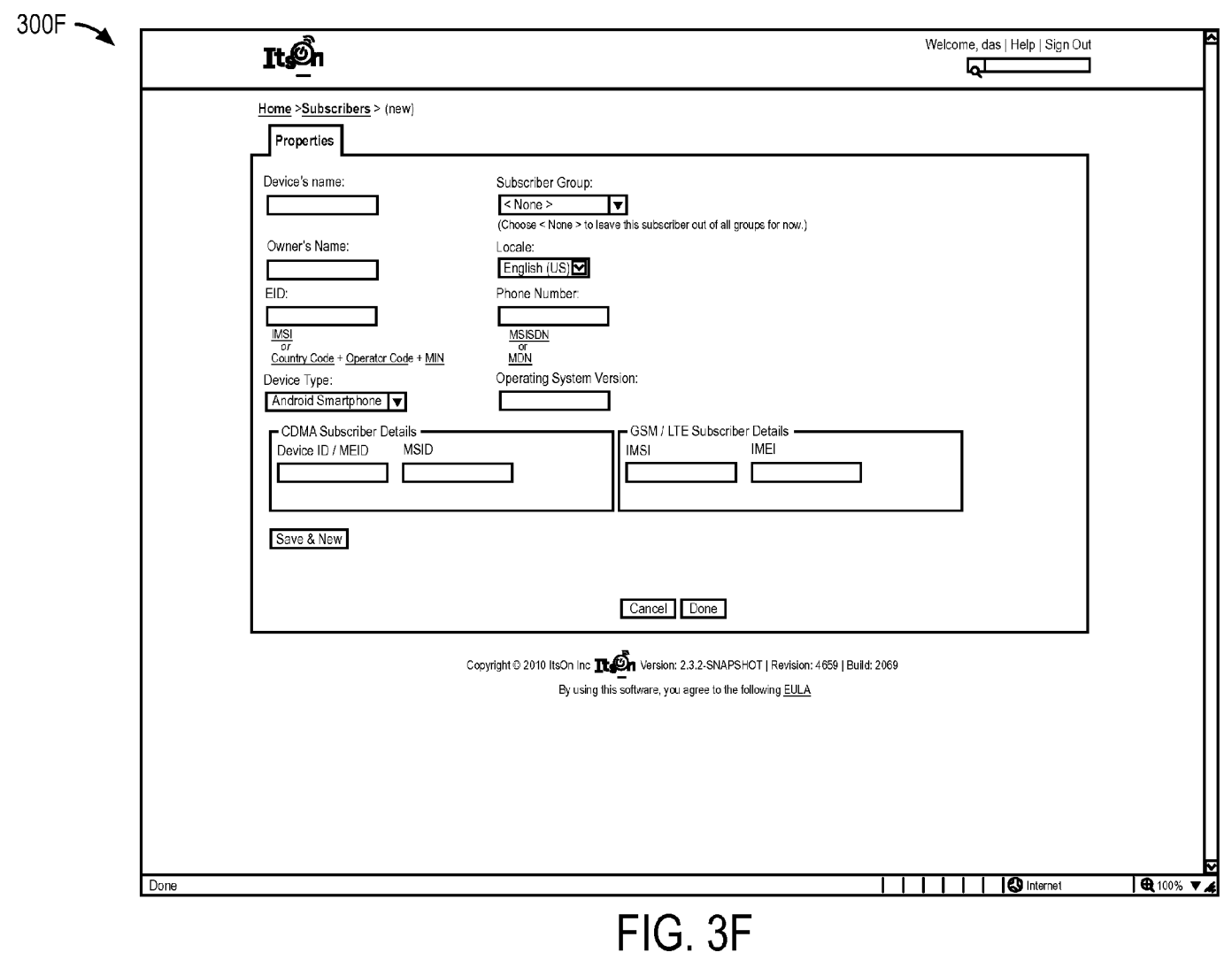
Figure 3G:
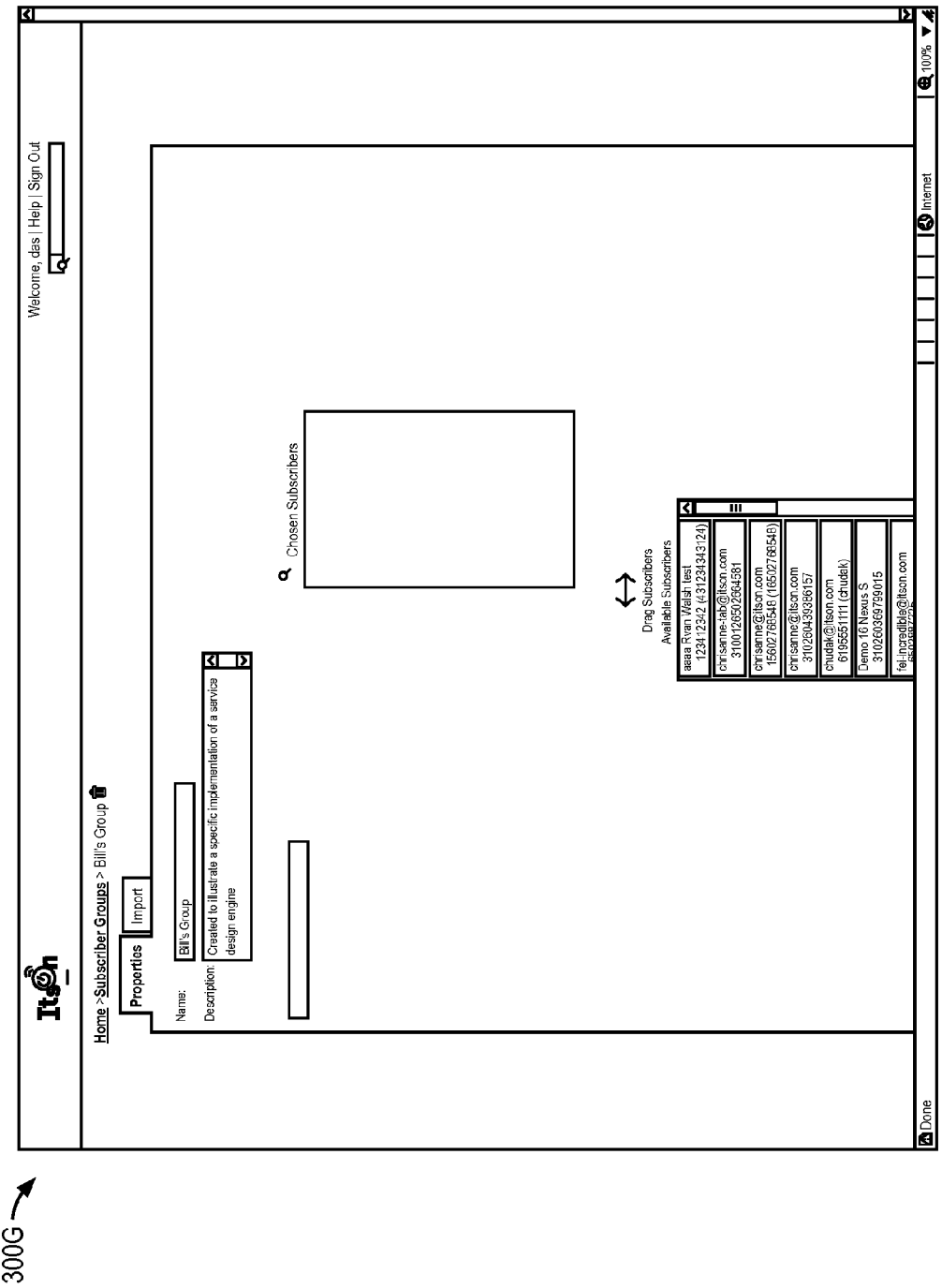
Figure 3H:
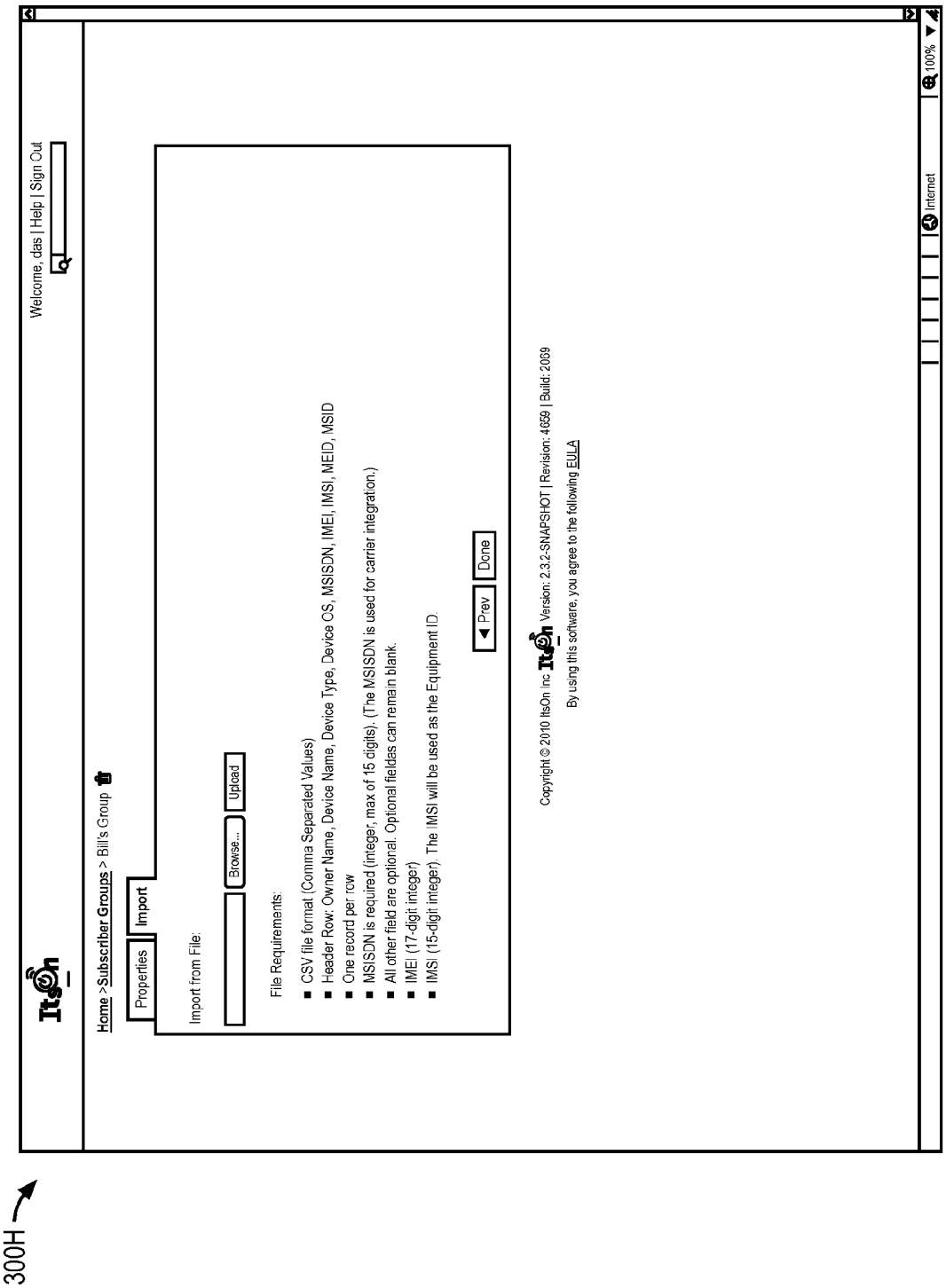

Selecting the settings button of the menu buttons field 306 brings a designer to screenshot 300C (FIG. 3C), where the designer can select a roles tab, a users tab, or a presets tab from a tabs menu 308. Selecting the Roles tab from the tabs menu 308 enables a designer to add roles, such as component editor, plan creator, plan group publisher, plan viewer, report viewer, and system admin. It may be noted that a designer will not necessarily be able to view all roles in this tab and, in a likely implementation, may be unable to create roles with rights the designer does not have (e.g., a system admin may have fewer rights than a super user and different rights than a portal admin). Selecting the Users tab from the tabs menu 308 enables a designer to add and edit users. In the example of FIG. 3D (screenshot 300D), the user das has been selected, and das' details, such as username (email address), first name, last name, whether the user is enabled, roles, and available roles are depicted. Selecting the Presets tab from the tabs menu 308 enables a designer to choose a default plan icon as depicted in the example of FIG. 3E (screenshot 300E).

Selecting the subscribers button of the menu buttons field 306 and selecting a new subscriber brings a designer to screenshot 300F (FIG. 3F). In this specific implementation, the subscriber information includes a device name, subscriber group, owner name, locale, EID, phone number, device type, operating system version, CDMA subscriber details, and GSM/LTE subscriber details. This information can also be edited for subscribers that are already in the subscribers datastore.

Selecting the subscriber groups button of the menu buttons field 306 brings a designer to screenshot 300G (FIG. 3G), where the designer can select a properties tab or an import tab. Choosing to create a new subscriber group prompts the designer to enter a group name and description, and to drag subscribers into the group. Selecting the import tab enables the designer to import subscribers from a subscribers datastore in a batch operation. See, e.g., FIG. 3H, screenshot 300H. Information can also be edited for subscriber groups that are already in the subscriber groups datastore.

Figure 3I:
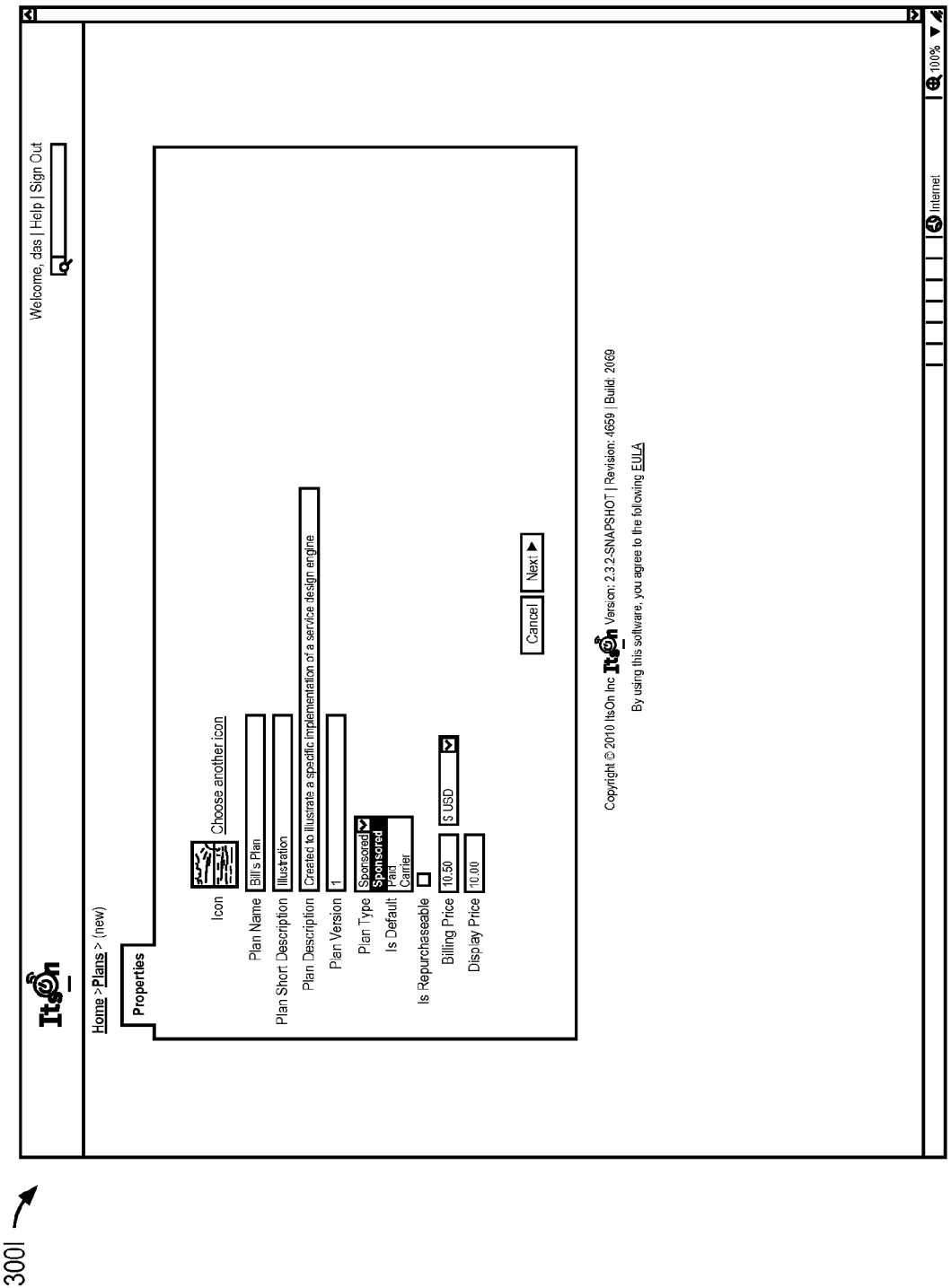
Figure 3J:
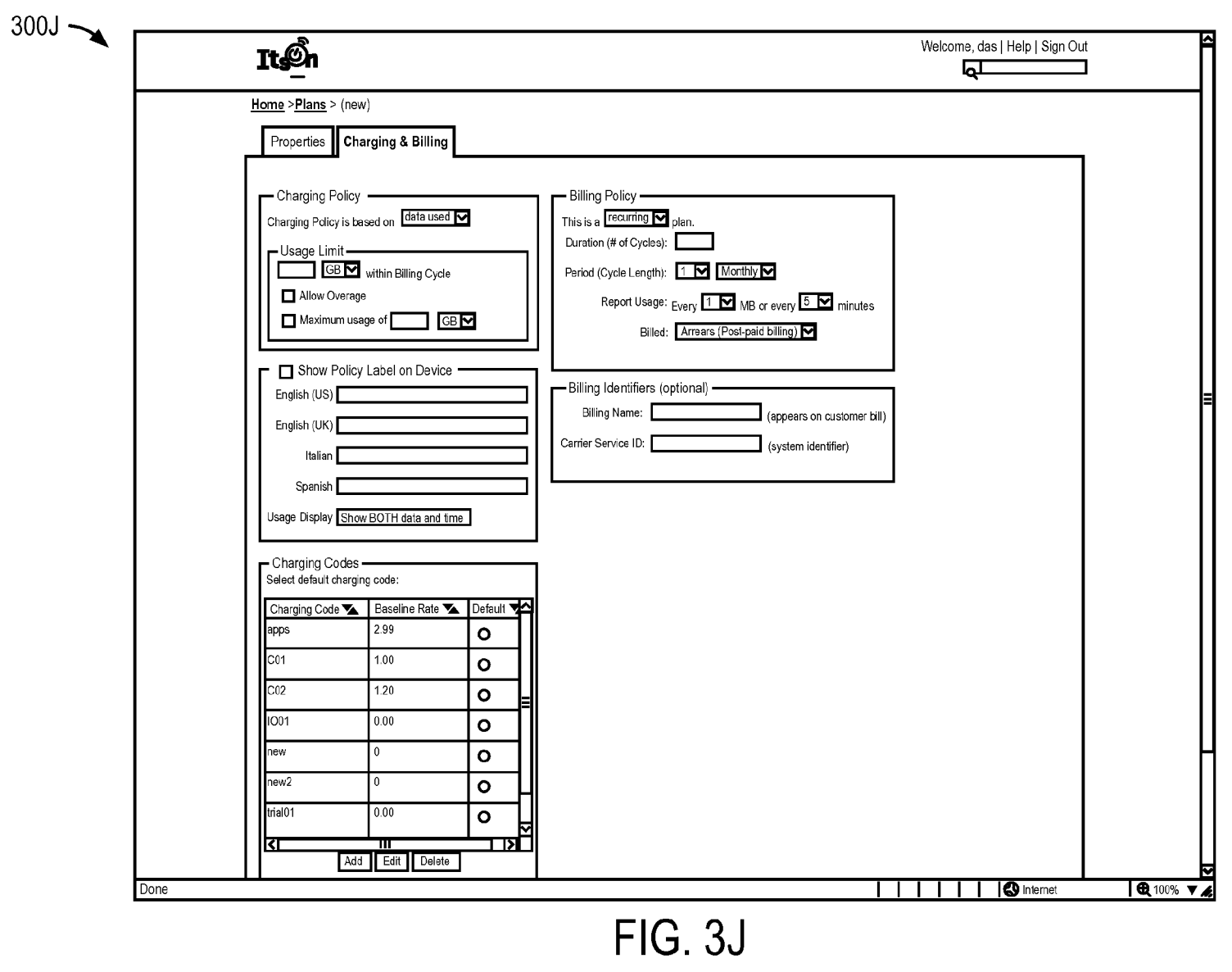
Figure 3K:
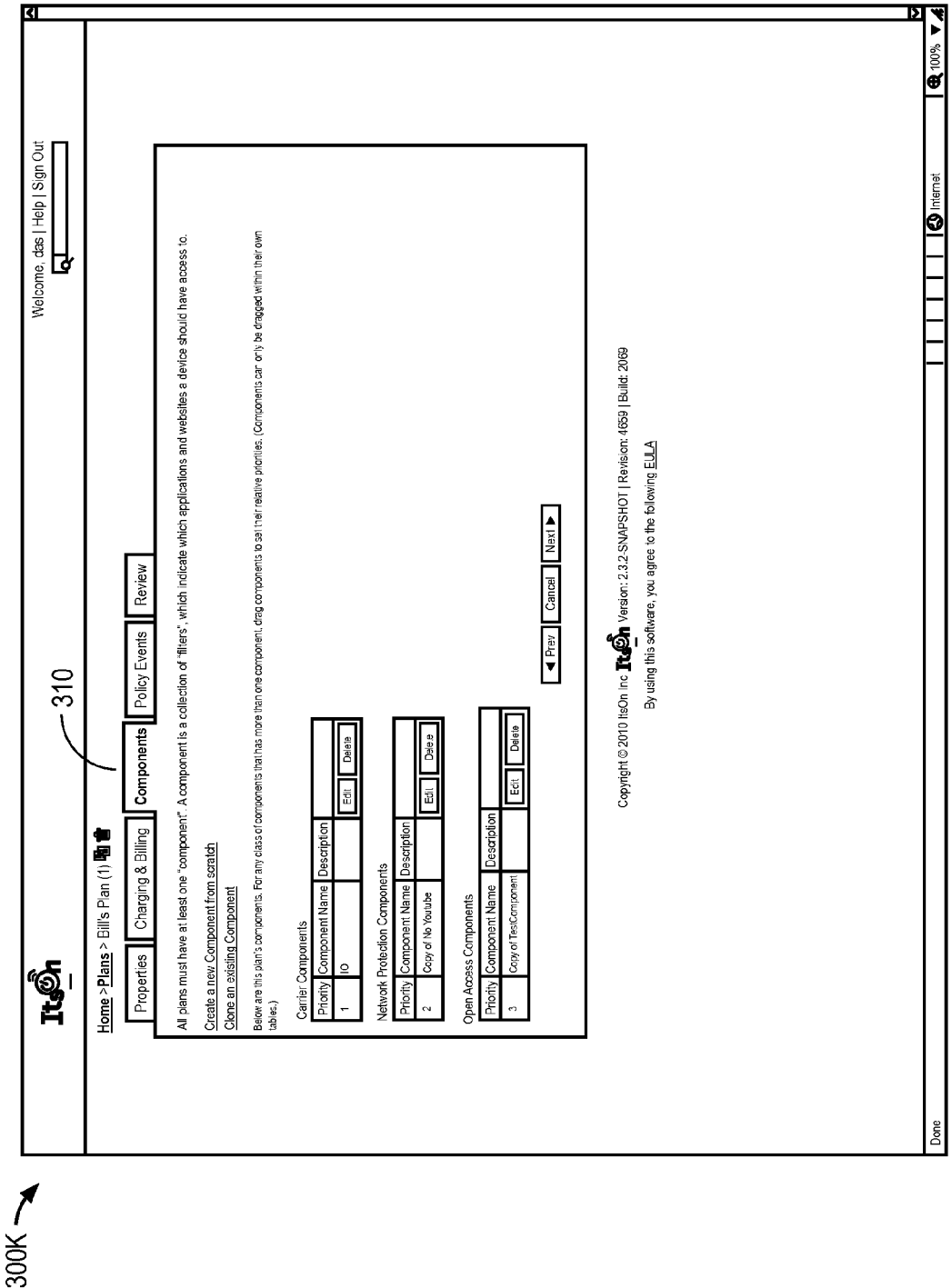
Figure 3L:
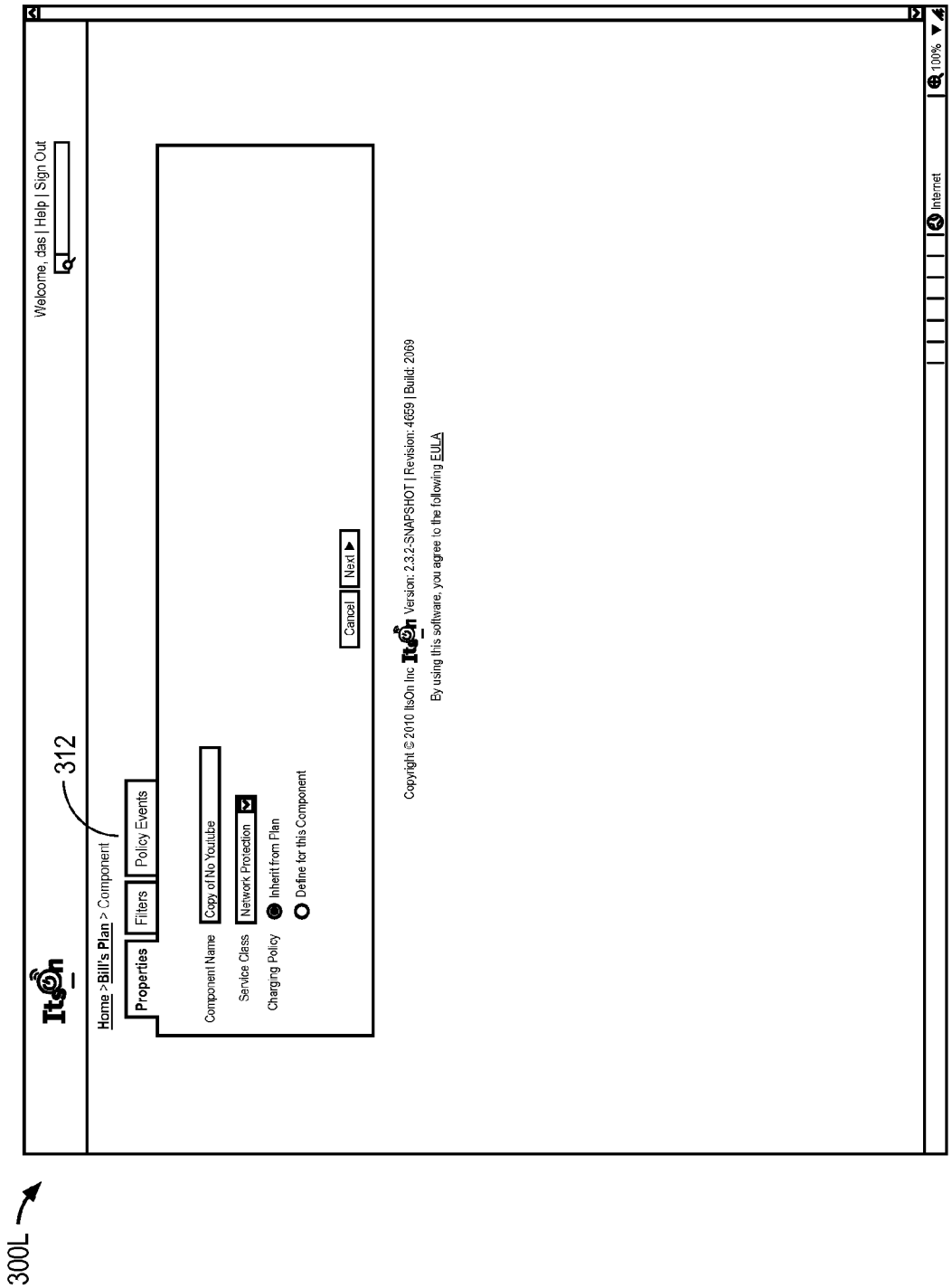
Figure 3M:
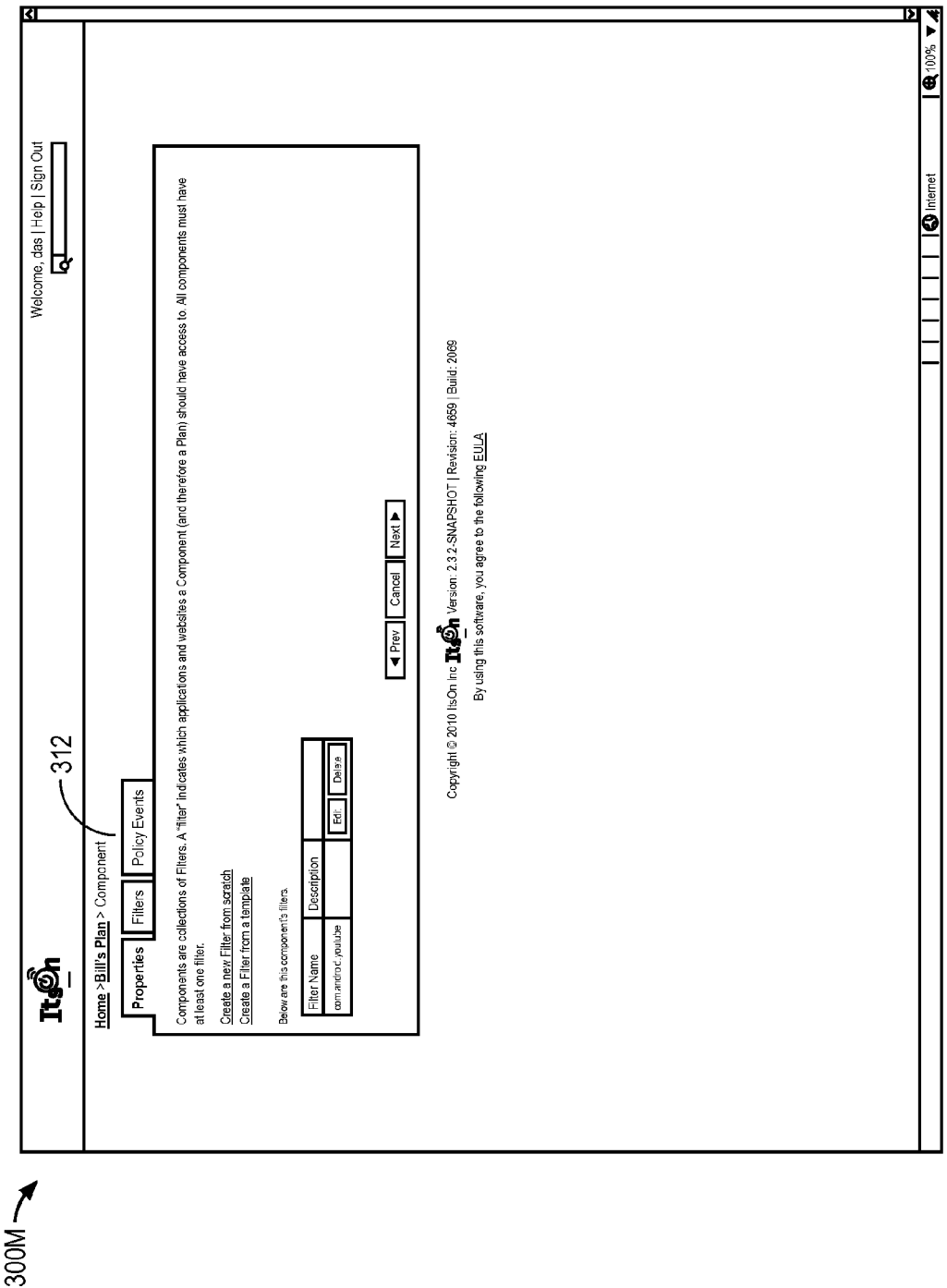
Figure 3N:
Figure 30:
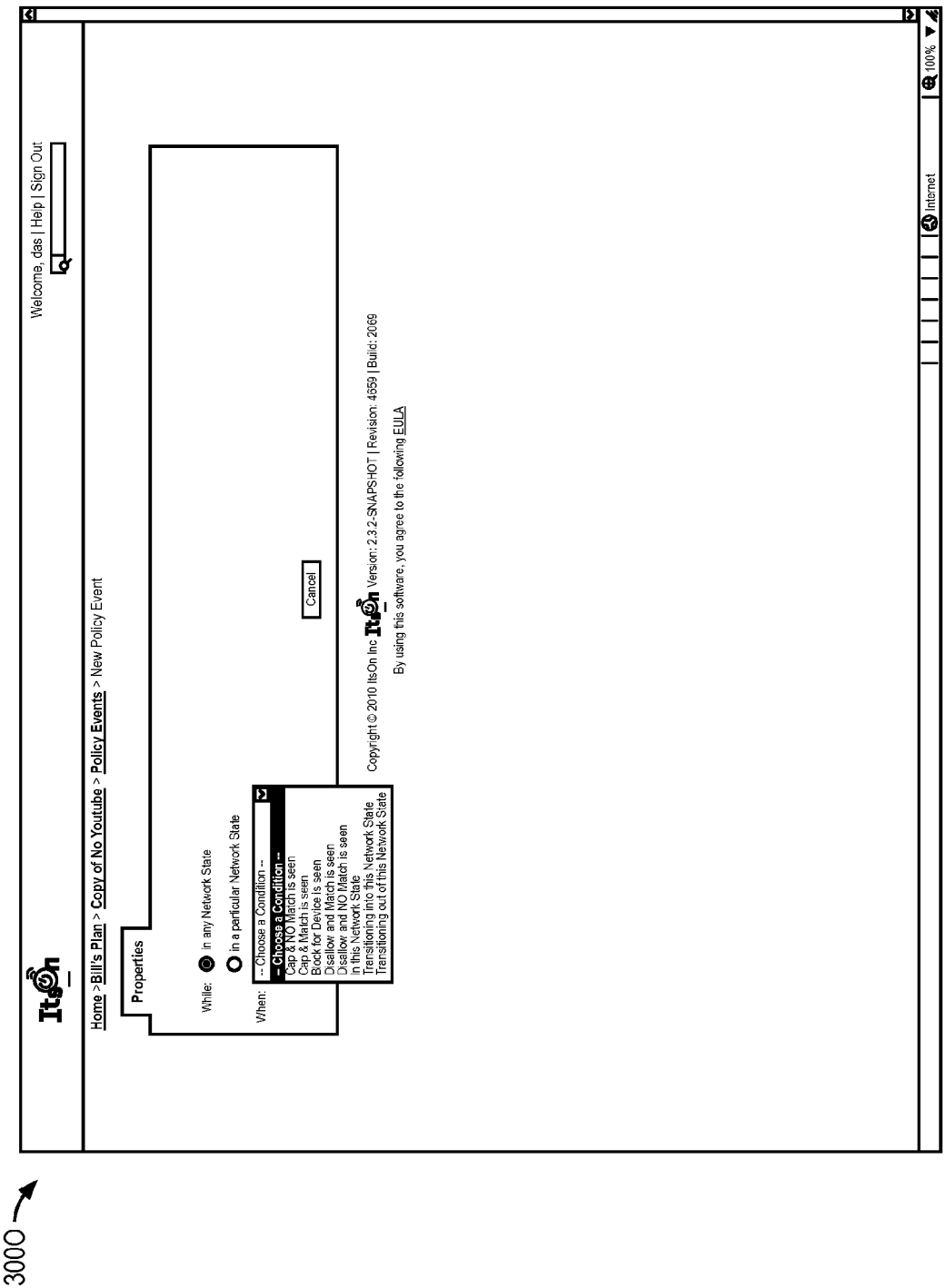
Figure 3P:
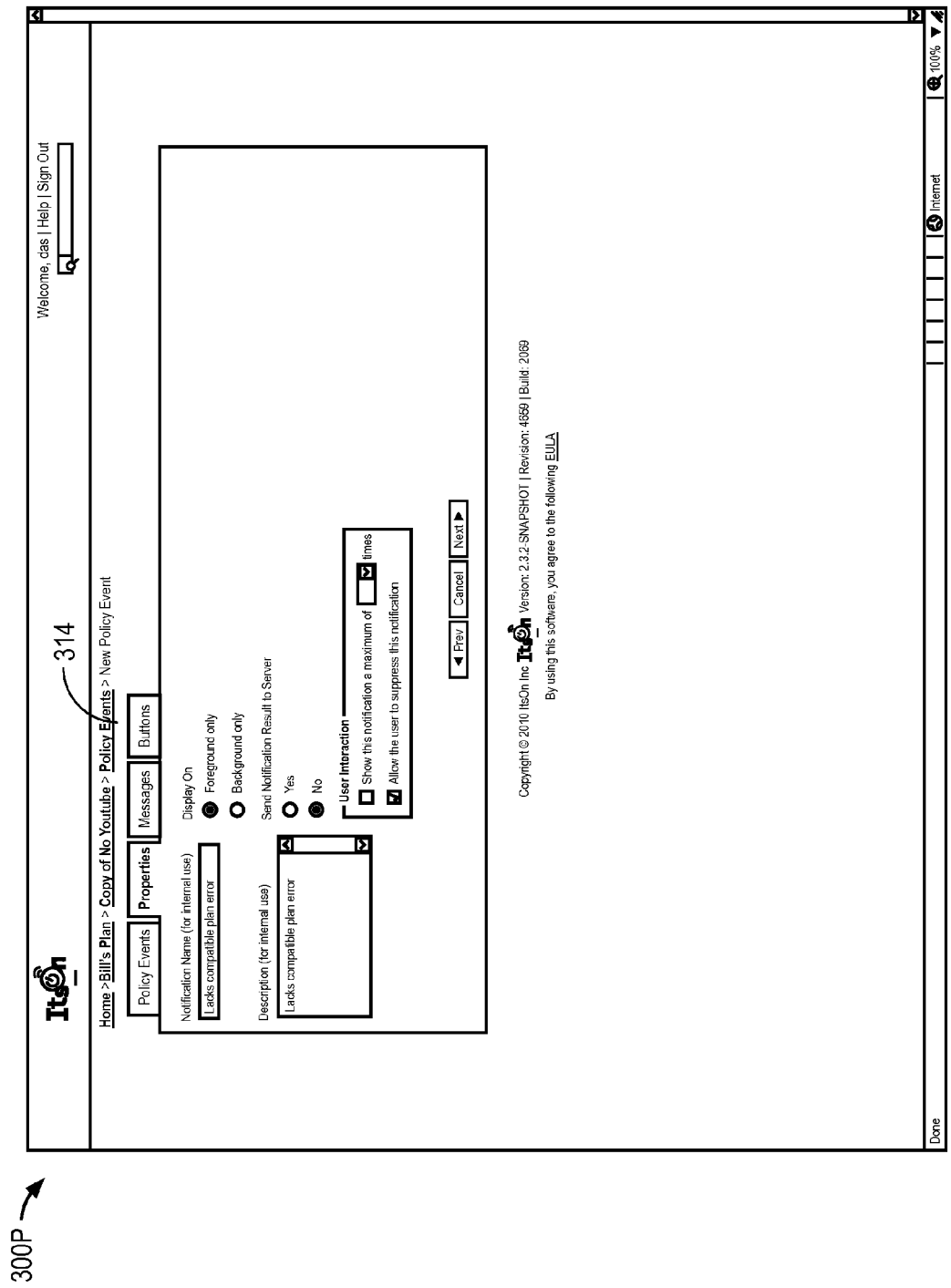
Figure 3Q:
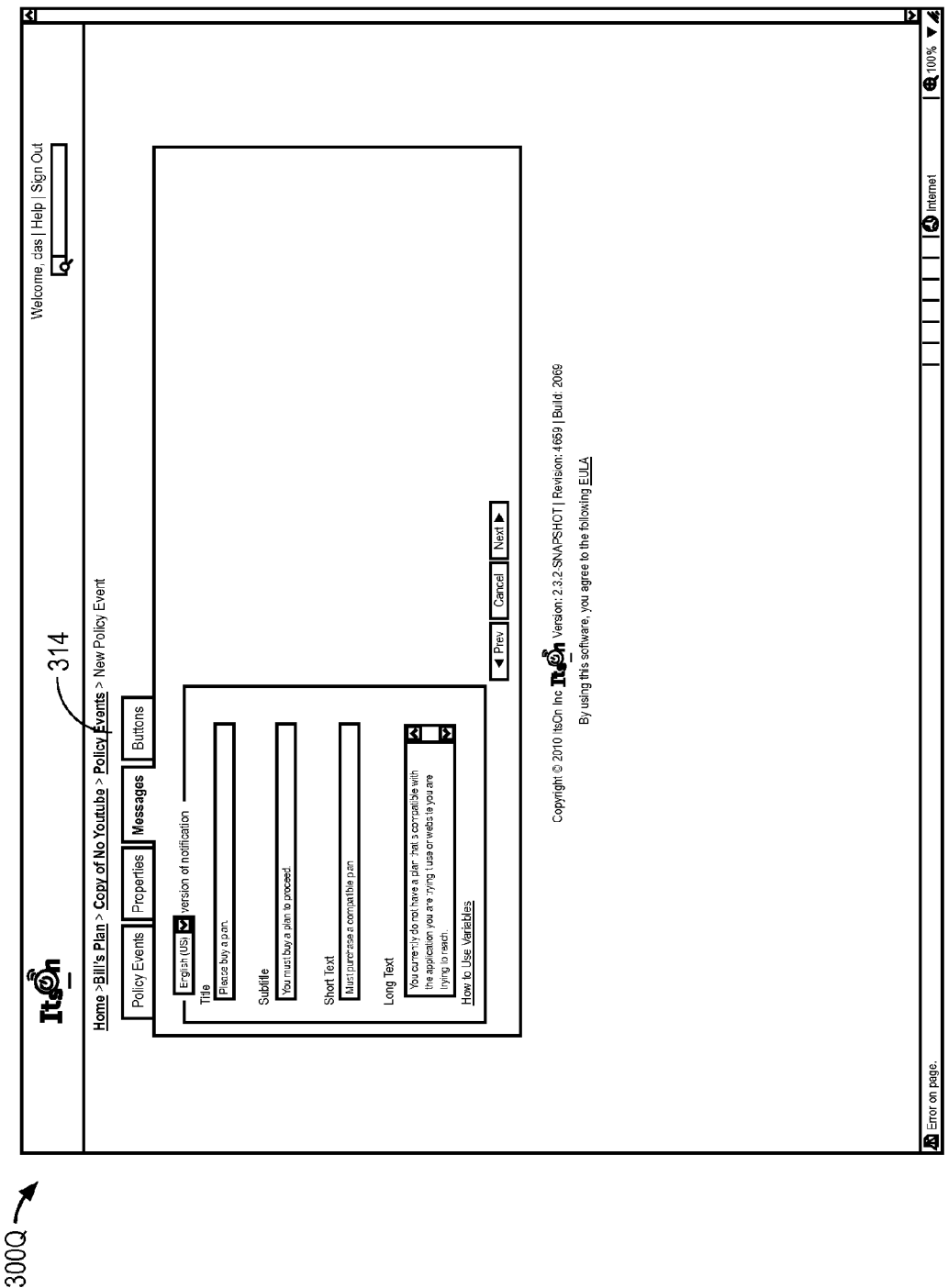
Figure 3R:
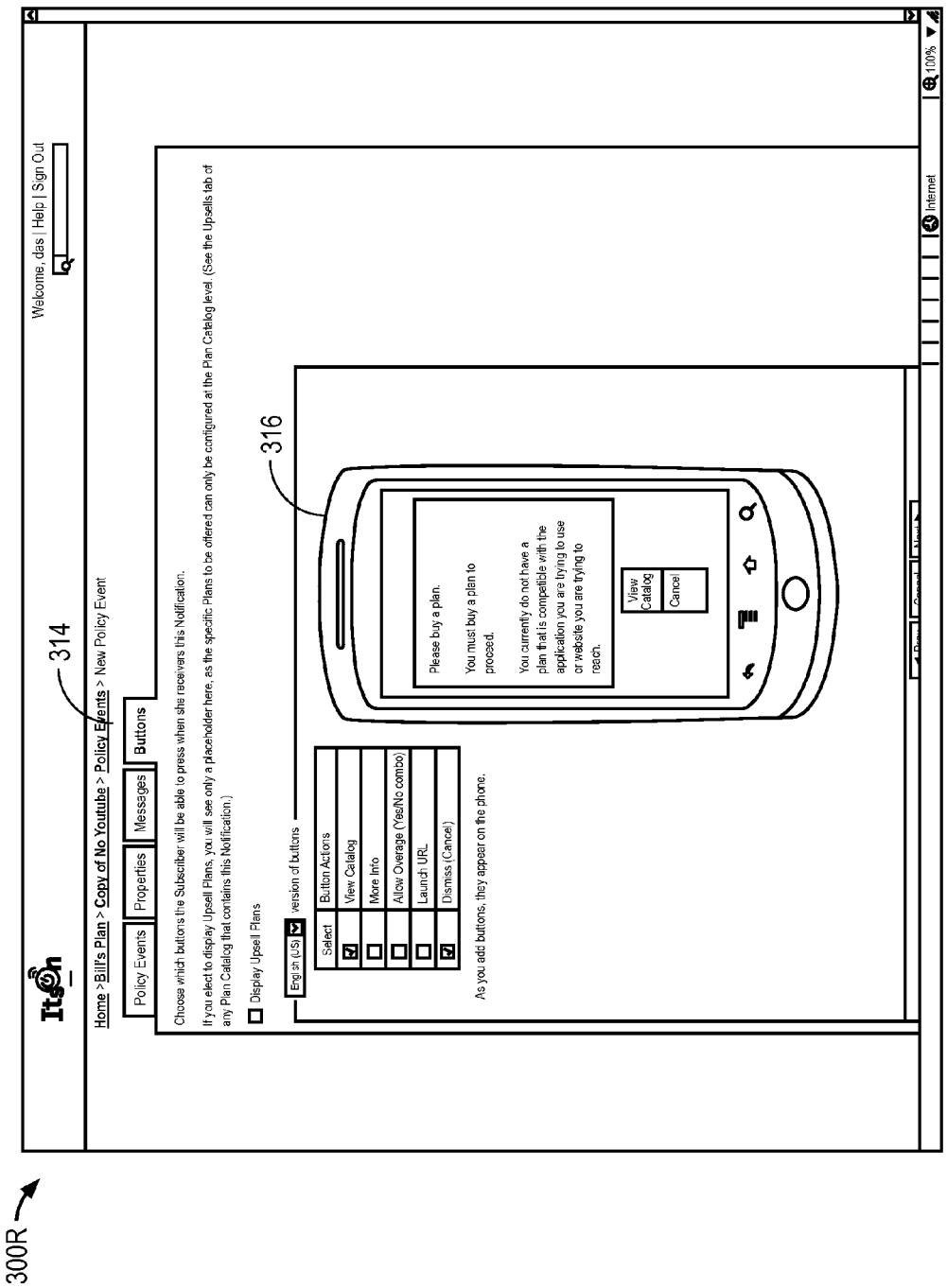

Selecting the plans button of the menu buttons field 306 and selecting a new plan brings a designer to screenshot 300I (FIG. 3I). In this specific implementation, the plan information includes a plan icon, a plan name, a plan short description, a plan description, a plan version, a plan type (e.g., sponsored, paid, or carrier), an "is default" checkbox, an "is repurchaseable" checkbox, a billing price, and a display price (in case the billing price is not the same as the billing price). A next screenshot 300J (FIG. 3J) enables entry of further information about the plan, including charging policy (e.g., based on data used or time spent, usage limits and overage allowances), billing policy (e.g., one-time or recurring, usage reporting, and pre- or post-billing) It is possible in this specific implementation to show a policy label on the device and include billing identifiers. A charging code can also be created or selected by the designer. A next screenshot 300K (FIG. 3K) includes an option to add components, either by creating a new component or cloning an existing component. In the example of FIG. 3K, three components have been added to the list of components for the plan, with explicit priorities 1, 2, and 3. Note that in this specific implementation, the number of tabs in the tab menu 310 increases as data is entered for the plan until the tab menu 310 includes a properties tab, a charging & billing tab, a components tab, a policy events tab, and a review tab.

When the designer selects a component, such as the "Copy of No Youtube," a component screenshot 300L (FIG. 3L) is displayed, which includes a tab menu 312 that includes a properties tab, a filters tab, and a policy events tab. (The tab menu 312 can also include a charging policy tab if a charging policy is defined for the component.) Selecting the properties tab from the tab menu 312 enables the designer to edit the component name, service class (e.g., carrier, network protection, sponsored, specialized application, market interceptor, parental control, open access, and post-bulk), and whether the component has a charging policy explicitly defined or inherits the charging policy from the plan. It may be noted that the service class could be characterized to include an "end-of-life" service class for when a subscriber has no remaining service plan options, but in this specific implementation the end-of-life setting is not listed as a service class (described later).

Selecting the filters tab from the tab menu 312 brings the designer to screenshot 300M (FIG. 3M), where filters can be chosen for a selected component (in this example, the "No Youtube" component). When the designer selects a filter to edit, the designer is brought to screenshot 300N (FIG. 3N), which facilitates editing of the filter name, description, whether the filter is associative only, whether the filter is "no-match," filtering parameters (e.g., filter by remote destination, filter by application, filter by target operating system, filter by content, filter by protocol, filter by port), and whether and how to display in a launcher widget.

Selecting the policy events tab from the tab menu 312 and creating a new policy event brings the designer to screenshot 300O (FIG. 3O) where the designer can select policy events based upon network state when certain conditions (e.g., cap & no match, cap & match, block for a device, disallow and match, disallow and no match, in this network state, transitioning into this network state, and transitioning out of this network state) are met. Continuing to the next screenshot 300P (FIG. 3P), the designer enters event properties, such as the name of the policy event, a description, whether to display notifications associated with the event in foreground or background, whether to send notification results to service, maximum number of times to send the notification, and whether the user can suppress future notifications. Note that in this specific implementation, the number of tabs in the tab menu 314 increases as data is entered for the policy event until the tab menu 314 includes a policy event tab, a properties tab, a messages tab, and a buttons tab.

Continuing to the next screenshot 300Q (FIG. 3Q), the designer enters message details, such as title, subtitle, short text, and long text. Clicking on "how to use variables" instructs the designer regarding what variables can be added to notifications, such as name of service plan, charging code name, filter (e.g., blocked, throttled, etc.), percentage of plan utilization in bytes or time, application name, overage limit, current overage, throttle rate, date when cycle will refresh, duration of cycle, name of plan matched after current plan reached a cap, name of plan matched after disallow matched, current roaming state, current active network, or host or domain, to name several.

Continuing to the next screenshot 300R (FIG. 3R), the designer determines whether to display upsell plans and enters buttons to enable subscriber responses to the notification (in this example, the view catalog and cancel buttons are enabled). The phone image 316 is intended to illustrate how the message and buttons will appear within a device, though the image will not necessarily be a perfect representation.

Figure 3S:
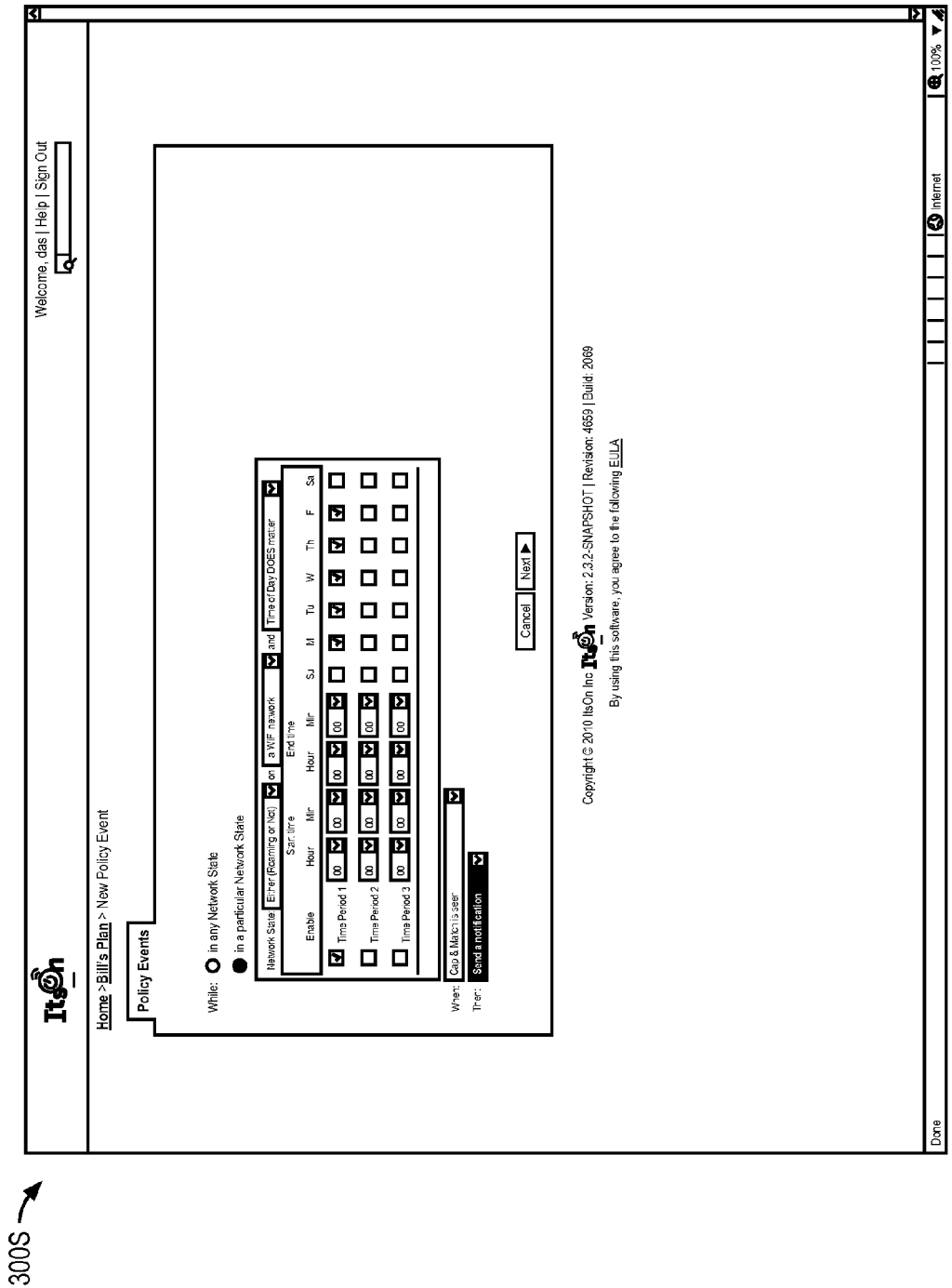

When returning to the plan level (see FIG. 3K), the designer can select the policy events tab from the tab menu 310 to display screenshot 300S (FIG. 3S) and enter policy events at the plan level. It may be noted that the policy events described with reference to the examples of FIGS. 3O to 3R were associated with an individual component. In the example of FIG. 3S, a policy event associated with the network state "on a WiFi network" and on a Monday through Friday causes a notification to be sent when a cap and match is seen. Other policy event parameters can be set in a manner similar to those described with reference to FIGS. 3P to 3R.

Figure 3T:

Upon completion of the plan described with reference to FIGS. 3I to 3S, the designer can select the review tab from the tab menu 310 (see, e.g., FIG. 3K) to display screenshot 300T (FIG. 3T). It may be noted that the review screen is "cut off," which prevents observation of policy events, but this is not necessary to understand the nature of the review screen. In this example, the plan, which is stored as a "draft" plan, can be published for beta testing (and submitted for approval).

Figure 3U:
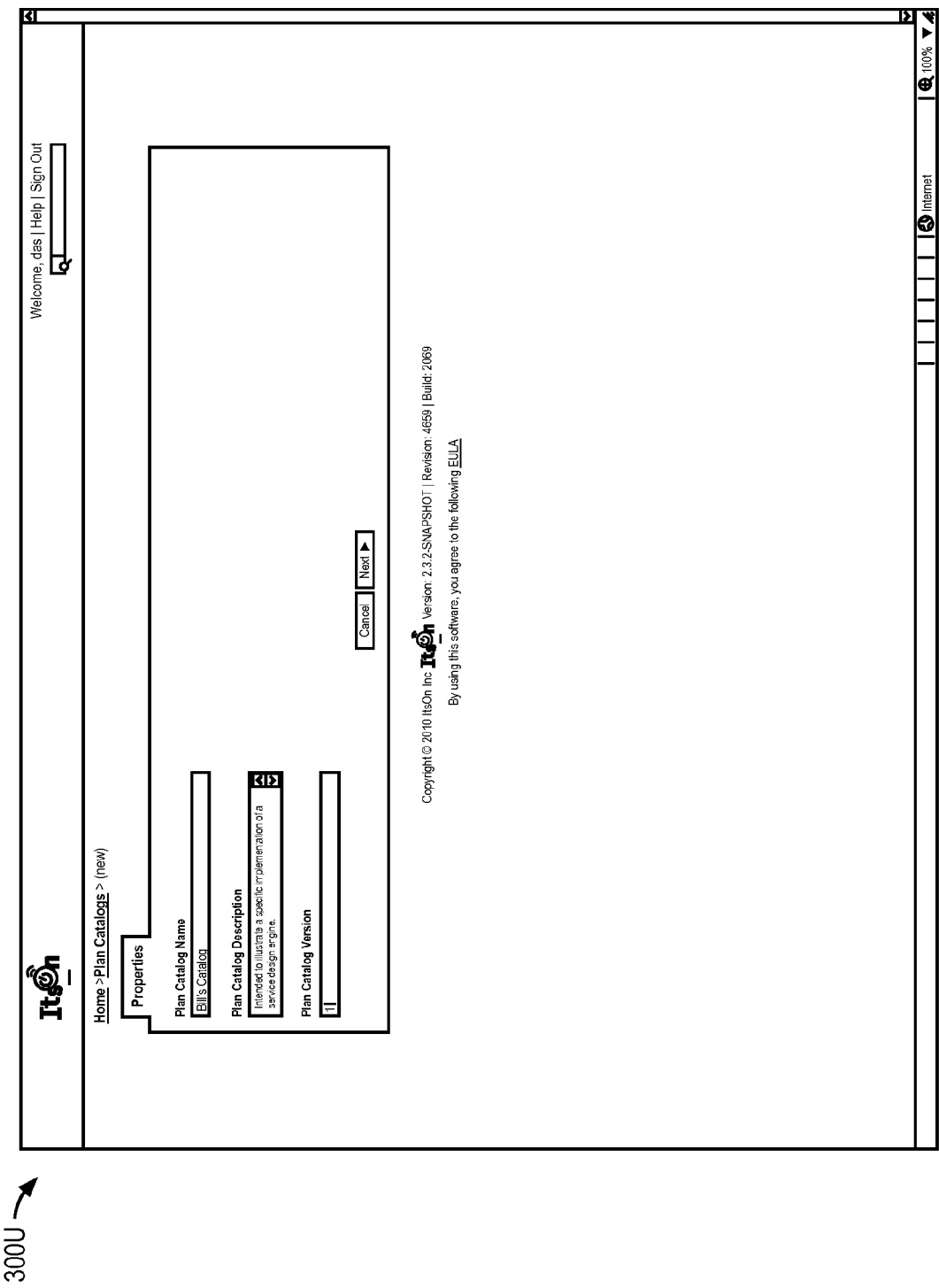
Figure 3V:
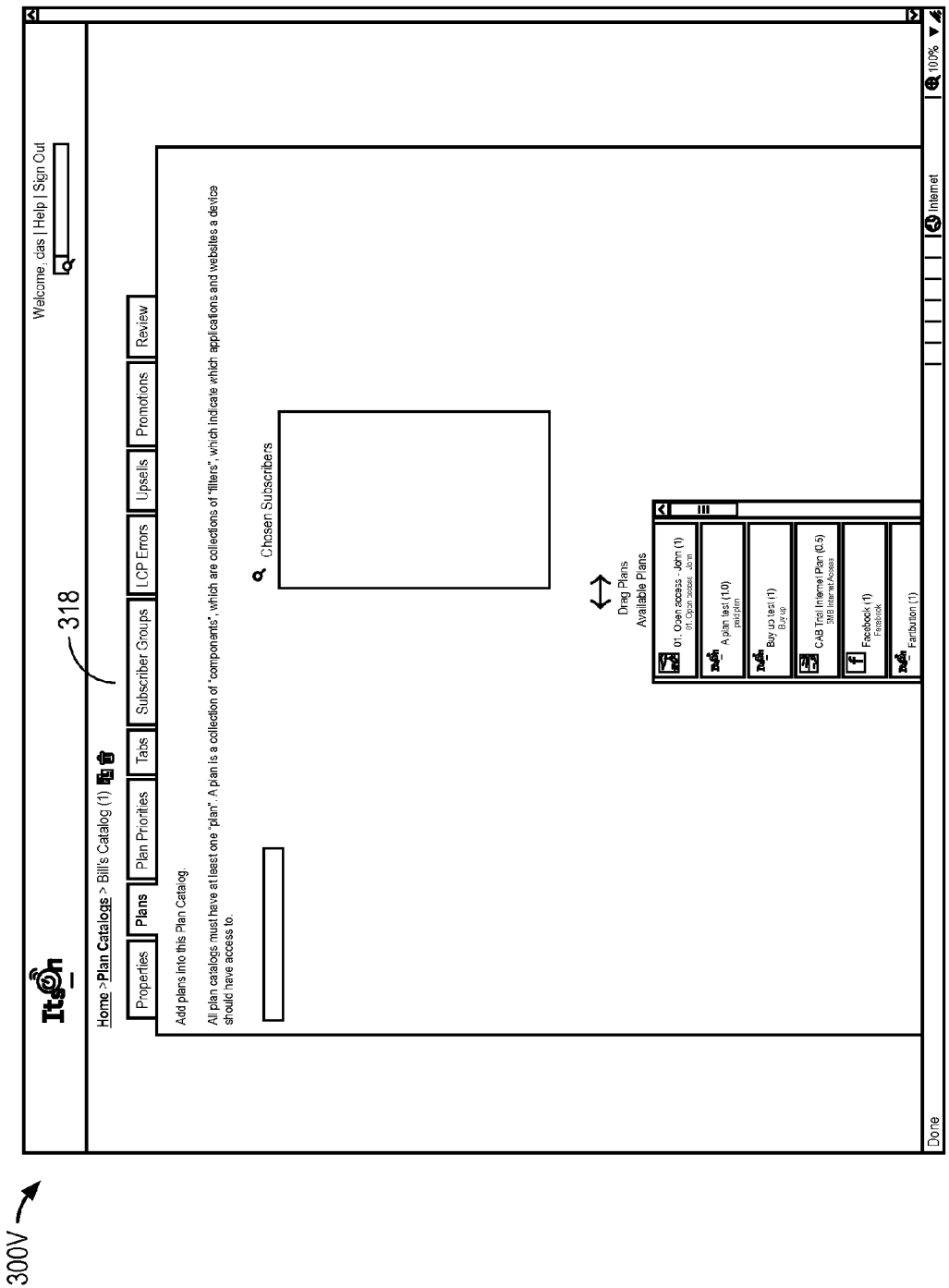
Figure 3W:
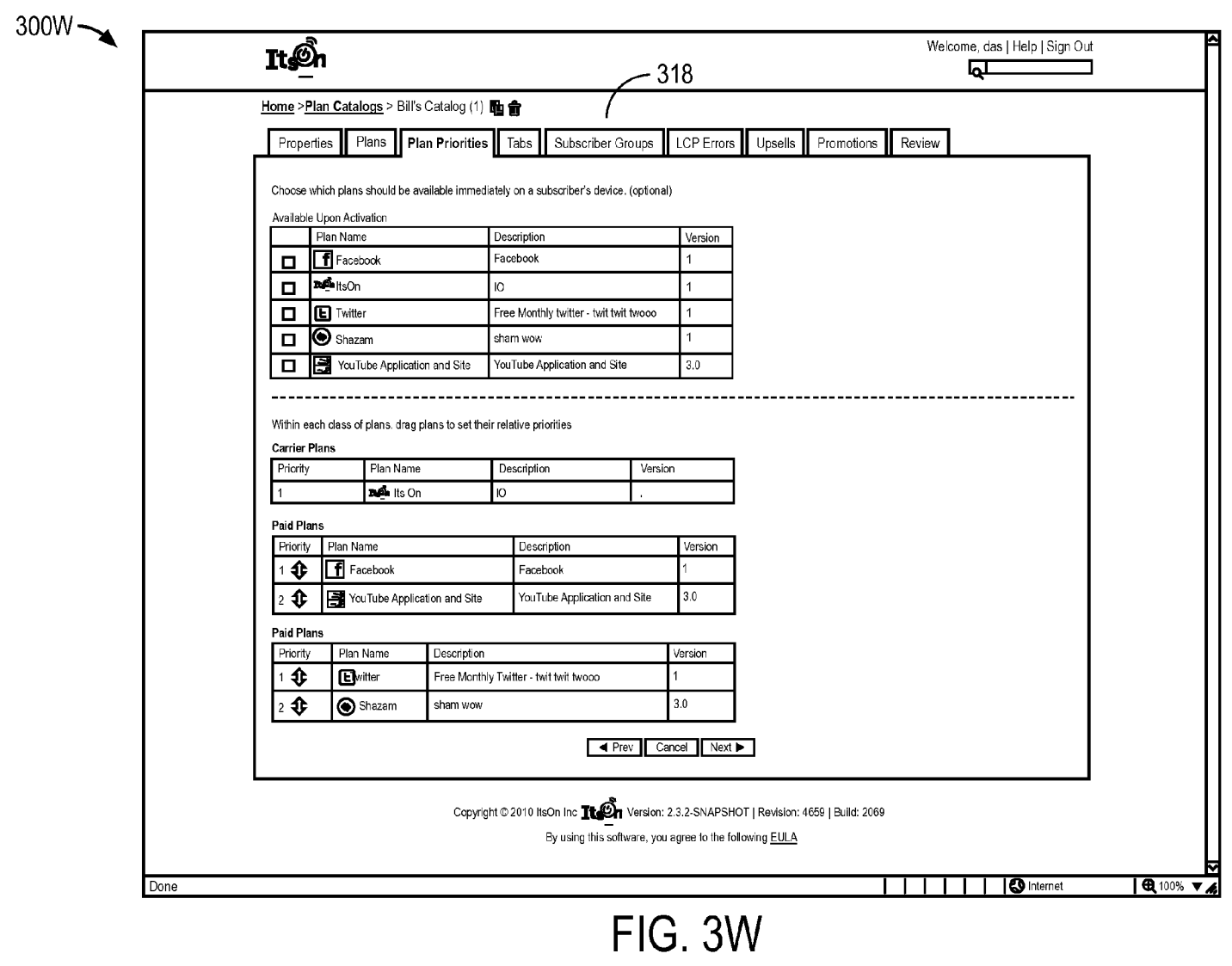
Figure 3X:
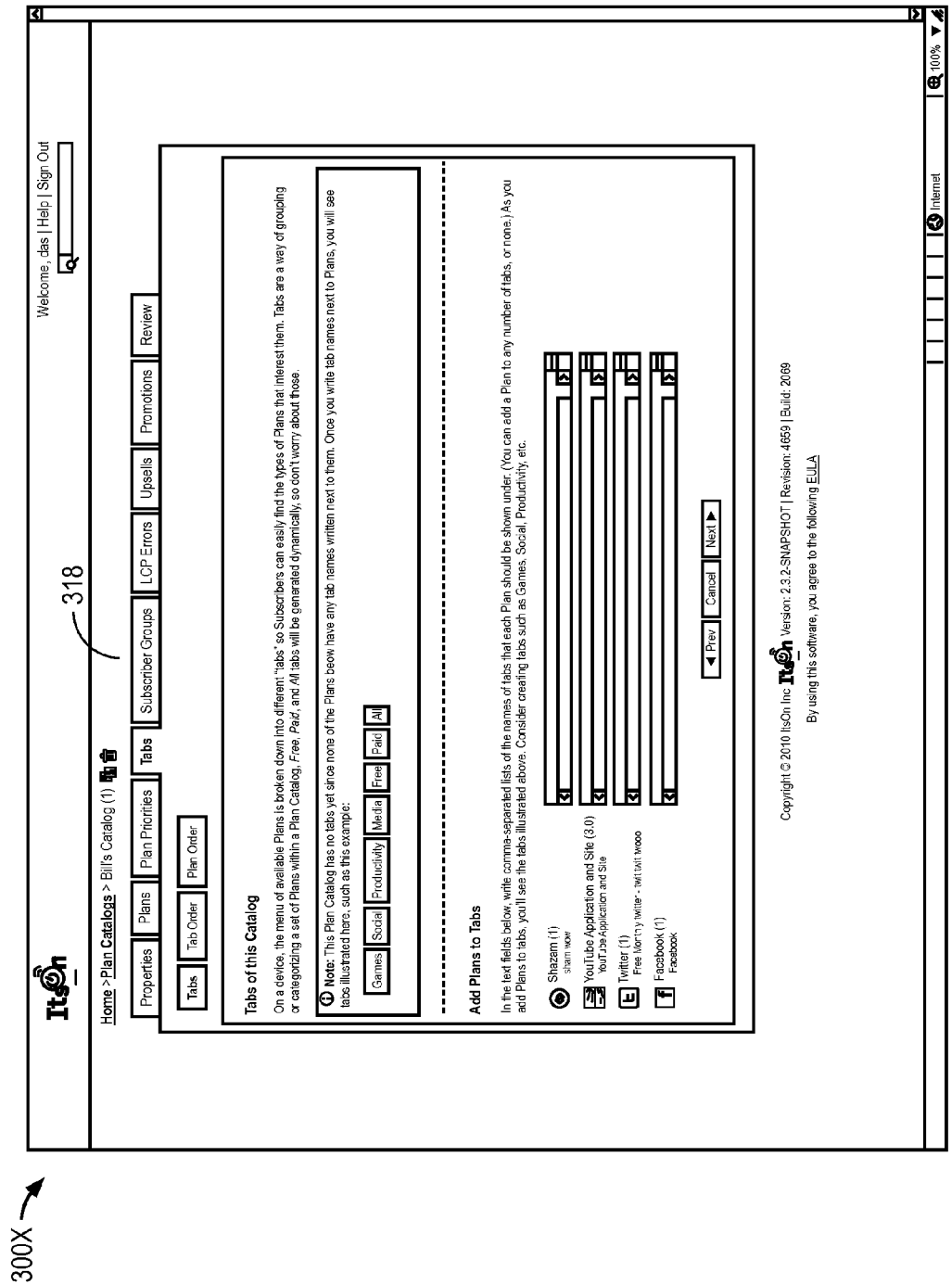
Figure 3Y:
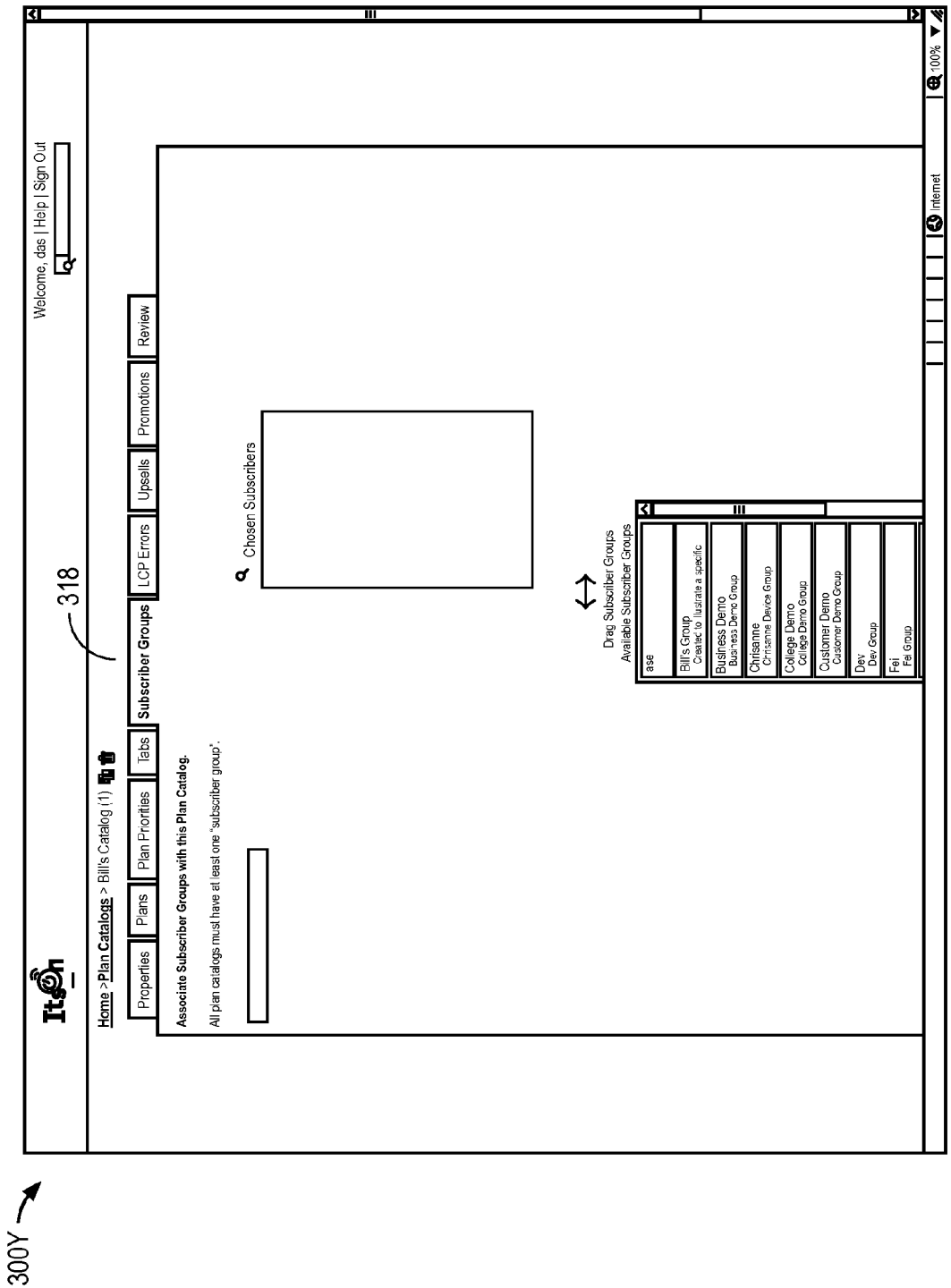

Referring back to the home page (see, e.g., FIG. 3A), selecting the plan catalogs button from the menu buttons field 306 brings a designer to screenshot 300U (FIG. 3U). There, the designer can enter a plan catalog name, a plan catalog description, and a plan catalog version (or select a plan catalog from plan catalogs in a plan catalogs datastore). When the designer clicks "next," the tab menu expands into a tab menu 318, which includes the properties tab, a plans tab, a plan priorities tab, a tabs tab, a subscriber groups tab, an LCP error tab, an upsells tab, a promotions tab, and a review tab, as is illustrated in the example of FIG. 3V. Under the plans tab, the designer can drag plans into a plan catalog.

When the designer selects the plan priorities tab from the tab menu 318, the designer is brought to screenshot 300W (FIG. 3W), where the plans of the plan catalog can be prioritized. The plans are prioritized per plan type (e.g., carrier plan, paid plan), and if there are multiple plans within a plan type, the plans can be prioritized within the plan types, as well. Some or all of the plans can also be designated as available upon activation. With versioning, subscribers having a previous plan version can continue to use the previous version, while new subscribers can be offered the most recent version. If an old plan expires, a subscriber can be offered the most recent version, as well.

When the designer selects the tabs tab from the tab menu 318, the designer is brought to screenshot 300X (FIG. 3X), where the designer can organize tabs for display of plans. A subscriber's device can display, for example, one or more tabs such as games, social, productivity, media, free, paid, and all, and under the tabs the various plans can be listed in an order that is determinable by the designer.

When the designer selects the subscriber groups tab from the tab menu 318, the designer is brought to screenshot 300Y (FIG. 3Y), where the designer can drag and drop subscriber groups.

A Lacks Compatible Plan (LCP) error occurs when a traffic event is received for which there is no active service plan. LCP errors can be treated as a particular kind of policy event. As when designating the parameters of policy events, when the designer selects the LCP errors tab from the menu 318, the designer has options similar to those described above with reference to FIGS. 3P to 3R. That is, the designer can choose applicable end-of-life properties, messages, and buttons.

Upsells occur when offered from a component, plan, or plan catalog, and can be responsive to traffic events (e.g., an upsell for cheaper network service when using facebook applications can occur when a subscriber consumes more expensive network services to use facebook applications) or other events. When the designer selects the upsells tab from the menu 318, the designer can edit upsell opportunities offered from, e.g., notifications within a plan catalog or any of its plans or components. Upsells can be edited much like policy events (e.g., properties, messages, and buttons).

Figure 3Z:
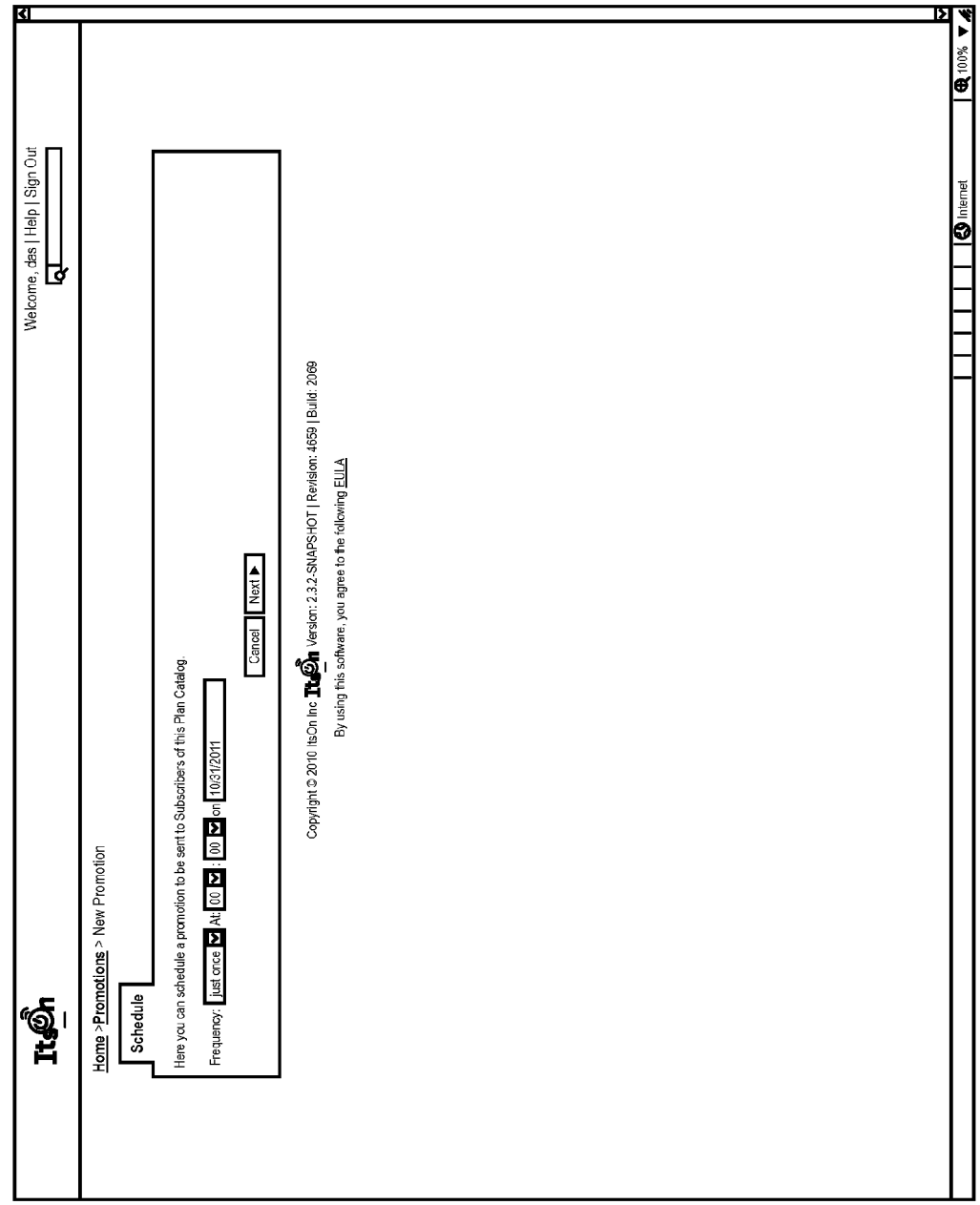
Figure 3A:
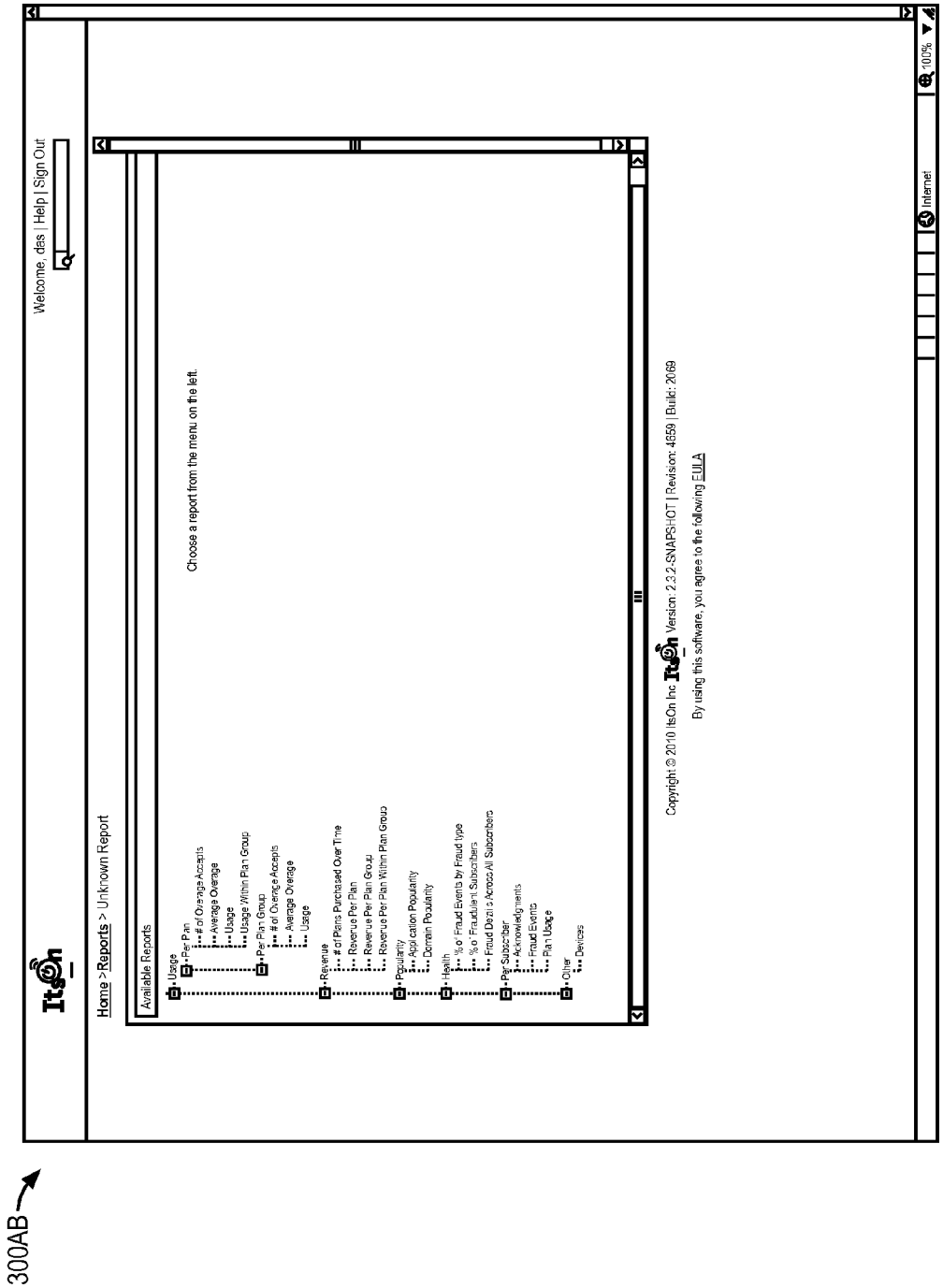

Promotions can be offered once or periodically. When the designer selects the promotions tab from the menu 318, the designer can edit a frequency of a promotion in screenshot 300Z (FIG. 3Z). Promotions can be edited much like policy events (e.g., properties, messages, and buttons).

When the designer selects the review tab from the menu 318, the designer can review the plan catalog as is illustrated in screenshot 300AA (FIG. 3AA).

Referring back to the home page (see, e.g., FIG. 3A), selecting the templates button from the menu buttons field 306 enables a designer to work on filter templates. Because components can have versions, it can be desirable to create templated filters that, when placed in a component, automatically create a copy of the templated filter. That way, when the filter is changed for one version, it is not changed for another. It is also possible to simply reuse a filter in components, in which case if the filter is changed, it is changed for all of the components into which it was reused.

Selecting the reports button from the menu buttons field 306 enables a designer to review reports. FIG. 3AB depicts a screenshot 300AB with reports that are broken into several categories including, usage, revenue, popularity, health (fraud), per subscriber, and other. Reports are generated using information that is available from datastores of the service design system, which can include data in notifications from subscriber devices or, more generally, access networks.

Figure 4:
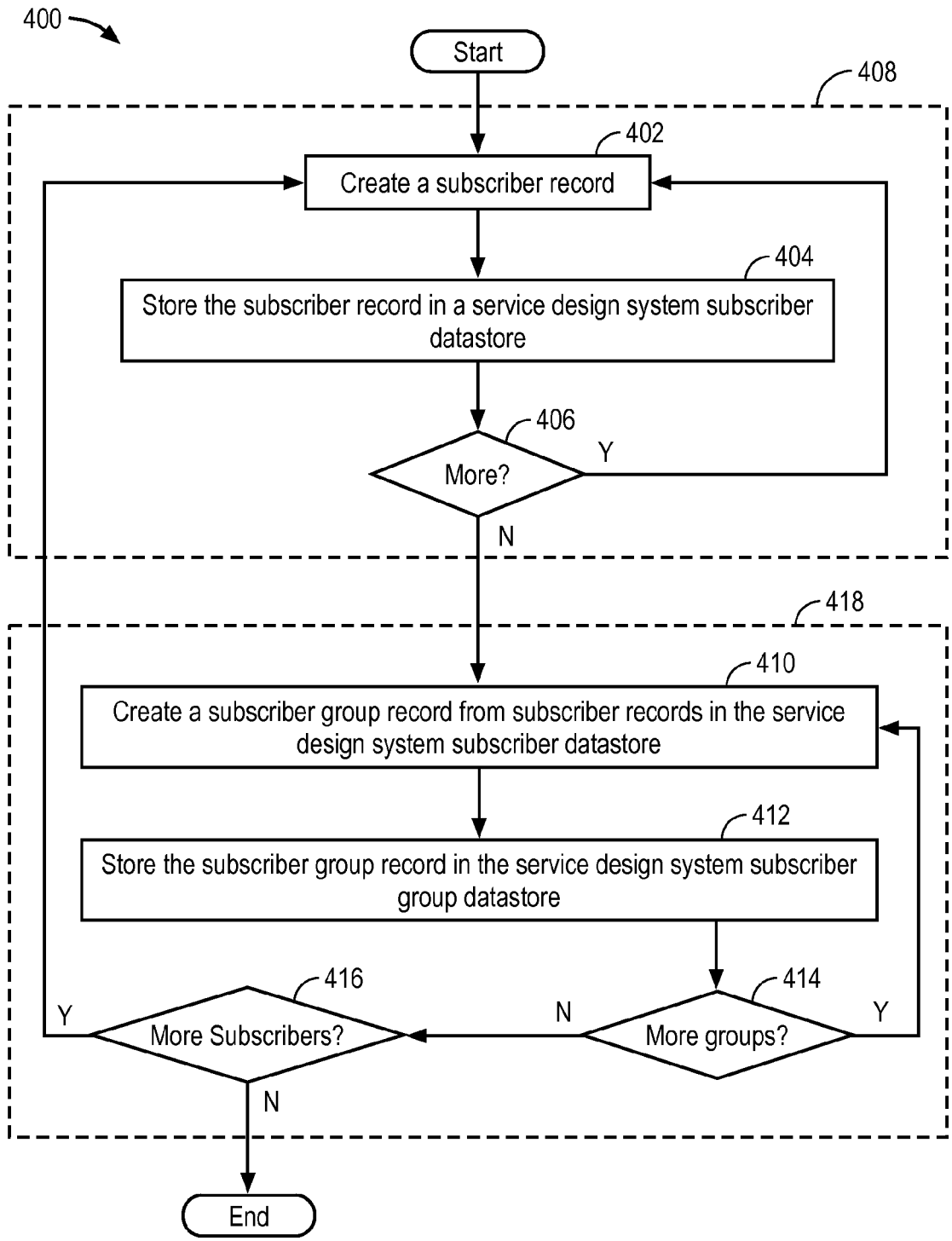
FIG. 4 depicts a flowchart of an example of a method for creating subscriber groups.

FIG. 4 depicts a flowchart 400 of an example of a method for creating subscriber groups. This flowchart and other flowcharts are depicted in the figures of this paper as serially arranged modules. However, modules of the flowcharts may be reordered or arranged for parallel execution as appropriate.

In the example of FIG. 4, the flowchart 400 starts at module 402 with creating a subscriber record. The term "record" as used in this paper can refer to a data structure of any applicable format saved in a data store. A subscriber record can include such information as device name, owner name, EID (e.g., IMSI or Country Code+Operator Code+MIN), device type, subscriber group, locale, phone number (e.g., MSISDN or MDN), operating system version, CDMA subscriber details (e.g., Device ID/MEID and/or MSID), and GSM/LTE subscriber details (e.g., IMSI and/or IMEI). Generally, more information will enable designers to group subscribers together in different ways (e.g., by demographic information), which can result in improved accept rates for targeted notifications.

In the example of FIG. 4, the flowchart 400 continues to module 404 with storing the subscriber record in a service design system subscriber datastore. Datastore is a general term that can be applied to almost any data storage receptacle. For the purpose of this example, however, a specific format is expected. It is possible, and even likely, that the service design system subscriber datastore (and the service design system subscriber group datastore, mentioned later) will have an implementation- and/or configuration-specific, though not necessarily proprietary, format. The subscriber record is expected to have such a format appropriate for storage in the expected format of the service design system subscriber datastore. In the event subscriber data is received in the service design system in a format other than the expected format, the subscriber record is created (402) in the expected format and populated with some or all of the received subscriber data, and potentially with additional data that is obtained by the service design system (e.g., from a datastore or through an admin or other input process).

In the example of FIG. 4, the flowchart 400 continues to decision point 406 where it is determined whether there is additional subscriber records to be created. If it is determined that there is additional subscriber records to be created (406-Y), then the flowchart 400 returns to module 402 and continues as described previously for the next subscriber record. A "while loop" 408 comprising the modules 402 and 404 and decision point 406 is encompassed in the example of FIG. 4 with a dotted box. The while loop 408 can be executed in batch-mode by importing subscriber data from a data source. The format of the subscriber data can be restricted to the format of the service design system subscriber datastore or formats that a service design engine is capable of converting into the appropriate format. Alternatively or in addition, the while loop 408 can be executed through an input process one subscriber at a time, either when receiving data from a potential or current subscriber, or from an artificial or human agent of the service design system.

If, on the other hand, it is determined that there are no additional subscriber records to be created (406-N), then the flowchart 400 continues to module 410 with creating a subscriber group record from subscriber records in the service design system subscriber datastore. A subscriber group record may or may not have a substantial amount of metadata. For example, a subscriber group record can be assigned a name and description to make it easier to use the subscriber group record when creating service plans for subscriber groups. An alternative field of the subscriber group record is common subscriber data, though this could also be considered part of the description.

In the example of FIG. 4, the flowchart 400 continues to module 412 with storing the subscriber group record in the service design system subscriber group datastore. The issues related to format of subscriber group records are similar to those described previously with reference to module 404.

In the example of FIG. 4, the flowchart 400 continues to decision point 414 where it is determined whether there is additional subscriber group records to be created. If it is determined that there is additional subscriber group records to be created (414-Y), then the flowchart 400 returns to module 410 and continues as described previously for the next subscriber group record. A "while loop" 418 comprising the modules 410 and 412 and decision points 414 and 416 is encompassed in the example of FIG. 4 with a dotted box. The while loop 416 can be executed in batch-mode by importing subscriber records from the subscribers datastore. Alternatively or in addition, the while loop 418 can be executed through an input process one subscriber at a time, either when receiving data from a potential or current subscriber, or from an artificial or human agent of the service design system. For example, an admin could drag and drop available subscribers into a subscriber group, and the service design engine can create a subscriber group record from available subscribers that were added to the subscriber group in this way.

In a specific implementation, a batch of subscriber data can be imported into the service design system and used to populate a subscriber group. It may be noted that the logical flow in the flowchart 400 is to create subscriber records (412) and store the subscriber records (404) repeatedly (406) and then create a subscriber group (410) from subscriber records in the service design system subscriber datastore. However, it is not necessary for the import procedure to create each subscriber record before creating the subscriber group.

In a specific implementation, when a subscriber record with a characteristic that identifies the subscriber record as part of an existing subscriber group record is created and stored in the service design system subscriber datastore, that subscriber may or may not automatically be added to the existing subscriber group record (or an update procedure could add any subscriber records having the relevant characteristics that were not previously added to the subscriber group record when initiated by a subscriber or agent of the service design system).

Referring once again to decision point 414, if it is determined that there are no additional subscriber group records to be created (414-N), then the flowchart 400 continues to decision point 416 where it is determined whether there are additional subscriber records to be created. If it is determined that additional subscriber records are to be created (416-Y), then the flowchart 400 returns to module 402 and continues as described previously. If, on the other hand, it is determined that no additional subscriber records are to be created (416-N), then the flowchart ends. It may be noted that in a typical implementation, the method could be restarted at module 402 or module 410 if there is an other subscriber record or another subscriber group record to be created. Therefore, the end is a logical end to the flowchart 400, but the process can continue as needed.

Figure 5:
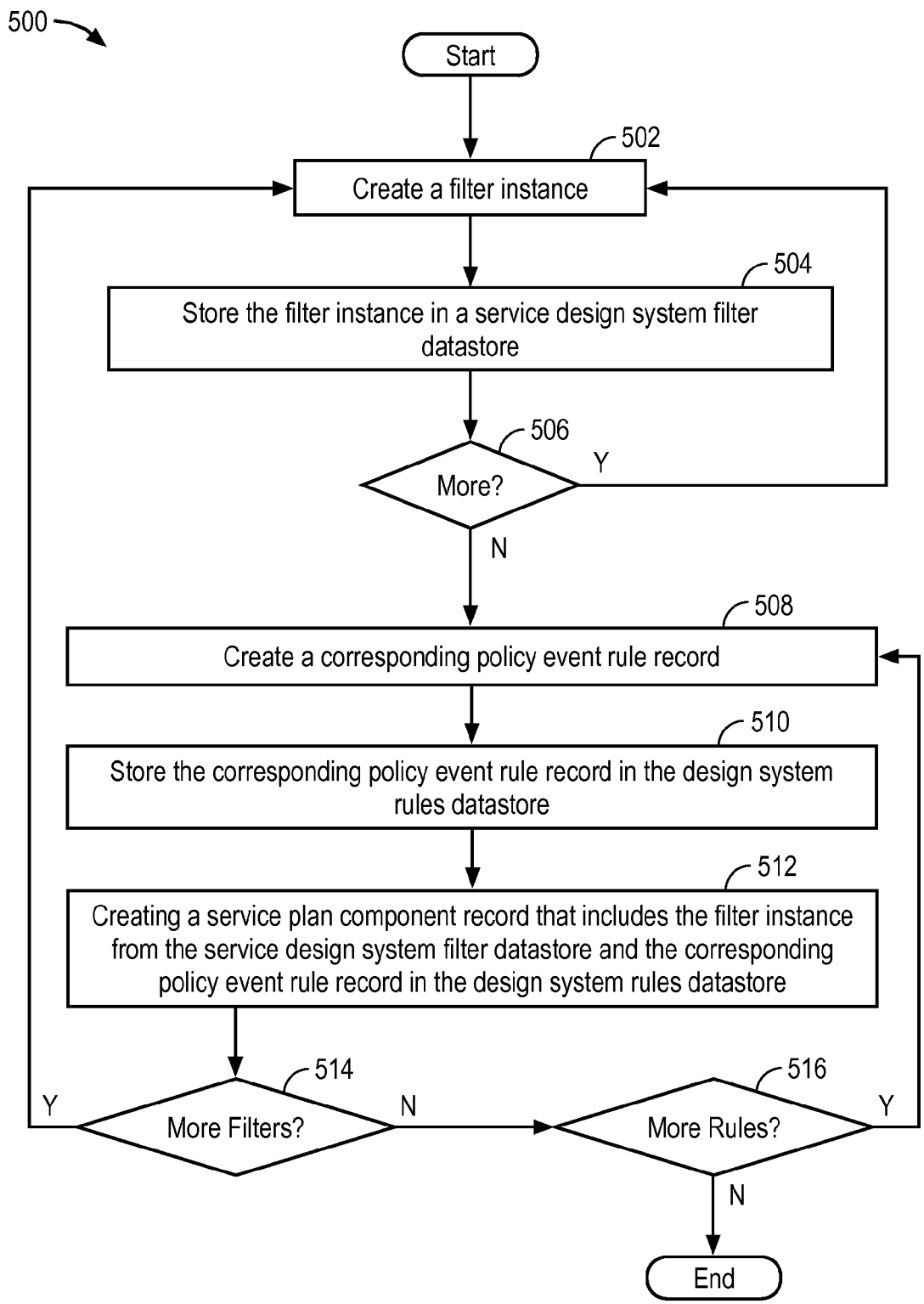
FIG. 5 depicts a flowchart of an example of a method for creating service plan components.

FIG. 5 depicts a flowchart of an example of a method for creating service plan components. In the example of FIG. 5, the flowchart 500 starts at module 502 with creating a filter instance. A filter record is created by this action, but the term "instance" is used because of the way in which a filter is used in the system. Specifically, a filter can have global characteristics in the sense that if two service plan components incorporate the filter instance and the filter instance is later changed, the changes are applied to both of the service plan components. Thus, there is a single filter instance that is used in multiple components. Alternatively, a filter instance can be created from a template in the sense that if two service plan components incorporate the filter instance and a change is made to one of the filter instances, the changes are not applied to the other filter instance. Thus, each application of the filter template is a separate filter instance. In a specific implementation, filter instances can be explicitly set to be either global or local. It is also possible to create a global filter template (such that changes to the global filter template are applied to all instances of the filter) as well as local filter instances that can be changed within service plan components without the changes cascading through they system.

In the example of FIG. 5, the flowchart 500 continues to module 504 with storing the filter instance in a service design system filter datastore. The service design system filter datastore may have explicit data structure requirements for the filter instance, but will at least include a traffic instance that matches the filter. In a specific implementation, the traffic instances can include traffic events that include a specified remote destination (e.g., a domain or IP address), a specified application (identified by, e.g., name, hash, certificate, signature, other secure ID, etc.), a specified operating system, specified content, a specified protocol (e.g., TCP, UDP, TCP/UDP), or a specified port number. Domain filters can be specified to allow references to be loaded and/or to use associative filtering (e.g., by seconds or by bytes of data). Application filters can be specified to validate applications. Each filter instance stored in the service design system filter datastore can include a filter name and description to make use of the filter easier for human agents.

In a specific implementation, filter instances can be specified to be match or no match filters. A "match" filter does not prevent attempts to match a traffic event to another filter. A "no match" filter prevents a network traffic inspection engine from attempting to match a traffic event to another filter. In a sense, this applies an action to a filter, and the match and no match aspect of a filter can be treated as a filter aspect or an associated action aspect, whichever is more applicable in a given context.

In the example of FIG. 5, the flowchart 500 continues to decision point 506 where it is determined whether there are more filter instances to create. If it is determined that there are more filter instances to create (506-Y) then the flowchart 500 returns to module 502 and continues as described previously for a next filter instance.

If, on the other hand, it is determined that there are no additional filter events to be created (506-N), then the flowchart 500 continues to module 508 with creating a corresponding policy event rule record. The policy event rule enables a service plan component to determine what network state (including any network state) is applicable to a policy event. It may be noted that in a specific implementation, the rules can be created without a corresponding filter (e.g., as a stand-alone rule). The policy event rule becomes applicable when a filter matches a traffic event in a way that is specified by the rule. For example, if a traffic event matches a filter instance such that a network state is detected (e.g., in a network state, transitioning into the network state, or transitioning out of the network state), then a rule that specifies these conditions is applicable. Other examples of specified conditions are when a traffic event is allowed, blocked, throttled, delayed, or deferred, each which could be specified to be match or no match.

Policy rules can also define caps, which are met when a count of, e.g., time or bytes, reaches the defined cap. (It may be noted that a count can be considered part of a notification policy.) When a capped policy event has a counter increment to its defined cap, the filter can change from, e.g., allow (when the cap has not been exceeded) to block, throttle, delay, or defer (when the cap has been exceeded). The capped policy event could similarly go from, e.g., throttle (when the cap has not been exceeded) to throttle more (when the cap has been exceeded) or some other combination of filtering activity before and after a cap has been exceeded.

In the example of FIG. 5, the flowchart 500 continues to module 510 with storing the corresponding policy event rule record in the design system rules datastore. Policy event rules records can include one or more of a traffic control policy, a notification policy, and a charging policy. Traffic control policy rules are associated with the type of filter to which the traffic control policy rule corresponds (e.g., allow, block, throttle, delay, defer, or take no action). The applicable traffic control can be function of network state, device state, service plan usage state, etc.

Notification policy rules are associated with sending information to a party, such as a subscriber, human or non-human agent of a service design system, a program, etc. In a specific implementation, a notification policy record can be given a name and description, and notification details such as whether the notification is in the foreground or background, the destination of the notification (e.g., to a subscriber, to a server, or to some other party), and interaction that is enabled in association with the notification (e.g., number of times the notification is displayed before it is no longer displayed to a user or an option that enables a user to suppress the notification in the future). Notifications to subscribers and human agents of the service design system will typically include human-readable content, such as a title, subtitle, short text, and/or long text description. Notifications to non-human agents may or may not include the same information, and can include instruction sets that make little or no sense when read by a human. In a specific implementation, notifications can include variables that insert data from datastores, about network state, or other data that can vary over time. A service design agent can include selection options (e.g., buttons) in a notification that enable the recipient to provide feedback or instructions. Useful selection options might include, for example, upsell plans, a service offerings catalog, a request for more information, an indication that overage is desired, launching a URL, and/or dismiss. In a specific implementation, a service design system agent can use a graphical user interface that displays a mobile device with the notification as it would be displayed (perhaps without some icons or other features of the mobile device) to make review of the notification convenient.

Charging policy rules are associated with determining how much to bill for usage (in time or bytes). In a specific implementation, a service plan component can inherit charging policy from a plan in which the component is integrated. So, strictly speaking, in such an implementation, a service plan component record need not have a charging policy rule, though when deployed it can have a charging policy rule due to inheritance. Where the charging policy is defined for a component, the charging policy can be based on data used or time, may or may not have an overage allowance (with an optional maximum overage usage), and will have a rate, which can be specified with a charging code.

In the example of FIG. 5, the flowchart 500 continues to module 512 with creating a service plan component record that includes the filter instance from the service design system filter datastore and the policy event rule record in the design system rules datastore. It may be observed that a service plan component will always have a filter and a policy event rule. Assuming the traffic control policy is defined to include "detect" (in addition to allow, block, throttle, delay, defer, to name several), the service plan component can be defined as always including a traffic control policy, where "detect" does nothing more than trigger the policy event when the filter and policy event rule matches a traffic event. Assuming the notification policy is defined to include "none," the service plan component can be defined as always including a notification policy. Assuming the charging policy is defined to include "inherit," the service plan component can be defined as always including a charging policy, which is determined when the component is integrated into a plan from which it can inherit the charging policy.

In the example of FIG. 5, the flowchart 500 continues to decision point 514 where it is determined whether more filter instances are to be created. If it is determined that more filter instances are to be created (514-Y), then the flowchart returns to module 502 and continues as described previously (though at module 512, instead of creating a service plan component record, the service plan component record can be modified). If, on the other hand, it is determined that no more filter instances are to be created (514-N), then the flowchart 500 continues to decision point 516 where it is determined whether more policy event rule records corresponding to a filter record are to be created.

If it is determined that more policy event rule records corresponding to a filter record are to be created (516-Y), then the flowchart 500 returns to module 508 and continues as described previously (though at module 512, instead of creating a service plan component record, the service plan component record can be modified). If, on the other hand, it is determined that no more policy event rule records corresponding to a filter record are to be created (516-N), then the flowchart 500 ends.

It may be noted that in a typical implementation, the method could be restarted at module 502, module 508, or module 512 if there is an other filter instance, policy event rule record, or service plan component record to be created. Therefore, the end is a logical end to the flowchart 500, but the process can continue as needed.

Figure 6:
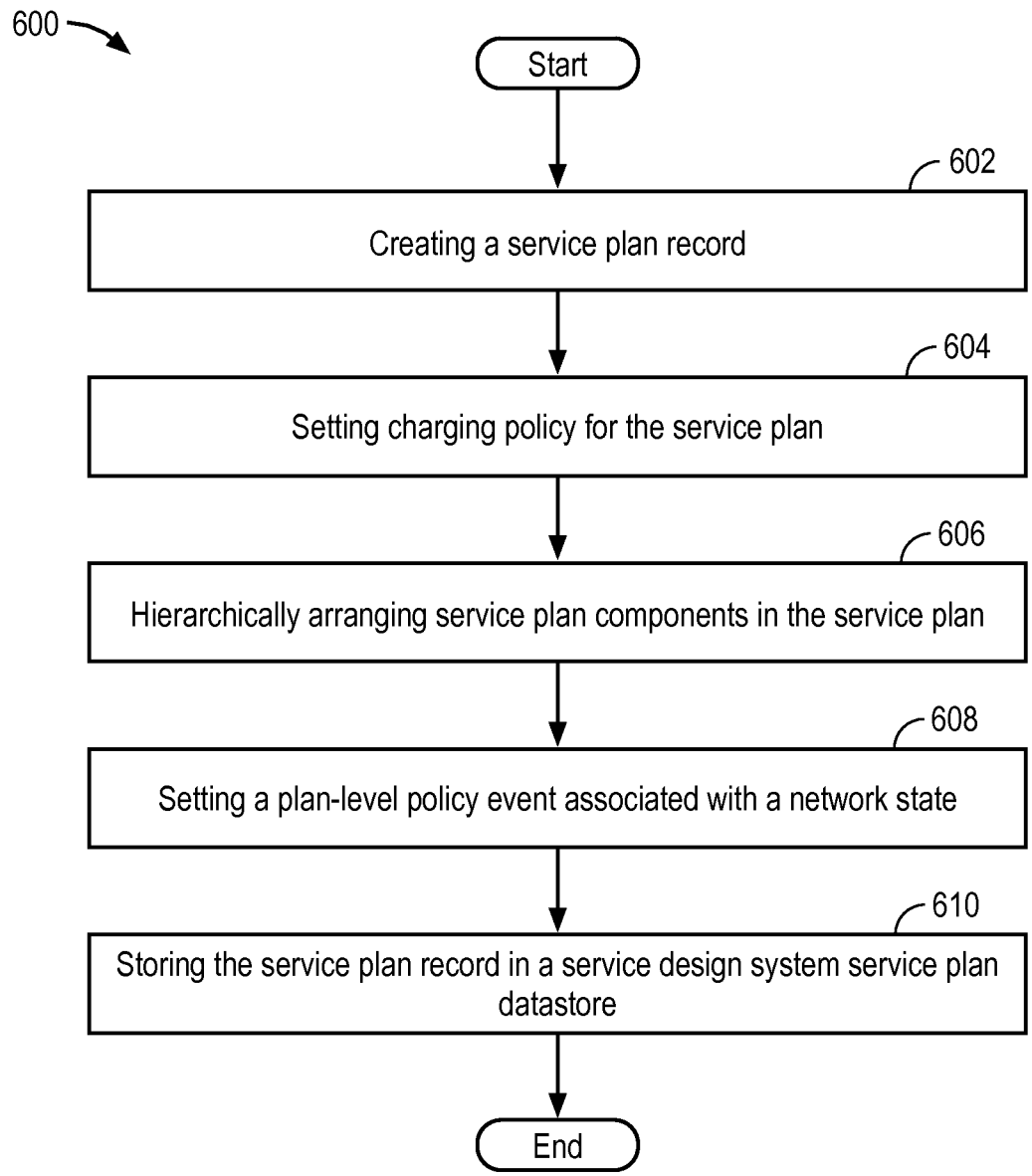
FIG. 6 depicts a flowchart of an example of a method for creating service plans from service plan components.

FIG. 6 depicts a flowchart 600 of an example of a method for creating service plans from service plan components. For illustrative purposes, it is assumed that filter instances, policy event rule records, and service plan component records that are going to be used in a service plan have already been created. It may be noted that none, some, or all of the filter instances, policy event rule records, and service plan component records could be created at any appropriate point (not depicted) in the flowchart 600. In a specific implementation, the filter instances and policy event rule records can be used at both the service plan component level (see, e.g., FIG. 5) and at the service plan level.

In the example of FIG. 6, the flowchart 600 continues to module 610 with creating a service plan record. The service plan record can include an icon for display on, e.g., subscriber devices, a plan name, a plan short description, a plan description, a plan version, a plan type (e.g., sponsored, paid, or carrier), whether the plan is a default plan, whether the plan is repurchaseable, a billing price, and a display price. Whether a policy label is displayed on a subscriber device can also be set. It may be noted that the service plan record could instead be created after all or a portion of the information associated with the following modules has been provided.

In the example of FIG. 6, the flowchart 600 continues to module 604 with setting charging policy for the service plan. The charging policy can be based on data or time usage and can have a usage limit, with or without overage of some amount, the billing policy cycle can be configured as appropriate (e.g., duration, frequency, report usage, pre- or post-paid billing, etc.). Whether billing identifiers are used (e.g., billing name, carrier service ID, etc.) can also be set. If charging codes are used, charging codes can also be identified and set to the default or not as is appropriate for the service plan. The charging policy can be inherited by service plan components of the plan that are configured to inherit the charging policy of the plan.

In the example of FIG. 6, the flowchart 600 continues to module 606 with hierarchically arranging service plan components in the service plan. The hierarchical arrangement can be explicit (e.g., by indicating priority in a field associated with a component) or implicit in the ordering of the components. In a specific implementation, the components also have service classes. For example, components could fall into the service classes carrier, network protection, sponsored, paid, parental control, marketing intercept, open access/bulk, post-bulk, and no applicable service plan/end-of-life. Thus, hierarchical arrangement of service plan components can refer to hierarchical arrangement of the service plan components relative to one another, to hierarchical arrangement of the service plan components within a service class relative to other service plan components in that service class, or to both.

Depending upon the implementation, service plan components can be designated to have a service class upon creation (or edit), or the component can be assigned to a service class when the component is added to the service plan. For example, a service plan component could be assigned to a "paid" service class, but could also function appropriately if assigned to a marketing intercept service class. Depending upon the implementation, the component could be designated "paid" upon creation and copied to create a similar "marketing intercept" component, or the component could be designated either paid or marketing intercept upon creation (or have no service class designation), and inserted into the relevant service class when arranged in a service plan. Thus, the hierarchical arrangement can be dynamic by service class (e.g., a designer can pick the class into which to arrange a component) or static by service class (e.g., the component is created within a service class). In a specific implementation, a service plan component with a static service class can be explicitly arranged by priority relative to other service plan components within the service class, a service plan component with a dynamically assigned service class can be explicitly arranged by priority relative to other service plan components within the service class, a service plan component with a static service class can be implicitly arranged by priority within the service class, and a service plan component with a dynamically assigned service class can be implicitly arranged by priority within the service class.

In the examples provided in this paper, the carrier service class is generally treated as the highest priority service class. Carrier plans will include basic network policy. In a specific implementation, carrier plans are automatically enforced on a subscriber device and are not offered in a plan catalog.

In the examples provided in this paper, the second highest priority service class, network protection, can be associated with policy designed to protect network resources (e.g., by detecting devices that are consuming too many network resources and throttling or blocking them). Network protection services can have variable billing policies that are selectable by a subscriber (e.g., to enable foreground processing as opposed to background processing, speed, etc.), but a subscriber may or may not have the ability to modify network protection policy, depending upon the implementation.

In the examples provided in this paper, the third highest priority service class, sponsored, can be associated with service plans that are sponsored in whole or in part by an entity other than the subscriber. Partially sponsored plans can be referred to as subsidized, though the term "sponsored" is intended to include subsidized plans unless otherwise indicated by context. Depending upon the implementation and/or configuration, sponsored plans may or may not be optional. For example, an employee of a company may have a sponsored service plan that is applicable when the employee accesses the company intranet, and the employee may or may not be able to decline the sponsorship. As another example, facebook may subsidize network resource consumption when a subscriber accesses the facebook website, and the subscriber may or may not be able to decline the subsidy.

In the examples provided in this paper, the fourth highest priority service class, paid, can be associated with service plans that a subscriber purchases. It is generally the case that a subscriber will be given the option to purchase a paid service plan through, e.g., an actionable service offer. (An actionable service offer is a notification that includes a feedback mechanism, such as an accept button, that a subscriber can select to accept the service offer.) Service offers can be triggered by predefined conditions, such as when a subscriber attempts to do something that a plan would help. (Service offers can also be triggered for sponsored services.)

In the examples provided in this paper, the fifth highest priority service class, parental control, can be associated with service plans that a subscriber purchases or modifies in accordance with an authentication process. Parental control plans can be associated with multi- (or single-) device plans for which a primary subscriber can set policy. Depending upon the implementation, different devices of a multi-device plan can also have different sponsored and paid plans.

In the examples provided in this paper, the sixth highest priority service class, market interceptor, can be associated with service plans that are offered to a subscriber before the subscriber drops to the bulk policy service class. Market interceptor plans can include service offers that are favorable to open access policy in some way.

In the examples provided in this paper, the seventh highest priority service class, open access or bulk, can be associated with a catch-all service plan.

In the examples provided in this paper, the eighth highest priority service class, post-bulk, can be associated with service plans that can be activated in the event no other service plan is applicable. In a specific implementation, post-bulk plans are designed to offer a subscriber a last chance to activate a service plan for something that the subscriber is trying to do, but is unable due to no service plan being available. If the subscriber responds appropriately to a notification, the subscriber may activate a service plan (e.g., a paid service plan) relevant to a present activity.

In the examples provided in this paper, the ninth highest priority service class, end-of-life, is typically associated with a notification that no service plan is available for a detected traffic event.

It is not necessary to utilize all service classes to take advantage of a service class hierarchy in specific implementations. It is also possible to move a class up or down relative to other classes in the hierarchy. For example, the network protection class could be given a priority below paid service class.

In the example of FIG. 6, the flowchart 600 continues to module 608 with setting a plan-level policy event associated with a network state. As was described previously, each service plan component can have a traffic control policy, a notification policy, and a charging policy. Policy events can also be set at the plan level. In a specific implementation, the filters and rules that were created when creating service plan components can be reused at the plan level, and if filters and rules are created when creating the service plan (not depicted), then those filters and rules can, be used at the service plan component level. In a specific implementation, the policy events can be associated with a network state. Network state can refer to current or historical parameters (e.g., congestion, previous number of failed attempts to authenticate on the network, time of day, geographic location, type of network, device is roaming, etc.) Policy events can also be set to be applicable for any (i.e., regardless of) network state.

In the example of FIG. 6, the flowchart 600 ends at module 612 with storing the service plan record in a service design system service plan datastore. Advantageously, the service plan can be used in multiple service plan catalogs without modification. Alternatively, the service plan record could be cloned for use in various service plan catalogs with or without modification. Where versioning is used, deployed service plans can either be automatically updated to new versions (with a possible grandfathering-in of subscribers to service plan components from prior versions), or the service plans can be wholly or partially templated such that new versions of the service plan do not impact deployed service plan offerings. Depending upon the implementation, a designer can go back to any module to edit parameters (e.g., after reviewing the service plan and determining that a parameter should be changed).

Figure 7:
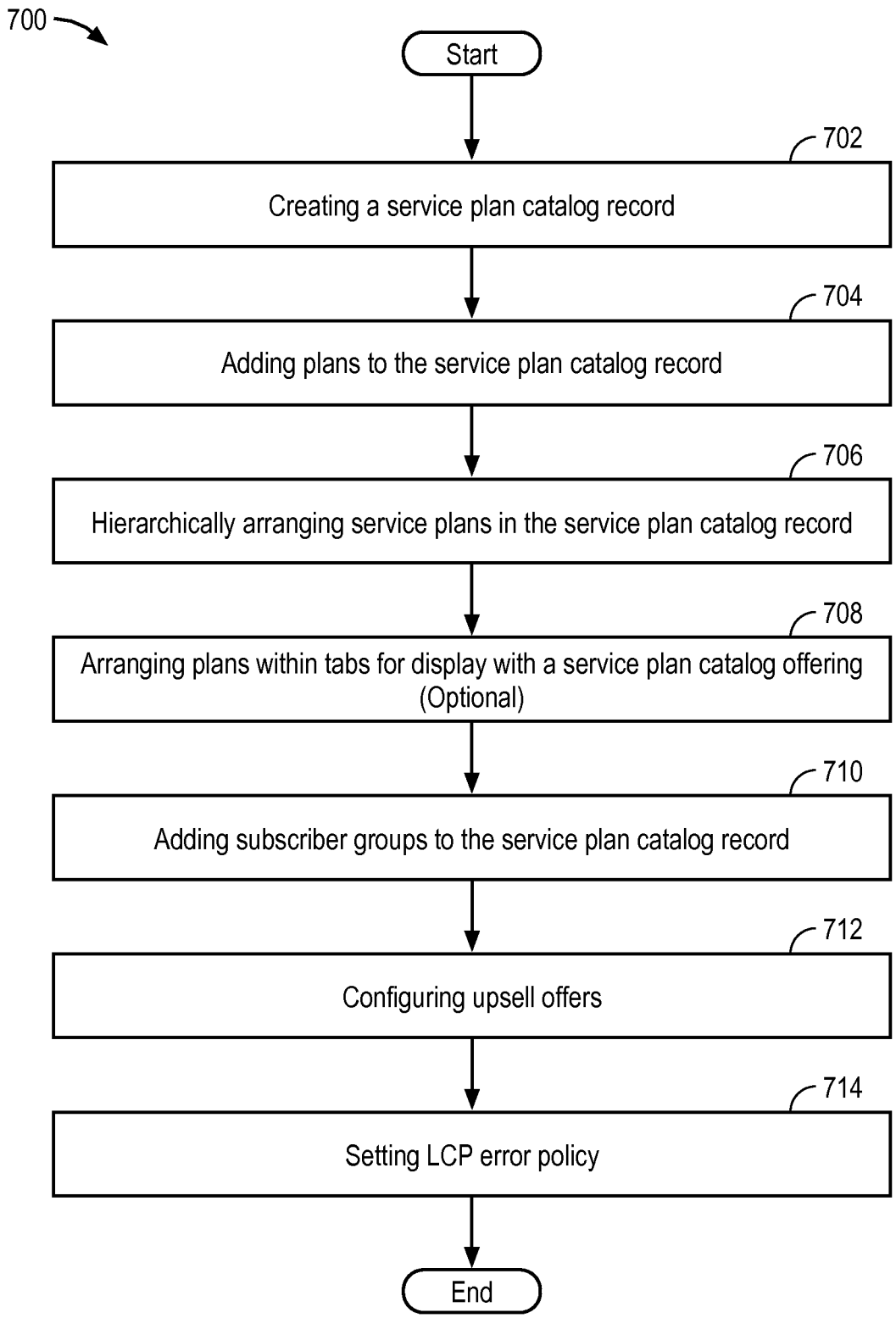
FIG. 7 depicts a flowchart of an example of a method for creating service plan catalogs from subscriber groups and service plans.

A service design engine can use a process, such as the example provided with reference to FIG. 4, to create subscriber groups. The service design engine can also use a process, such as the example provided with reference to FIG. 6, to create service plans. The subscriber groups and service plans can be implemented in service plan catalogs that are provided to access networks for automatic or selective implementation. FIG. 7 depicts a flowchart 700 of an example of a method for creating service plan catalogs from subscriber groups and service plans.

In the example of FIG. 7, the flowchart 700 starts at module 702 with creating a service plan catalog record. The service plan catalog record can include a plan catalog name, a plan catalog description, a plan catalog version, or the like. It may be noted that the service plan catalog record could instead be created after all or a portion of the information associated with the following modules has been provided.

In the example of FIG. 7, the flowchart 700 continues to module 704 with adding plans to the service plan catalog record. In a specific implementation, the plans are stored as records in a service design system service plans datastore. In a specific implementation, the plans are represented in a list, and a designer can drag plans from the list into a chosen plans list using a service design system UI. Plans can be designated as available upon activation (or not).

In the example of FIG. 7, the flowchart 700 continues to module 706 with hierarchically arranging the service plans in the service plan catalog record. The plans can be arranged by priority relative to one another, which results in a higher priority plan being displayed and/or used first. The plans can also be arranged within a service class relative to other plans in the service class. Service class can be statically assigned to the plans when they are created (or edited) or dynamically assigned during the creation of the service plan catalog. Priorities can be explicit based on a priority indicator, implicit based on a relative location of a plan in the list of plans, or indicated in some other manner. In a specific implementation, a service design system UI enables a designer to drag a plan up or down a list of plans within service classes to establish priority, which is indicated by a priority number that corresponds to the relative order of a plan within a service class.

In the example of FIG. 7, the flowchart 700 continues to module 708 with optionally arranging plans within tabs for display with a service plan catalog offering. Tabs can include categories such as games, social, productivity, media, free, paid, all, or the like. An association between a tab and a plan can be formed such that the plan will be displayed under the associated tab when the service plan catalog offering is displayed, e.g., on a subscriber device. A plan can be associated with multiple tabs, and displayed under the multiple tabs. The order of the tabs can be configured, as can the order of the plans within tabs. In this paper, the order of the plans within a tab is not related to the priority of a plan, e.g., within a service class, though such a correlation could be made in alternative implementations.

In the example of FIG. 7, the flowchart 700 continues to module 710 with adding subscriber groups to the service plan catalog record. In a specific implementation, the subscriber groups are represented in a list, and a designer can drag plans from the list into a chosen subscriber groups list using a service design system UI. Other methods of adding subscriber groups are anticipated, such as, e.g., by identifying subscriber groups in accordance with subscriber characteristics.

When a service plan catalog is published, the subscriber groups associated with service plans in the service plan catalog identify the subscribers, whether automatically or by selecting the plan, that will have the policies of the relevant service plan enforced on their devices. Depending upon the implementation, publication of a plan can be in beta, which generally means the subscribers to the plan can have the plan changed with or without notice, or deployed, which generally means that subscribers can expect changes to future versions of the plan will not impact them until they need to repurchase the (new version of) the plan.

In the example of FIG. 7, the flowchart 700 continues to module 712 with configuring upsell offers. Upsell offers have notification policy that is associated with network state, device state, or subscriber state. For example, if a subscriber uses a great deal of streaming media in a bulk plan, it may be desirable to offer a streaming media plan that, based upon their current or historical usage, will save the subscriber money. As another example, a subscriber who is in a city with a wireless Municipal Area Network (MAN) might receive upsell offers associated with a using the wireless MAN. As another example, a subscriber who frequently accesses facebook can be offered a service plan that is sponsored by facebook, thereby decreasing service costs as long as the access is associated with facebook. As another example, a subscriber who frequently accesses a facebook competitor could be offered a service plan that is sponsored by facebook in an effort to draw the subscriber to facebook (because it is cheaper). As another example, if a subscriber is indicated to have a language preference of Japanese, an upsell offer could target that demographic (e.g., by offering a sponsored service to access an application that is popular among Japanese speakers). As another example, a subscriber who has a particular device state (e.g., the subscriber record includes data that the subscriber uses an iphone) can be targeted with an upsell offer that is popular with subscribers having such a device state.

Upsell offers can include a suite of all possible choices, or can be limited to offers that are more suitable to the specific historical usage of a particular subscriber. For example, if a subscriber typically consumes around 5 MB of data per unit of time, the system need not provide upsell offers for 10 MB, 100 MB, 1 GB, 10 GB, and 100 GB all at once (even though all might be offered), and instead send an upsell offer of 10 MB only (or, e.g., 10 MB and 100 MB). If usage for the subscriber increases, the subscriber can be notified regarding the larger-size service plans.

The upsell offer could alternatively be added to a service plan component, but in a specific implementation, it was deemed useful to modify upsell offers, even those that might be identified within a service plan component, at the service plan catalog level. In this way, standard upsell components of, e.g., a facebook plan, can be modified with appropriate notification or other configurations for a given service plan catalog or for specific subscriber groups.

In the example of FIG. 7, the flowchart 700 ends at module 714 with setting LCP error policy. An LCP error occurs when a traffic event is not matched to an applicable service plan policy. Setting an LCP error for a service plan catalog enables the LCP error to be handled in an elegant fashion (e.g., by sending a notification to a subscriber that the traffic event can be handled in accordance with an inactive service plan, the notification including an option for the subscriber to activate the inactive service plan). The LCP error notification policy could alternatively be added to a service plan component, but in a specific implementation, it was deemed useful to enable LCP error policy settings at the service plan catalog level because the LCP error policy always comes at the end of attempts to match all active plans in a service plan catalog offering. This results in improved service plan design efficiency. Depending upon the implementation, a designer can go back to any module to edit parameters (e.g., after reviewing the service plan catalog and determining that a parameter should be changed).

Figure 8:
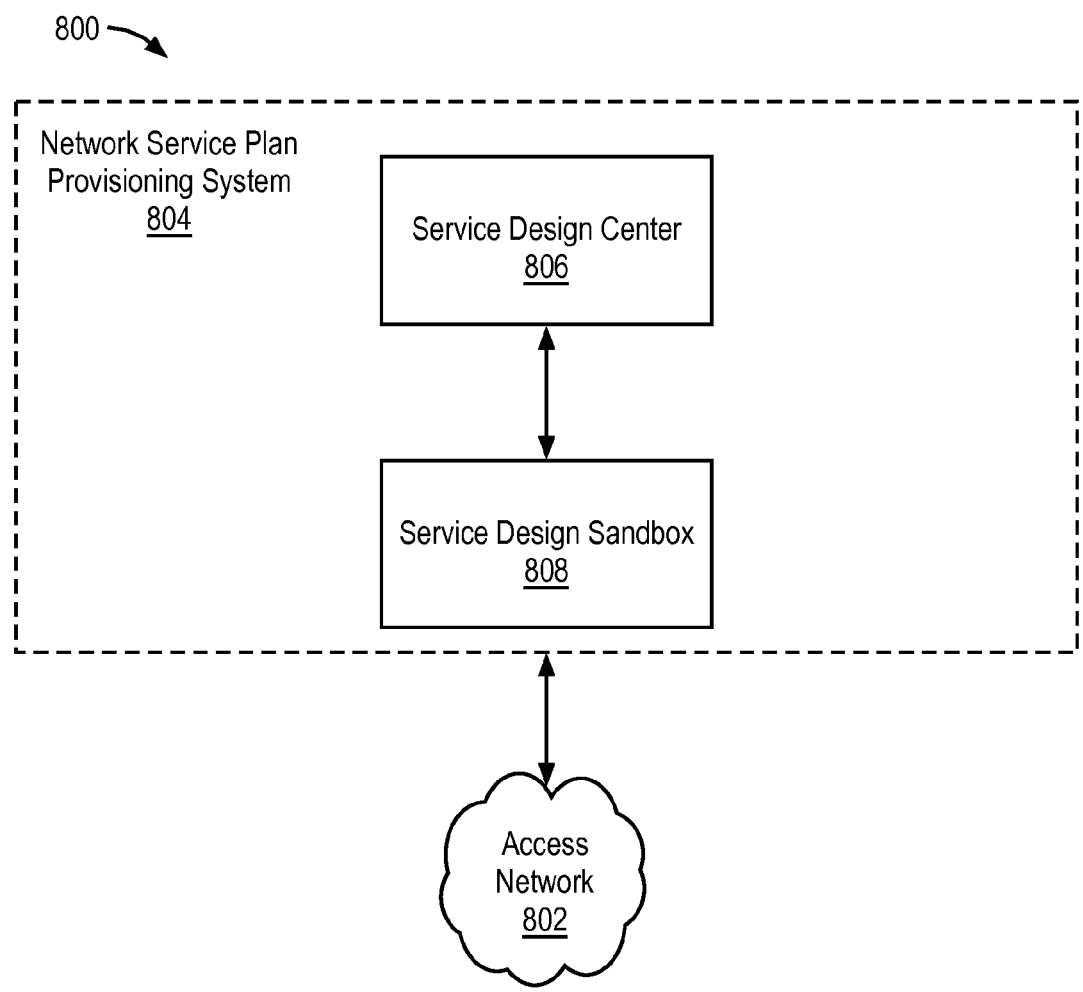
FIG. 8 depicts an example of system including an access network and a network service plan provisioning sandbox system.

FIG. 8 depicts an example of system 800 including an access network and a network service plan provisioning sandbox system. The system 800 includes an access network 802 and a network service plan provisioning system 804. The access network 802 is similar to that described with reference to FIG. 1.

In the example of FIG. 8, the network service plan provisioning system 804 includes a service design center 806 and a service design sandbox 808. Conceptually, the service design center 806 and the service design sandbox 808 share design and/or provisioning responsibilities. The service design center 806 and the service design sandbox 808 can be hierarchically organized. For example, the service design center 806 can delegate certain roles to the service design sandbox 808 and perhaps retains an oversight capability for agents of the service design center 806. For example, the service design sandbox 808 can be given the ability to impact policy control to a subset of subscriber groups of the network service plan provisioning system 804. The network service plan provisioning system 804 can be referred to as "distributed" in this example.

Some examples of entities that might desire to include the service design sandbox 808 in their networks include enterprises with employees that consume network services, MVNOs, application developers, gifters, and community-based organizations. In the case of enterprises with employees that consume network services, the service design sandbox 808 can enable fine-tuned control over traffic control and charging policy (as well as notification policy). Assume that XYZ company controls the service design sandbox 808. XYZ company can create a service plan specific to XYZ company network services on the XYZ company intranet, which will be referred to as the XYZ plan. Specifically, the XYZ company can sponsor the XYZ company network services on the XYZ company intranet for XYZ company employees. A paid plan offered by a carrier that controls the service design center 806, for example, can still be available for XYZ company employees that are using other network services (or XYZ company could partially sponsor a subset of the other network services). The XYZ plan could also include a component that prevents XYZ company employees from accessing certain restricted sites through the XYZ company intranet and has notification policy associated with the attempted access. Continuing the example, an agent (e.g., IT manager) of the XYZ company can define subscriber groups that comprise XYZ company members and assign different service plans (e.g., different traffic control, notification, or charging policies) to the different XYZ company subscriber groups. For example, employees could get limited usage, managers might get access to more usage and additional services (e.g., email), members of the sales team might get better roaming services, and a CEO might get everything in the carrier's service plan offering, perhaps with XYZ company as a sponsor for all services. Advantageously, split-billing is possible using these techniques, such that XYZ company can pay for sponsored services and XYZ employees can pay for unsponsored services (or for a portion of subsidized services).

In the case of MVNOs, an MVNO can purchase bulk data from a carrier and offer plans based on the bulk. Advantageously for MVNOs, the service design sandbox 808 enables control over subscribers based on, e.g., network state. Indeed, for all subscribers "owned" by the MVNO, a great deal of policy control can be applied (dependent upon the amount of control a carrier is willing to give to the MVNO). Other providers that can benefit from the sandbox model include mobile virtual network enablers (MVNEs), mobile shared spectrum enablers (MSSEs), and service providers (SPs).

In the case of application developers, the service design sandbox 808 can specify applications that can be covered by a service plan. The service design center 806 may or may not be responsible for creating the underlying control mechanism. For example, a company like amazon.com can be given some control over sponsorship settings for applications associated with amazon.com.

In the case of gifters, the service design sandbox 808 can enable specification of a sponsorship amount that is donated to some other organization, such as a non-profit organization. In the case of community-based organizations, the service design sandbox 808 can specify free access for a particular network service. For example, the San Francisco Giants organization could have a plan group for fans that grants free access to the official site of the San Francisco Giants. As another example, AAA could sponsor access to services for AAA members.

Agents of the network service plan provisioning system can be given roles that grant access to certain aspects of service design and/or provisioning. For example, agents at the service design center 806 can have a role system administrator, super user, or the like, while agents of the service design sandbox 808 can have roles such as enterprise IT manager, MVNO administrator, or the like. Agents of the service design sandbox 808 can subdivide roles further, if applicable, depending upon implementation.

Figure 9:
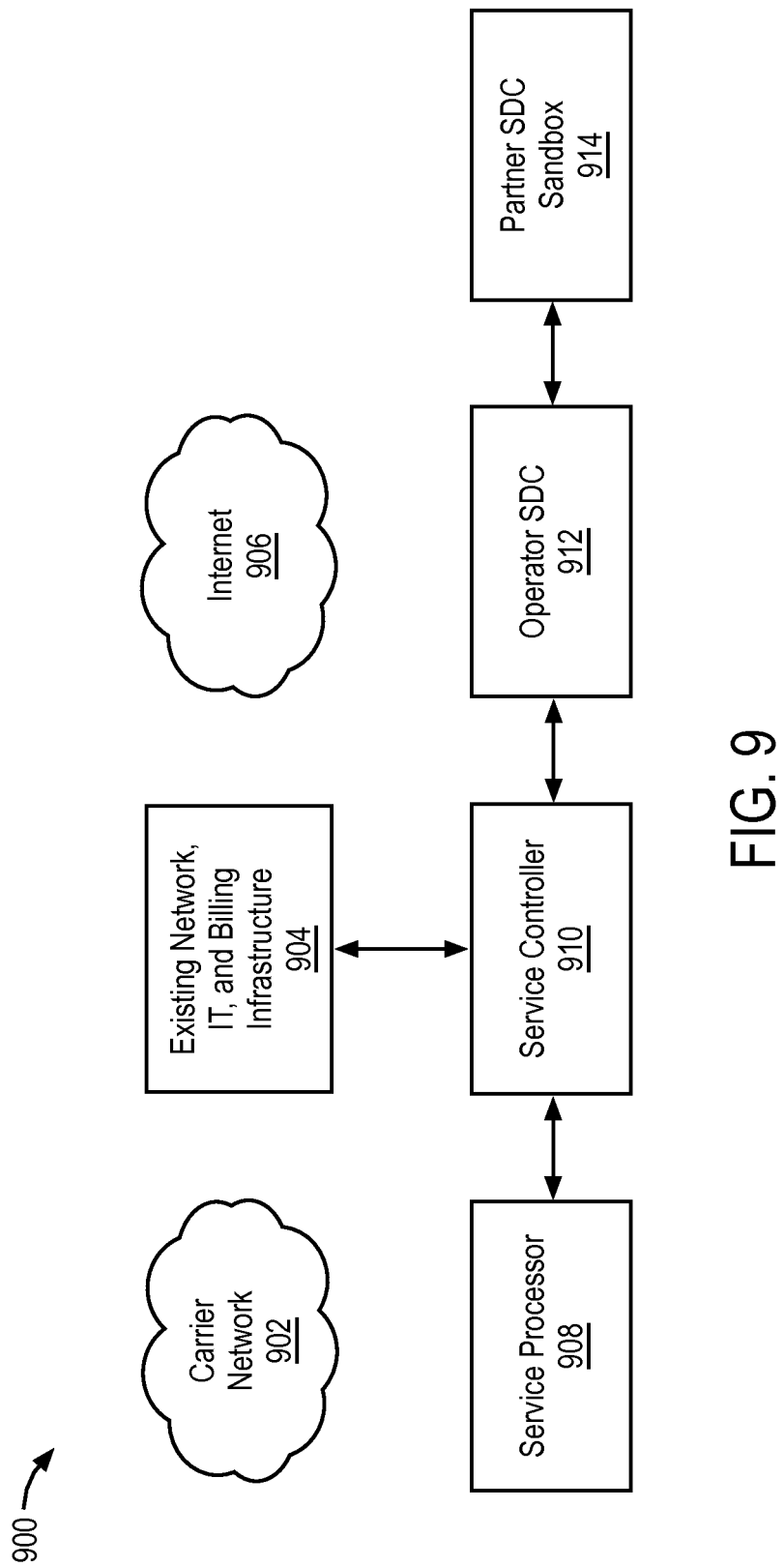
FIG. 9 depicts a conceptual diagram of an example of a service design system sandbox implementation.

FIG. 9 depicts a conceptual diagram 900 of an example of a service design system sandbox implementation. The conceptual diagram 900 includes a carrier network 902, existing network, IT, and billing infrastructure 904 (referred to as infrastructure 904), the Internet 906, a service processor 908, a service controller 910, an operator service design center (SDC) 912, and a partner SDC sandbox 914. In the example of FIG. 9, the carrier network is coupled to the Internet 906 via the infrastructure 904.

The service processor 908 can be implemented on a client device on the carrier network 902. In a specific implementation, the service processor 908 includes a service control device link. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link also provides the communications link and heartbeat timing for the agent heartbeat function. The service control device link can provide an efficient and secure solution for transmitting and receiving service policy implementation, control, monitoring and verification information with other network elements.

In a specific implementation, a client dashboard is presented in a display device by the service processor 908. The client dashboard can include the following menus: services (purchased, data usage), statistics (applications consuming data, data used in absolute terms or as a %), buy (navigates subscriber through activation, enrollment, plan selection, and purchase workflows), help, and settings (preferences, e.g., language).

The service controller 910 can be implemented, e.g., in the cloud, and is coupled to the infrastructure 904.

The operator SDC 912 is on the Internet, and is coupled to the service controller. The operator SDC 912 can set up boundaries for "sandboxed" service and allow customizations for partner sets; lock in master tariffs based on negotiated rates for a given partner set or individual partner; create custom log-ins for different partner sets or individual partners; and carry out any applicable techniques appropriate for a service design system. The operator SDC 912 allows authorized agents to manage service plan components and subscribers. The agents can manage groups (collections of subscribers, SIMs, or devices) to create groups and group directories, assign an identity hierarchy for the operator, associated identifiers with groups, etc. The agents can manage service plans (including one or more components) including plan name and description, groups using the plan, service plan components, service activities, network busy states and connection types, charging policies (including usage limits, thresholds, frequency, time, and payment type), notifications (e.g., for plan usage thresholds, plan cap, expiration, block, overage, no capable plan, etc.), and events (e.g., for plan usage thresholds, plan cap, expiration, block, overage, etc.). The agents can manage service components (logical grouping of one or more filters and rules), including component name and description, plans using the component, network busy states and connection types, charging policies (including usage limits, thresholds, frequency, time and payment type), notifications (e.g., for plan usage thresholds, plan cap, expiration, block, overage, no capable plan, etc.), and events (e.g., for plan usage thresholds, plan cap, expiration, block, overage, etc.). The agents can manage service activities (e.g., activity name, plans using the activity, components using the activity, filter name and description, and filter type details (e.g., operating system, application, remote, port, protocol, etc.). The agents can manage service group plans including assign and publish plan group, create activation workflow screens, create buy workflow screens. The agents can receive, manage, customize, or generate reports for, for example, usage reports by destination for a subscriber over a period of time, usage reports by destination for a range of subscribers over a period of time (top destinations).

The partner SDC sandbox 914 is coupled to the operator SDC 912 in an applicable convenient fashion. The partner SDC sandbox 914 can provide a secure login environment in which a subset of SDC service management controls can be designed and/or used; enable selection from bounded service customization options for one or more device groups under management; customize device UI branding; access real time analytics for service usage, application usage, location, etc.; set up service usage alerts, fraud alerts, theft alerts, etc.; and carry out any applicable techniques appropriate for a service design system that have been delegated to the sandboxed environment.

The service controller 910 includes a service control server link. In some a specific implementation, device based service control techniques involving supervision across a network (e.g., on the control plane) are more sophisticated, and for such it is increasingly important to have an efficient and flexible control plane communication link between the device agents (e.g., of the service processor 908) and the network elements (e.g., of the service controller 910) communicating with, controlling, monitoring, or verifying service policy. For example, the communication link between the service control server link of service controller 910 and the service control device link of the service processor 910 can provide an efficient and flexible control plane communication link, a service control link; in some embodiments, this control plane communication link provides for a secure (e.g., encrypted) communications link for providing secure, bidirectional communications between the service processor 908 and the service controller 910. In some embodiments, the service control server link provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link also provides the communications link and heartbeat timing for the agent heartbeat function. In some embodiments, the service control server link provides for securing, signing, encrypting and/or otherwise protecting the communications before sending such communications over the service control link. For example, the service control server link can send to the transport layer or directly to the link layer for transmission. In another example, the service control server link further secures the communications with transport layer encryption, such as TCP TLS or another secure transport layer protocol. As another example, the service control server link can encrypt at the link layer, such as using IPSEC, various possible VPN services, other forms of IP layer encryption and/or another link layer encryption technique.

In a specific implementation, the service controller 910 can include an access control integrity server (e.g., service policy security server). In some embodiments, the access control integrity server collects device information on service policy, service usage, agent configuration, and/or agent behavior. For example, the access control integrity server can cross check this information to identify integrity breaches in the service policy implementation and control system. In another example, the access control integrity server can initiate action when a service policy violation (e.g., QoS policy violation and/or a network capacity controlled services policy violation) or a system integrity breach is suspected.

In a specific implementation, an agent of the service controller 910 (and/or some other agent of the access control integrity server) acts on access control integrity agent (e.g., service policy security agent) reports and error conditions. Many of the access control integrity agent checks can be accomplished by the server. For example, the access control integrity agent checks include one or more of the following: service usage measure against usage range consistent with policies (e.g., usage measure from the network and/or from the device); configuration of agents; operation of the agents; and/or dynamic agent download.

In a specific implementation, an agent of the service controller 910 (and/or some other agent of the access control integrity server) verifies device service policy implementations by comparing various service usage measures (e.g., based on network monitored information, such as by using IPDRs or CDRs, and/or local service usage monitoring information) against expected service usage behavior given the policies that are intended to be in place (e.g., a QoS policy and/or a network capacity controlled services policy). For example, device service policy implementations can include measuring total QoS data passed, QoS data passed in a period of time, IP addresses, data per IP address, and/or other measures such as location, downloads, email accessed, URLs, and comparing such measures expected service usage behavior given the policies that are intended to be in place.

In a specific implementation, an agent of the service controller 910 (and/or some other agent of the access control integrity server) verifies device service policy, and the verification error conditions that can indicate a mismatch in QoS service measure and QoS service policy include one or more of the following: unauthorized network access (e.g., access beyond ambient service policy limits); unauthorized network speed (e.g., average speed beyond service policy limit); network data amount does not match QoS policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy. Accordingly, in some embodiments, an agent of the service controller 910 (and/or some other agent of the access control integrity server) provides a policy/service control integrity service to continually (e.g., periodically and/or based on trigger events) verify that the service control of the device has not been compromised and/or is not behaving out of policy (e.g., a QoS policy and/or a network capacity controlled services policy).

In a specific implementation, the service controller 910 includes a service history server (e.g., charging server). In some embodiments, the service history server collects and records service usage or service activity reports from, e.g., an access network AAA server and/or a service monitor agent of the service controller 910. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server provides the service history on request to other agents of the service controller 910, other servers, and/or one or more other agents. In some embodiments, the service history server provides the service usage history to the device service history (e.g., CDR feed and CDR mediation). In some embodiments, for purposes of facilitating the activation tracking service functions (described below), the service history server maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

In a specific implementation, the service controller 910 includes a policy management server (e.g., policy decision point (PDP) server) for managing service usage policies, such as QoS policies and/or a network capacity controlled services policies. In some embodiments, the policy management server transmits policies to the service processor 908 via the service control link. In some embodiments, the policy management server manages policy settings on the device (e.g., various policy settings as described herein with respect to various embodiments) in accordance with a device service profile. In some embodiments, the policy management server sets instantaneous policies on policy implementation agents (e.g., policy implementation agent). For example, the policy management server can issue policy settings, monitor service usage and, if necessary, modify policy settings. For example, in the case of a user who prefers for the network to manage their service usage costs, or in the case of any adaptive policy management needs, the policy management server can maintain a relatively high frequency of communication with the device to collect traffic and/or service measures and issue new policy settings. In this example, device monitored service measures and any user service policy preference changes are reported, periodically and/or based on various triggers/events/requests, to the policy management server. In this example, user privacy settings generally require secure communication with the network (e.g., a secure service control link), such as with the policy management server, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server provides adaptive policy management on the device. For example, the policy management server can issue policy settings and objectives and rely on the device based policy management (e.g., service processor 908) for some or all of the policy adaptation. This approach can require less interaction with the device thereby reducing network chatter on the service control link for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history, and/or other sensitive information) is not communicated to the network without the user's approval. In some embodiments, the policy management server adjusts service policy based on time of day. In some embodiments, the policy management server receives, requests, and/or otherwise obtains a measure of network availability/capacity and adjusts traffic shaping policy and/or other policy settings based on available network availability/capacity (e.g., a network busy state).

In a specific implementation, the service controller 910 includes a network traffic analysis server. In some embodiments, the network traffic analysis server collects/receives service usage history for devices and/or groups of devices and analyzes the service usage. In some embodiments, the network traffic analysis server presents service usage statistics in various formats to identify improvements in network service quality and/or service profitability. In some embodiments, the network traffic analysis server estimates the service quality and/or service usage for the network under variable settings on potential service policies. In some embodiments, the network traffic analysis server identifies actual or potential service behaviors by one or more devices that are causing problems for overall network service quality or service cost. In some embodiments, the network traffic analysis server estimates the network availability/capacity for the network under variable settings on potential service policies. In some embodiments, the network traffic analysis server identifies actual or potential service behaviors by one or more devices that are impacting and/or causing problems for overall network availability/capacity.

In a specific implementation, the service controller 910 includes a beta test server (e.g., policy creation point and beta test server). In some embodiments, the beta test server publishes candidate service plan policy settings to one or more devices. In some embodiments, the beta test server provides summary reports of network service usage or user feedback information for one or more candidate service plan policy settings. In some embodiments, the beta test server provides a mechanism to compare the beta test results for different candidate service plan policy settings or select the optimum candidates for further policy settings optimization, such as for protecting network capacity.

In a specific implementation, the service controller 910 includes a service download control server (e.g., a service software download control server). In some embodiments, the service download control server provides a download function to install and/or update service software elements (e.g., the service processor 908 and/or agents/components of the service processor 908) on the device, as described herein.

In a specific implementation, the service controller 910 includes a billing event server (e.g., micro-CDR server). In some embodiments, the billing event server collects billing events, provides service plan information to the service processor 908, provides service usage updates to the service processor 908, serves as interface between device and central billing server, and/or provides trusted third party function for certain ecommerce billing transactions.

In a specific implementation, the service processor 908 provides an additional layer of access control. For example, an access network AAA server can provide necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. In some embodiments, the Access Network AAA server also provides the ability to suspend service for a device and resume service for a device based on communications received from the service controller 910. In some embodiments, the Access Network AAA server also provides the ability to direct routing for device traffic to a quarantine network or to restrict or limit network access when a device quarantine condition is invoked. In some embodiments, the Access Network AAA server also records and reports device network service usage.

In some embodiments, different profiles are selected based on the selected network connection (e.g., different service profiles/policies for WWAN, WLAN, WPAN, Ethernet and/or DSL network connections), which can be referred to as multimode profile setting. For example, service profile settings can be based on the actual access network (e.g., home DSL/cable or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider or the service controller 910 can be owned by the hotspot service provider that uses the service controller 910 on their own without any association with an access network service provider. For example, the service processor 908 can be controlled by the service controller 910 to divide up the available bandwidth at the hotspot according to QoS or user sharing rules (e.g., with some users having higher differentiated priority (e.g., potentially for higher service payments) than other users). As another example, ambient services (e.g., as similarly described herein) can be provided for the hotspot for verified service processors.

In some embodiments, the service processor 908 and service controller 910 are capable of assigning multiple service profiles associated with multiple service plans that the user chooses individually or in combination as a package. For example, a device starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email, and SMS service. In this case, the service controller 910 would obtain from the billing system in the case of network based billing (e.g., or the service controller 910 billing event server in the case of device based billing) the billing plan code for the new Internet, email and SMS service. In some embodiments, this code is cross referenced in a database (e.g., the policy management server) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device service processor. In some embodiments, the service processor 908 can determine the superset profile rather than the service controller 910 when more than one "stackable" service is selected by the user or otherwise applied to the device. The flexibility of the service processor 908 and service controller 910 embodiments described herein allow for a large variety of service profiles to be defined and applied individually or as a superset to achieve the desired device service features.

In some embodiments, device assisted services (DAS) techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent, service monitor agent (e.g., charging agent), or another agent or function (or combinations thereof) of the service processor 908 provides a DAS activity map. In some embodiments, a policy control agent, service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by socket (such as by IP address, protocol, and/or port), by socket id (such as port address/number), by port number, by content type, by application or application type, and/or any other service usage activity classification/categorization) with associated IP addresses and/or other criteria/measures. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments for providing QoS for DAS and/or for providing DAS for protecting network capacity. In some embodiments, the DAS activity map is used to provide the user various UI related information and notification techniques related to service usage as described herein with respect to various embodiments. In some embodiments, the DAS activity map is used to provide service usage monitoring, prediction/estimation of future service usage, service usage billing (e.g., bill by account and/or any other service usage/billing categorization techniques), DAS techniques for ambient services usage monitoring, DAS techniques for generating micro-CDRs, and/or any of the various other DAS related techniques as described herein with respect to various embodiments.

Figure 10:
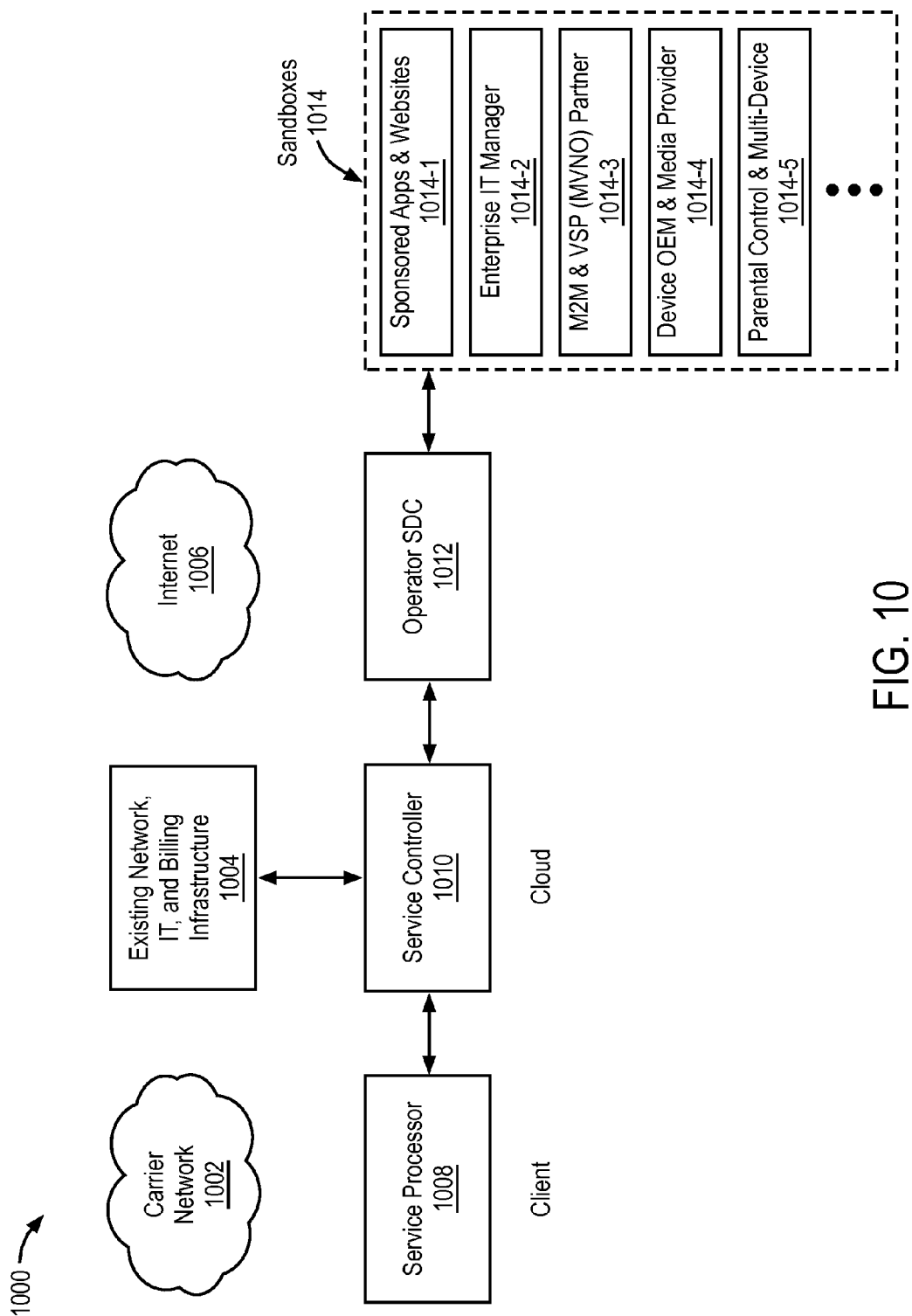
FIG. 10 depicts a conceptual diagram of an example of a service design system sandbox implementation.

FIG. 10 depicts a conceptual diagram 1000 of an example of a service design system sandbox implementation. The components of FIG. 10 are similar to those depicted in FIG. 9. FIG. 10 is intended to illustrate that various sandboxes can be created for a variety of purposes. In the example of FIG. 10, the sandboxes 1014 include sponsored apps & websites sandboxes 1014-1, enterprise IT manager sandboxes 1014-2, machine-to-machine (M2M) & virtual service provider (VSP) (MVNO) partner sandboxes 1014-3, device OEM & media provider sandboxes 1014-4, parental control & multi-device sandboxes 1014-5, etc. A common service controller cloud service software implemented at the service controller 1010 and server processor device client software implemented at the service processor 1008 allows operators and partners to scale customized user experiences and service plan policies.

In some embodiments, a network service usage control policy is dynamic based on one or more of the following: a network busy state, a time of day, which network the service activity is connected to, which base station or communication channel the service activity is connected to, a user input, a user preference selection, an associated service plan, a service plan change, an application behavior, a messaging layer behavior, random back off, a power state of device, a device usage state, a time based criteria (e.g., time/day/week/month, hold/delay/defer for future time slot, hold/delay/defer for scheduled time slot, and/or hold/delay/defer until a busy state/availability state/QoS state is achieved), monitoring of user interaction with the service activity, monitoring of user interaction with the device, the state of UI priority for the service activity, monitoring the power consumption behavior of the service activity, modem power cycling or power control state changes, modem communication session set up or tear down, and/or a policy update/modification/change from the network. In some embodiments, the network service usage control policy is based on updated service usage behavior analysis of the network service usage activity. In some embodiments, the network service usage control policy is based on updated activity behavior response to a network capacity controlled service classification. In some embodiments, the network service usage control policy is based on updated user input/preferences (e.g., related to policies/controls for network capacity controlled services). In some embodiments, the network service usage control policy is based on updates to service plan status. In some embodiments, the network service usage control policy is based on updates to service plan policies. In some embodiments, the network service usage control policy is based on availability of alternative networks. In some embodiments, the network service usage control policy is based on policy rules for selecting alternative networks. In some embodiments, the network service usage control policy is based on network busy state or availability state for alternative networks. In some embodiments, the network service usage control policy is based on specific network selection or preference policies for a given network service activity or set of network service activities.

In some embodiments, associating the network service usage activity with a network service usage control policy or a network service usage notification policy, includes dynamically associating based on one or more of the following: a network busy state, a time of day, a user input/preference, an associated service plan (e.g., 25 MB data plan, 5G data plan, or an unlimited data plan or other data/service usage plan), an application behavior, a messaging layer behavior, a power state of device, a device usage state, a time based criteria, availability of alternative networks, and a set of policy rules for selecting and/or controlling traffic on one or more of the alternative networks.

In some embodiments, a network service usage control policy (e.g., a network capacity controlled services policy) includes defining the network service usage control policy for one or more service plans, defining network access policy rules for one or more devices or groups of devices in a single or multi-user scenarios such as family and enterprise plans, defining network access policy rules for one or more users or groups of users, allowing or disallowing network access events or attempts, modulating the number of network access events or attempts, aggregating network access events or attempts into a group of access events or attempts, time windowing network access events or attempts, time windowing network access events or attempts based on the application or function being served by the network access events or attempts, time windowing network access events or attempts to pre-determined time windows, time windowing network access events or attempts to time windows where a measure of network busy state is within a range, assigning the allowable types of access events or attempts, assigning the allowable functions or applications that are allowed network access events or attempts, assigning the priority of one or more network access events or attempts, defining the allowable duration of network access events or attempts, defining the allowable speed of network access events or attempts, defining the allowable network destinations for network access events or attempts, defining the allowable applications for network access events or attempts, defining the QoS rules for one or more network access events or attempts, defining or setting access policy rules for one or more applications, defining or setting access policy rules for one or more network destinations, defining or setting access policy rules for one or more devices, defining or setting access policy rules for one or more network services, defining or setting access policy rules for one or more traffic types, defining or setting access policy rules for one or more QoS classes, and defining or setting access policy rules based on any combination of device, application, network destination, network service, traffic type, QoS class, and/or other criteria/measures.

In some embodiments, a network service usage control policy (e.g., a network capacity controlled services policy) includes a traffic control policy. In some embodiments, the traffic control policy includes a traffic control setting. In some embodiments, the traffic control policy includes a traffic control/tier, and the traffic control/tier includes the traffic control setting. In some embodiments, the traffic control policy includes one or more of the following: block/allow settings, throttle settings, adaptive throttle settings, QoS class settings including packet error rate, jitter and delay settings, queue settings, and tag settings (e.g., for packet tagging certain traffic flows). In some embodiments, QoS class settings, include one or more of the following: throttle level, priority queuing relative to other device traffic, time window parameters, and hold or delay while accumulating or aggregating traffic into a larger stream/burst/packet/group of packets. In some embodiments, the traffic control policy includes filters implemented as indexes into different lists of policy settings (e.g., using cascade filtering techniques), in which the policy filters include one or more of the following: a network, a service plan, an application, a time of day, and a network busy state. For example, a two dimensional traffic control implementation scheme can be provided using a network busy state and/or a time of day as an index into a traffic control setting (e.g., a certain application's priority level can be increased or decreased based on a network busy state and/or time of day). In some embodiments, the traffic control policy is used for selecting the network from a list of available networks, blocking or reducing access until a connection is made to an alternative network, and/or modifying or replacing a network stack interface of the device to provide for intercept or discontinuance of network socket interface messages to applications or OS functions.

In some embodiments, a traffic control setting is selected based on the network service usage control policy. In some embodiments, the traffic control setting is implemented on the device based on the network service usage control policy. In some embodiments, the implemented traffic control setting controls traffic/traffic flows of a network capacity controlled service. In some embodiments, the traffic control setting is selected based on one or more of the following: a time of day, a day of week, a special time/date (e.g., a holiday or a network maintenance time/date), a network busy state, a priority level associated with the network service usage activity, a QoS class associated with the network service usage activity (e.g., emergency traffic), which network the network service activity is gaining access from, which networks are available, which network the network service activity is connected to, which base station or communication channel the network service activity is connected to, and a network dependent set of traffic control policies that can vary depending on which network the service activity is gaining access from (e.g., and/or various other criteria/measures as described herein). In some embodiments, the traffic control setting includes one or more of the following: allow/block, delay, throttle, QoS class implementation, queue, tag, generate a user notification, random back off, clear to send received from a network element, hold for scheduled transmission time slot, selecting the network from the available networks, and blocking or reducing access until a connection is made to an alternative network. In some embodiments, the traffic control setting is selected based on a network capacity controlled services priority state of the network service usage activity and a network busy state. In some embodiments, the traffic control setting is selected based on a network capacity controlled services priority state of the network service usage activity and a network busy state and is global (e.g., the same) for all network capacity controlled services activities or varies based on a network service usage activity priority, user preferences or option selection, an application, a time based criteria, a service plan, a network the device or service activity is gaining access from, a redetermination of a network congestion state after adapting to a previously determined network busy state, and/or other criteria/measures as described herein.

In some embodiments, network capacity controlled services traffic (e.g., traffic flows) is differentially controlled for protecting network capacity. For example, various software updates for an OS and one or more applications on the device can be differentially controlled using the various techniques described herein. As another example, security/antimalware software (e.g., antivirus, firewall, content protection, intrusion detection/prevention, and/or other security/antimalware software) can be differentially controlled using the various techniques described herein. As yet another example, network backups/imaging, content downloads (e.g., exceeding a threshold individually and/or in aggregate, such as for image, music, video, eBook content, email attachments, content/media subscriptions, RSS/news feeds, text/image/video chat, software updates, and/or other content downloads) can be differentially controlled using the various techniques described herein.

For example, using the DAS for protecting network capacity techniques described herein an adaptive policy control for protecting network capacity can be provided. A network capacity controlled services list can be generated, updated, reported, and/or received by the device and stored on the device (e.g., the list can be based on adapted to the service plan associated with the device). If a monitored network service usage activity is not on the list, then the device can report the monitored network service usage activity to a network element (e.g., for a monitored network service usage activity that also exceeds a certain threshold, based on a network busy state, based on a time based criteria, and/or other criteria/measure). As an example, monitored network service usage activity can be reported if/when the monitored network service usage activity exceeds a data usage threshold (e.g., 50 MB total data usage per day, a socket opening frequency/rate, velocity of data usage at an instant in time, or more complicated thresholds over time, over peak periods, by content and time, by various other parameters/thresholds). As another example, the monitored network service usage activity can be reported based on testing of the network service usage behavior and/or application developer characterization input. The report can include information that identifies the network service usage activity and various network service usage parameters.

In some embodiments, a notification setting is selected based on a service usage notification policy. In some embodiments, a notification setting includes a user notification setting (e.g., various user notifications settings as described above with respect to FIG. 18).

In some embodiments, classifying the network service usage activity further includes classifying the network service usage activity (e.g., using a usage threshold filter and/or cascading filter techniques) into one or more of a plurality of classification categories for differential network access control for protecting network capacity. In some embodiments, classifying the network service usage activity, further includes classifying the network service usage activity into one or more network capacity controlled services in which the network capacity controlled services include one or more of the following: applications requiring data network access, application software updates, applications requiring network information, applications requiring GPS or physical location, operating system software updates, security software updates, network based backups, email downloads, and a set of activities configured as network capacity controlled service activities based on a service profile and/or user input (e.g., and/or various other types of network service usage activities as described herein and as will now be apparent to one of ordinary skill in the art). For example, network capacity controlled services can include software updates for OS and applications, OS background network accesses, cloud synchronization services, RSS feeds & other background information feeds, browser/application/device behavior reporting, background email downloads, content subscription service updates and downloads (e.g., music/video downloads, news feeds), text/voice/video chat clients, security updates (e.g., antimalware updates), peer to peer networking application updates, inefficient network access sequences during frequent power cycling or power save state cycling, large downloads or other high bandwidth accesses, and greedy application programs that constantly/repeatedly access the network with small transmissions or requests for information. In some embodiments, a network capacity controlled services list is static, adaptive, generated using a service processor, received from a network element (e.g., service controller or service cloud), received from a network element (e.g., service controller or service cloud) and based at least in part on device activity reports received from the service processor, based on criteria set by pre-testing, report of behavior characterization performed by the application developer, and/or based at least in part on user input. In some embodiments, the network capacity controlled services list includes one or more network service activity background (QoS) classes.

In some embodiments, classifying the network service usage activity further includes classifying the network service usage activity based on one or more of the following: application or widget (e.g., Outlook, Skype, iTunes, Android email, weather channel weather widget, iCal, Firefox Browser, etc), application type (e.g., user application, system application/utility/function/process, OS application/utility/function/process, email, browser, widget, malware (such as a virus or suspicious process), RSS feed, device synchronization service, download application, network backup/imaging application, voice/video chat, peer to peer content application or other peer to peer application, streaming media feed or broadcast reception/transmission application, network meeting application, chat application or session, and/or any other application or process identification and categorization), OS/system function (e.g., any system application/utility/ function/process and/or OS application/utility/function/process, such as a OS update and/or OS error reporting), modem function, network communication function (e.g., network discovery or signaling, EtherType messages, connection flow/stream/session set up or tear down, network authentication or authorization sequences, IP address acquisition, and DNS services), URL and/or domain, destination/source IP address, protocol, traffic type, socket (e.g., IP address, protocol, and/or port), socket address/label/identifier (e.g., port address/port number), content type (e.g., email downloads, email text, video, music, eBooks, widget update streams, and download streams), port (e.g., port number), QoS classification level, time of day, on peak or off peak, network time, network busy state, access network selected, service plan selected, user preferences, device credentials, user credentials, and/or status, modem power cycling or power state changes, modem authentication processes, modem link set up or tear down, modem management communications, modem software or firmware updates, modem power management information, device power state, and modem power state. In some embodiments, classifying the network service usage activity further includes associating the classified network service usage activity with an ID (e.g., an application ID, which can be, for example, a unique number, name, and/or signature). In some embodiments, classifying the network service usage activity further includes classifying the network service usage activity using a plurality of classification parameters, including one or more of the following: application ID, remote IP (e.g., URL, domain, and/or IP address), remote port, protocol, content type, a filter action class (e.g., network busy state class, QoS class, time of day, network busy state, and/or other criteria/measures), and access network selected. In some embodiments, classifying the network service usage activity further includes using a combination of parameters as discussed above to determine the classification of the network service usage activity.

In some embodiments, classifying the network service usage activity further includes classifying the network service usage activity as a network capacity controlled service, a non-network capacity controlled service, a blocked or disallowed service, and/or a not yet classified/identified service (e.g., unknown/yet to be determined classification or pending classification). In some embodiments, an application connection, OS connection, and/or other service activity is classified as a network capacity controlled service activity when the device has been inactive (e.g., or in a power save state) for a period of time (e.g., when the user has not interacted with it for a period of time, when it has not displayed user notification policy, and/or a user input has not been received for a period of time, and/or when a power save state is entered). In some embodiments, an application connection, OS connection, and/or other service activity is classified as a network capacity controlled service activity when the monitored network service usage activity exceeds a data usage threshold for more than one application connection, OS connection, and/or other service activity (e.g., aggregated data usage exceeds the data usage threshold); or for a specific application connection. In some embodiments, an application connection, OS connection, and/or other service activity is classified as a network capacity controlled service activity when the monitored network service usage activity exceeds a data usage threshold based on a predetermined list of one or more data usage limits, based on a list received from a network element, usage time limit (e.g., based on a period of time exceeding a usage limit), and/or based on some other usage related criteria/measures. In some embodiments, classifying the network service usage activity further includes classifying the network service usage activity as a network capacity controlled service based on a network peak time, a network busy state, or a network connection to the device falls below a certain performance level (e.g., higher/lower priorities assigned based on various such criteria/other input/factors).

In some embodiments, one or more of the network capacity controlled services are associated with a different network access policy set for one or more networks and/or one or more alternative networks. In some embodiments, one or more of the network capacity controlled services are associated with a different notification policy set for one or more networks and/or one or more alternative networks. In some embodiments, the network capacity controlled services list is stored on the device. In some embodiments, the network capacity controlled services list is received/periodically updated from a network element and stored on the device. In some embodiments, the network capacity controlled services list includes network capacity controlled services, non-network capacity controlled services (e.g., foreground services or services based on various possibly dynamic criteria are not classified as network capacity controlled services), and an unclassified set of services (e.g., grey list including one or more network service activities pending classification based on further analysis and/or input, such as from a network element, service provider, and/or user). In some embodiments, the network capacity controlled services list is based on one or more of the following: predefined/predesignated (e.g., network, service plan, pre-test and/or characterized by an application developer) criteria; device assisted/based monitoring (e.g., using a service processor); network based monitoring (e.g., using a DPI gateway); network assisted analysis (e.g., based on device reports of DAS activity analysis). For example, the device can report device monitored network service usage activities (e.g., all monitored network service usage activities or a subset based on configuration, threshold, service plan, network, and/or user input) to the network element. As another example, the network element can update the network capacity controlled services list and send the updated list to the device. As yet another example, the network element can perform a statistical analysis of network service activities across a plurality of devices based on the device based and/or network based network service usage activity monitoring/reporting. In some embodiments, a network service usage activity is determined to be an active application or process (e.g., based on a user interaction with the device and/or network service usage activity, such as a pop-up and/or other criteria/measures).

In some embodiments, implementing traffic control for network capacity controlled services is provided using various techniques. In some embodiments, the device includes a service processor agent or function to intercept, block, modify, remove or replace UI messages, notifications or other UI communications generated by a network service activity that whose network service usage is being controlled or managed (e.g., using various measurement points). For example, this technique can be used to provide for an improved user experience (e.g., to prevent an application that is being controlled for protecting network capacity from generating repeated and/or confusing messages/alerts to the user). In some embodiments, a network stack interface of the device is replaced or modified to provide for intercept or discontinuance of network socket interface messages to applications or OS functions or other functions/software.

In some embodiments, implementing traffic control for network capacity controlled services using DAS techniques is provided using various techniques in which the network service usage activity is unaware of network capacity control (e.g., does not support an API or other interface for implementing network capacity control). For example, network service application messaging interface based techniques can be used to implement traffic control. Example network service application messaging interfaces include the following: network stack API, network communication stream/flow interface, network stack API messages, EtherType messages, ARP messages, and/or other messaging or other or similar techniques as will now be apparent to one of ordinary skill in the art in view of the various embodiments described herein. In some embodiments, network service usage activity control policies or network service activity messages are selected based on the set of traffic control policies or service activity messages that result in reduced or modified user notification by the service activity due to network capacity controlled service policies applied to the network service activity. In some embodiments, network service usage activity control policies or network service activity messages are selected based on the set of traffic control policies or service activity messages that result in reduced disruption of device operation due to network capacity controlled service activity policies applied to the network service activity. In some embodiments, network service usage activity control policies or network service activity messages are selected based on the set of traffic control policies or service activity messages that result in reduced disruption of network service activity operation due to network capacity controlled service activity policies applied to the network service activity. In some embodiments, implementing traffic control for network capacity controlled services is provided by intercepting opens/connects/writes. In some embodiments, implementing traffic control for network capacity controlled services is provided by intercepting stack API level or application messaging layer requests (e.g., socket open/send requests). For example, an intercepted request can be copied (e.g., to memory) and queued (e.g., delayed or throttled) or dropped (e.g., blocked). As another example, an intercepted request can be copied into memory and then a portion of the transmission can be retrieved from memory and reinjected (e.g., throttled). As yet another example, intercepting messaging transmissions can be parsed inline and allowed to transmit (e.g., allowed), and the transmission or a portion of the transmission can be copied to memory for classifying the traffic flow. In some embodiments, implementing traffic control for network capacity controlled services is provided by intercepting or controlling or modulating UI notifications. In some embodiments, implementing traffic control for network capacity controlled services is provided by killing or suspending the network service activity. In some embodiments, implementing traffic control for network capacity controlled services is provided by deprioritizing the process(es) associated with the service activity (e.g., CPU scheduling deprioritization).

In some embodiments, implementing traffic control for network capacity controlled services using DAS techniques for network service usage activities that are unaware of network capacity control is provided by emulating network API messaging (e.g., effectively providing a spoofed or emulated network API). For example, an emulated network API can intercept, modify, block, remove, and/or replace network socket application interface messages and/or EtherType messages (e.g., EWOULDBLOCK, ENETDOWN, ENETUNREACH, EHOSTDOWN, EHOSTUNREACH, EALRADY, EINPROGRESS, ECONNREFUSED, EINPROGRESS, ETIMEDOUT, and/other such messages). As another example, an emulated network API can modify, swap, and/or inject network socket application interface messages (socket( ) connect( ) read( ) write( ) close( ) and other such messages) that provide for control or management of network service activity service usage behavior. As yet another example, before a connection is allowed to be opened (e.g., before a socket is opened), transmission, or a flow/stream is initiated, it is blocked and a message is sent back to the application (e.g., a reset message in response to a sync request or another message that the application will understand and can interpret to indicate that the network access attempt was not allowed/blocked, that the network is not available, and/or to try again later for the requested network access). As yet another example, the socket can be allowed to open but after some point in time (e.g., based on network service usage, network busy state, time based criteria, and/or some other criteria/measure), the stream is blocked or the socket is terminated. As yet another example, time window based traffic control techniques can be implemented (e.g., during non-peak, not network busy state times), such as by allowing network access for a period of time, blocking for a period of time, and then repeating to thereby effectively spread the network access out either randomly or deterministically. Using these techniques, an application that is unaware of network capacity control based traffic control can send and receive standard messaging, and the device can implement traffic controls based on the network capacity control policy using messaging that the network service usage activity (e.g., application or OS or software function) can understand and will respond to in a typically predictable manner as would now be apparent to one of ordinary skill in the art.

In some embodiments, implementing traffic control for network capacity controlled services using DAS techniques is provided using various techniques in which the network service usage activity is aware of network capacity control (e.g., the network service usage activity supports an API or other interface for implementing network capacity control). For example, a network access API as described herein can be used to implement traffic control for network capacity controlled services. In some embodiments, the API facilitates communication of one or more of the following: network access conditions, network busy state or network availability state of one or more networks or alternative networks, one or more network capacity controlled service policies (e.g., the network service can be of a current network access setting, such as allow/block, throttle, queue, scheduled time/time slot, and/or defer, which can be based on, for example, a current network, a current network busy state, a time based criteria, a service plan, a network service classification, and/or other criteria/measures), a network access request from a network service activity, a query/polled request to a network service activity, a network access grant to a network service activity (e.g., including a priority setting and/or network capacity controlled service classification, a scheduled time/time slot, an alternative network, and/or other criteria/measures), a network busy state or a network availability state or a network QoS state.

In some embodiments, implementing traffic control for network capacity controlled services using network assisted/based techniques is provided using various techniques in which the network service usage activity is unaware of network capacity control (e.g., does not support an API or other interface for implementing network capacity control). In some embodiments, DPI based techniques are used to control network capacity controlled services (e.g., to block or throttle network capacity controlled services at a DPI gateway).

In some embodiments, implementing traffic control for network capacity controlled services using network assisted/based techniques is provided using various techniques in which the network service usage activity is aware of network capacity control (e.g., does support an API or other interface for implementing network capacity control). In some embodiments, the application/messaging layer (e.g., a network API as described herein) is used to communicate with a network service activity to provide associated network capacity controlled service classifications and/or priorities, network busy state information or network availability of one or more networks or alternative networks, a network access request and response, and/or other criteria/measures as similarly described herein.

In some embodiments, DAS for protecting network capacity includes implementing a service plan for differential charging based on network service usage activities (e.g., including network capacity controlled services). In some embodiments, the service plan includes differential charging for network capacity controlled services. In some embodiments, the service plan includes a cap network service usage for network capacity controlled services. In some embodiments, the service plan includes a notification when the cap is exceeded. In some embodiments, the service plan includes overage charges when the cap is exceeded. In some embodiments, the service plan includes modifying charging based on user input (e.g., user override selection as described herein, in which for example, overage charges are different for network capacity controlled services and/or based on priority levels and/or based on the current access network). In some embodiments, the service plan includes time based criteria restrictions for network capacity controlled services (e.g., time of day restrictions with or without override options). In some embodiments, the service plan includes network busy state based criteria restrictions for network capacity controlled services (e.g., with or without override options). In some embodiments, the service plan provides for network service activity controls to be overridden (e.g., one time, time window, usage amount, or permanent) (e.g., differentially charge for override, differentially cap for override, override with action based UI notification option, and/or override with UI setting). In some embodiments, the service plan includes family plan or multi-user plan (e.g., different network capacity controlled service settings for different users). In some embodiments, the service plan includes multi-device plan (e.g., different network capacity controlled service settings for different devices, such as smart phone v. laptop v. net book v. eBook). In some embodiments, the service plan includes free network capacity controlled service usage for certain times of day, network busy state(s), and/or other criteria/measures. In some embodiments, the service plan includes network dependent charging for network capacity controlled services. In some embodiments, the service plan includes network preference/prioritization for network capacity controlled services. In some embodiments, the service plan includes arbitration billing to bill a carrier partner or sponsored service partner for the access provided to a destination, application, or other network capacity controlled service. In some embodiments, the service plan includes arbitration billing to bill an application developer for the access provided to a destination, application or other network capacity controlled service.

In some application scenarios, excess network capacity demand can be caused by modem power state changes on the device. For example, when an application or OS function attempts to connect to the network for any reason when the modem is in a power save state wherein the modem is not connected to the network, it can cause the modem to change power save state, reconnect to the network, and then initiate the application network connection. In some cases, this can also cause the network to re-initiate a modem connection session (e.g., PPP session) which in addition to the network capacity consumed by the basic modem connection also consumes network resources for establishing the PPP session. Accordingly, in some embodiments, network service usage activity control policies are implemented that limit or control the ability of applications, OS functions, and/or other network service usage activities (e.g., network capacity controlled services) from changing the modem power control state or network connection state. In some embodiments, a service usage activity is prevented or limited from awakening the modem, changing the power state of the modem, or causing the modem to connect to the network until a given time window is reached. In some embodiments, the frequency a service usage activity is allowed to awakening the modem, changing the power state of the modem, or causing the modem is limited. In some embodiments, a network service usage activity is prevented from awakening the modem, changing the power state of the modem, or causing the modem until a time delay has passed. In some embodiments, a network service usage activity is prevented from awakening the modem, changing the power state of the modem, or causing the modem until multiple network service usage activities require such changes in modem state, or until network service usage activity is aggregated to increase network capacity and/or network resource utilization efficiency. In some embodiments, limiting the ability of a network service usage activity to change the power state of a modem includes not allowing the activity to power the modem off, place the modem in sleep mode, or disconnect the modem from the network. In some embodiments, these limitations on network service usage activity to awaken the modem, change the power state of the modem, or cause the modem to connect to a network are set by a central network function (e.g., a service controller or other network element/function) policy communication to the modem. In some embodiments, these power control state policies are updated by the central network function.

Figure 11:
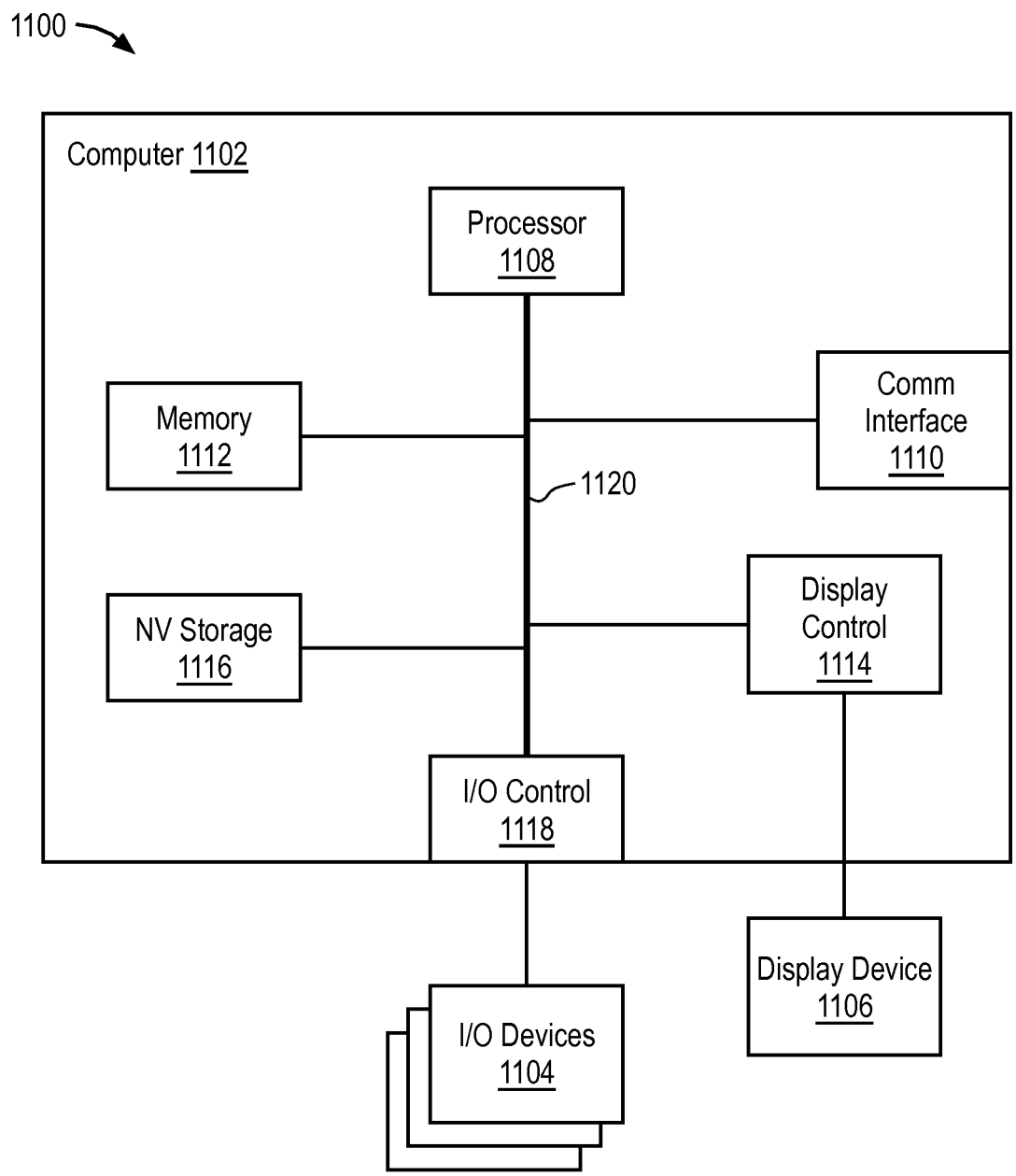
FIG. 11 depicts an example of a computer system on which techniques described in this paper can be implemented.

FIG. 11 depicts an example of a computer system 1100 on which techniques described in this paper can be implemented. The computer system 1100 may be a conventional computer system that can be used as a client computer system, such as a wireless client or a workstation, or a server computer system. The computer system 1100 includes a computer 1102, I/O devices 1104, and a display device 1106. The computer 1102 includes a processor 1108, a communications interface 1110, memory 1112, display controller 1114, non-volatile storage 1116, and I/O controller 1118. The computer 1102 may be coupled to or include the I/O devices 1104 and display device 1106.

The computer 1102 interfaces to external systems through the communications interface 1110, which may include a modem or network interface. It will be appreciated that the communications interface 1110 can be considered to be part of the computer system 1100 or a part of the computer 1102. The communications interface 1110 can be an analog modem, ISDN modem, cable modem, token ring interface, satellite transmission interface (e.g. "direct PC"), or other interfaces for coupling a computer system to other computer systems.

The processor 1108 may be, for example, a conventional microprocessor such as an Intel Pentium microprocessor or Motorola power PC microprocessor. The memory 1112 is coupled to the processor 1108 by a bus 1170. The memory 1112 can be Dynamic Random Access Memory (DRAM) and can also include Static RAM (SRAM). The bus 1170 couples the processor 1108 to the memory 1112, also to the non-volatile storage 1116, to the display controller 1114, and to the I/O controller 1118.

The I/O devices 1104 can include a keyboard, disk drives, printers, a scanner, and other input and output devices, including a mouse or other pointing device. The display controller 1114 may control in the conventional manner a display on the display device 1106, which can be, for example, a cathode ray tube (CRT) or liquid crystal display (LCD). The display controller 1114 and the I/O controller 1118 can be implemented with conventional well known technology.

The non-volatile storage 1116 is often a magnetic hard disk, an optical disk, or another form of storage for large amounts of data. Some of this data is often written, by a direct memory access process, into memory 1112 during execution of software in the computer 1102. One of skill in the art will immediately recognize that the terms "machine-readable medium" or "computer-readable medium" includes any type of storage device that is accessible by the processor 1108 and also encompasses a carrier wave that encodes a data signal.

The computer system 1100 is one example of many possible computer systems which have different architectures. For example, personal computers based on an Intel microprocessor often have multiple buses, one of which can be an I/O bus for the peripherals and one that directly connects the processor 1108 and the memory 1112 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1112 for execution by the processor 1108. A Web TV system, which is known in the art, is also considered to be a computer system, but it may lack some of the features shown in FIG. 11, such as certain input or output devices. A typical computer system will usually include at least a processor, memory, and a bus coupling the memory to the processor.

In addition, the computer system 1100 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1116 and causes the processor 1108 to execute the various acts required by the operating system to input and output data and to store data in memory, including storing files on the non-volatile storage 1116.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Although the foregoing embodiments have been described in some detail for purposes of clarity of understanding, the invention is not limited to the details provided. There are many alternative ways of implementing the invention. The disclosed embodiments are illustrative and not restrictive.

Hierarchal Design from Existing Objects (e.g. Service Activities)

1. A method comprising:

identifying, at a service design system, one or more filters, each filter for identifying network data traffic as associated with one or more network services;

generating one or more service objects using the one or more filters, each service object for identifying network data traffic belonging to a category of one or more network services;

generating a service plan using the one or more service objects, the service plan for managing use of the one or more network services or of the one or more categories of one or more network services by an end user device;

associating at least one sub-plan-level policy with at least one of the one or more filters or with at least one of the one or more service objects, the at least one sub-plan-level policy for defining rules of use of a specified network service or of a specified category of one or more network services; and using the one or more filters of the service plan and the at least one sub-plan-level policy to generate computer code for assisting a policy implementation element to manage use of the particular network service or the particular category of one or more network services on the end user device in accordance with the at least one sub-plan-level policy.

2. The method of claim 1, wherein at least one of the one or more network services includes a web page.

3. The method of claim 1, wherein at least one of the one or more network services includes a domain.

4. The method of claim 1, wherein at least one of the one or more network services includes an application.

5. The method of claim 1, wherein at least one of the one or more network services includes a tethering function.

6. The method of claim 1, wherein at least one of the one or more network services includes a roaming data network function.

7. The method of claim 1, wherein one of the one or more categories includes email services.

8. The method of claim 1, wherein one of the one or more categories includes social networking services.

9. The method of claim 1, wherein one of the one or more categories includes a domain, and the network services of the category include a plurality of web pages.

10. The method of claim 1, wherein one of the one or more categories includes a music download service.

11. The method of claim 1, wherein one of the one or more categories includes video game services.

12. The method of claim 1, wherein one of the one or more categories includes multimedia services.

13. The method of claim 1, wherein the rules include notification rules defining user notifications triggers.

14. The method of claim 1, wherein the rules include access rules defining access rights.

15. The method of claim 1, wherein the rules include accounting rules defining use-based accounting metrics.

16. The method of claim 1, wherein the policy implementation element is on the end user device.

17. The method of claim 1, wherein the policy implementation element is on a network element remote from the end user device.

18. The method of claim 1, wherein each of the steps is performed via a single interface.

19. The method of claim 1, wherein the one or more service objects include two service objects, and the two service objects each include an instance of the same filter.

20. The method of claim 1, wherein
at least one of the one or more service objects comprises a service activity including a group of one or more filters, and comprises a service component including a group of one or more service activities, and
the service plan comprises one or more service components.

21 The method of claim 20, wherein one of the at least one sub-plan-level policy includes at least one of an activity-level policy or a component-level policy.

22. The method of claim 1, further comprising
creating a device group of one or more end user devices; and
providing the computer code to an element group of one or more policy implementation elements to manage the specified network service or the specified category of network services on the one or more end user devices of the device group in accordance with the at least one sub-plan-level policy.

23. The method of claim 22, wherein the device group includes a beta test group of one or more end user devices.

24. The method of claim 22,
wherein the beta test group is different than the device group, and
further comprising providing the computer code to a beta test element group of one or more policy implementation elements to manage the specified network service or the specified category of network services on the one or more end user devices of the beta test group in accordance with the at least one sub-plan-level policy, before providing the computer code to the one or more end user devices of the device group.

25. The method of claim 1, wherein a filter identifies all network data traffic as associated therewith.

25++. The method of claim 1, wherein the computer code is generated for a programmable circuit.

26. A service design system, comprising:
a first interface mechanism for identifying one or more filters, each filter for identifying network data traffic as associated with one or more network services;
a second interface mechanism for generating one or more service objects using the one or more filters, each service object for identifying network data traffic belonging to a category of one or more network services;
a third interface mechanism for generating a service plan using the one or more service objects, the service plan for managing use of the one or more network services or of the one or more categories of one or more network services by an end user device;
a fourth interface mechanism for associating at least one sub-plan-level policy with at least one of the one or more filters or with at least one of the one or more service objects, the at least one sub-plan-level policy for defining rules of use of a specified network service or of a specified category of one or more network services; and
a processor for using the one or more filters of the service plan and the at least one sub-plan-level policy to generate computer code for assisting a policy implementation element to manage use of the particular network service or the particular category of one or more network services on the end user device in accordance with the at least one sub-plan-level policy.

27. The system of claim 26, wherein at least one of the one or more network services includes a web page.

28. The system of claim 26, wherein at least one of the one or more network services includes a domain.

29. The system of claim 26, wherein at least one of the one or more network services includes an application.

30. The system of claim 26, wherein at least one of the one or more network services includes a tethering function.

31. The system of claim 26, wherein at least one of the one or more network services includes a roaming data network.

32. The system of claim 26, wherein one of the one or more categories includes email services.

33. The system of claim 26, wherein one of the one or more categories includes social networking services.

34. The system of claim 26, wherein one of the one or more categories includes a domain, and the network services of the category include a plurality of web pages.

35. The system of claim 26, wherein one of the one or more categories includes a music download service.

36. The system of claim 26, wherein one of the one or more categories includes video game services.

37. The system of claim 26, wherein one of the one or more categories includes multimedia services.

38. The system of claim 26, wherein the rules include notification rules defining user notifications triggers.

39. The system of claim 26, wherein the rules include access rules defining access rights.

40. The system of claim 26, wherein the rules include accounting rules defining use-based accounting metrics.

41. The system of claim 26, wherein the policy implementation element is on the end user device.

42. The system of claim 26, wherein the policy implementation element is on a network element remote from the end user device.

43. The system of claim 26, wherein the first, second, third and fourth interface mechanism are all portions of a single interface.

44. The system of claim 26, wherein the one or more service objects include two service objects, and the two service objects each include an instance of the same filter.

45. The system of claim 26, wherein
at least one of the one or more service objects comprises a service activity including a group of one or more filters, and comprises a service component including a group of one or more service activities, and
the service plan comprises one or more service components.

46 The system of claim 45, wherein one of the at least one sub-plan-level policy includes at least one of an activity-level policy or a component-level policy.

47. The system of claim 26, further comprising
a fifth interface mechanism for creating a device group of one or more end user devices; and
a transmitter mechanism for providing the computer code to an element group of one or more policy implementation elements to manage the specified network service or the specified category of network services on the one or more end user devices of the device group in accordance with the at least one sub-plan-level policy.

48. The system of claim 47, wherein the device group includes a beta test group of one or more end user devices.

49. The system of claim 47, wherein
the beta test group is different than the device group, and
wherein the transmitter mechanism is operative to provide the computer code to a beta test element group of one or more policy implementation elements to manage the specified network service or the specified category of network services on the one or more end user devices of the beta test group in accordance with the at least one sub-plan-level policy, before providing the computer code to the one or more end user devices of the device group.

50. The system of claim 26, wherein a filter identifies all network data traffic as associated therewith.

51. The system of claim 26, wherein the processor generates the computer code for a programmable circuit.

Design and Implementation: Order of classifying data

1. A method comprising:
identifying filters at a service design system, each filter for classifying network data traffic as associated with one or more network services;
generating service objects using the filters, each service object for classifying network data traffic as associated with a group of the one or more network services;
generating a service plan using the service objects, the service plan for managing use of the network services associated with the service objects;
prioritizing the service objects to avoid conflicting classifications of network data traffic by alternative service objects, the alternative service objects capable of classifying the network data traffic as associated therewith;
associating policies with the service objects, each policy for defining rules of use of the group of the one or more network services corresponding to an associated service object; and
using the service objects and the policies to generate computer code for assisting a policy implementation element to manage use of the network services on the end user device.

2. The method of claim 1, wherein the one or more network services includes a web page.

3. The method of claim 1, wherein the one or more network services includes a domain.

4. The method of claim 1, wherein the one or more network services includes an application.

5. The method of claim 1, wherein the one or more network services includes a tethering function.

6. The method of claim 1, wherein the one or more network services includes a roaming data network function.

7. The method of claim 1, wherein the one or more network services includes a category of network services.

8. The method of claim 1, wherein the group includes a category of network services.

9. The method of claim 1, wherein the group includes sponsored services.

10. The method of claim 1, wherein the group of one or more services includes the services provided by a single entity.

11. The method of claim 1, wherein the group includes a domain, and the network services of the group include a plurality of web pages.

12. The method of claim 1, wherein the rules include notification rules defining user notifications triggers.

13. The method of claim 1, wherein the rules include access rules defining access rights.

14. The method of claim 1, wherein the rules include accounting rules defining use-based accounting metrics.

15. The method of claim 1, wherein the policy implementation element is on the end user device.

16. The method of claim 1, wherein the policy implementation element is on a network element remote from the end user device.

17. The method of claim 1, wherein each of the steps is performed via a single interface.

18. The method of claim 1, wherein the service objects include two service objects each including an instance of the same filter.

19. The method of claim 1, wherein
at least one of the service objects comprises a service activity including a group of one or more filters, and comprises a service component including a group of one or more service activities, and
the service plan comprises one or more service components.

20 The method of claim 19, wherein at least one of the policies includes at least one of an activity-level policy or a component-level policy.

21. The method of claim 1, wherein the computer code is generated for a programmable circuit.

22. The method of claim 1, wherein a filter identifies all network data traffic as associated therewith.

23. The method of claim 1, wherein at least one service object is generated using only one filter.

24. The method of claim 1, wherein the prioritizing includes prioritizing sponsored services ahead of unsponsored services.

25. The method of claim 1,
wherein the service objects includes a first service object and a second service object, each of the first and second service objects configured to classify particular network data traffic with its associated one or more network services, and wherein the prioritizing includes configuring the first service object to apply until a restriction, and the second service object to apply after the restriction.

26. The method of claim 25, wherein the restriction includes a state condition.

27. The method of claim 25, wherein the restriction includes a usage threshold.

28. The method of claim 1, further comprising providing the computer code to the policy implementation element.

29. A method, comprising:

receiving computer instructions from a service design system;

using the computer instructions to install on an end user device prioritized service objects and policies associated with the service objects, the prioritized service objects and associated policies for managing use of one or more network data services;

receiving network data traffic or a request for network data services at an end user device;

applying, by a policy implementation element, one or more of the prioritized service objects to classify the network data traffic or the request for network data services as belonging to at least one of the one or more network data services and as associated with a particular service object;

applying, by a policy implementation element, a particular policy associated with the particular service object to effect the rules of use of the at least one of the one or more network data services.

30. The method of claim 29, further comprising:

determining that the usage of the applicable classification has reached a first limit when a first packet belonging to the first classification is received;

applying one or more additional filters to the first packet; and classifying the packet as belonging to a second classification of the at least two different classifications.

31. The method of claim 29, wherein the one or more policies corresponding to the applicable classification include a skip policy, the method further comprising:

stopping of applying any more policies for the applicable classification; and applying one or more additional filters to the data traffic to determine another applicable classification for the data traffic.

III. Design and Implementation: Policy Modifiers

A. Classification and at Least One Network Policy Modifier

35. A method for designing a service plan group including a plurality of network data services to be provided by an access network to one or more communications devices, the method comprising:

creating each of a plurality of service objects by:

receiving, at an interface of a service design system, one or more filters for a respective service component, each filter including a set of one or more parameters, each set of parameters adapted to classify data traffic as being associated with the respective service object, the data traffic to be communicated on the at least one access network;

providing, to a user, an interface mechanism to select one or more network state categories from a plurality of network state categories and at least one network state value for a selected network state category, each network state category having a plurality of network state values;

receiving a selection of the one or more network state categories and one or more network state values for the selected network state category;

designating one or more policies to combinations of each service object and at least one network state value of a selected network state category;

creating the service plan group based on the plurality of service objects, the policies, and the policy designations, wherein the policy designations of the service plan group facilitates implementing policies for data traffic of a communications device subscribing to the service plan based on current network state values of the selected network state categories; and translating the service plan group into instructions capable of being used to program one or more policy implementation elements to implement the policies for the data traffic of the communications device.

36. The method of claim 35, wherein a service object is a service component or a service plan that includes service components.

37. The method of claim 35, further comprising:

designating one or more policies to each combination of service object and each network state value of each selected network state category.

38. The method of claim 35, further comprising:

providing, to the user, an input mechanism for receiving one or more policies for each combination of service object and each network state value of each selected network state category.

39. The method of claim 35, further comprising:

receiving a plurality of usage state values, a usage state value indicating an amount of network usage classified to a service object, the classification being determined by the one or more filters of the service object; and designating one or more policies to each combination of classification, usage state value, and each network state value of each selected network category.

40. The method of claim 35, wherein the interface mechanism allows selecting the one or more network state categories separately for each service object.

41. The method of claim 35, wherein the interface mechanism allows a user to specify one or more network state configurations, a first network state configuration including:

a network state value for each of the network state categories selected for the first network state configuration; and a wildcard symbol for the network state categories not selected for the first network state configuration, wherein the wildcard symbol matches any network state value for the non-selected category, wherein one or more policies are designated for each network state configuration.

42. The method of claim 41, further comprising:

receiving, from the user, one or more policies for each network state configuration.

43. The method of claim 41, further comprising:

receiving an order of the network state configurations, the order being used by the one or more policy implementation elements to determine a network state configuration that first matches with the current network state values and the corresponding one or more policies to implement for data traffic of the communications device.

44. The method of claim 42, wherein the interface mechanism allows a user to separately specify one or more network state configurations for each service object.

45. The method of claim 35, wherein the policy designations are arranged in a multidimensional array, wherein each selected network category is a separate dimension of the multidimensional array, and wherein the plurality of service objects comprise a dimension of the multidimensional array.

46. The method of claim 35, wherein the plurality of network state categories includes congestion state, location of the network, type of network, and network routing identifiers.

47. The method of claim 46, wherein the network state values for the location of the network include home and at least one roaming network.

48. The method of claim 46, wherein the network state values for the congestion state are based on at least one of time of day, a device measure of network congestion, and a network measure of network congestion.

49. The method of claim 48, wherein the network state values are based on a measure of network congestion, the measure of network congestion including at least one of traffic delay, delay jitter, and network packet error rate.

50. The method of claim 48, further comprising:
receiving, from a user, a specification of how a network state value for the congestion state is to be determined.

51. The method of claim 46, wherein the network state values for the type of network include at least two or more selected from a group consisting of: 2G, 3G, 4G, and Wi Fi.

52. The method of claim 35, wherein each parameter in a set is for a respective category of data traffic attributes.

B. Two Policy Modifiers

53. A method for designing a service plan group including one or more network services to be provided by an access network to one or more communications devices, the method comprising:
providing, by a service design system to a user, an interface mechanism to select a plurality of network state categories and at least one network state value for a selected network state category, each network state category having a plurality of network state values;
receiving a selection of the plurality of network state categories and one or more network state values for each of the selected network state categories;
designating one or more policies to a plurality of combinations of network state values for the selected network state categories;
creating the service plan group based on the policies and the policy designations, wherein the policy designations of the service plan group facilitates implementing policies for a communications device subscribing to the service plan group based on current network state values of the selected network state categories; and
translating the service plan group into instructions capable of being used to program one or more policy implementation elements to implement the policies for the data traffic of the communications device.

54. The method of claim 53, further comprising:
designating one or more policies to each combination of network state values for the selected network state categories.

55. The method of claim 53, further comprising:
creating each of a plurality of service objects by:
receiving, at an interface of a service design system, one or more filters for a respective service object, each filter including a set of one or more parameters, each set of parameters adapted to classify data traffic as being associated with the respective service object, the data traffic to be communicated on the at least one access network; and
designating one or more policies to each combination of service object and each network state value of each selected network state category.

56. The method of claim 55, wherein a service object is a service component or a service plan that includes service components.

57. The method of claim 53, further comprising:
receiving a plurality of usage state values, a usage state value indicating an amount of network usage; and
designating one or more policies to each combination of usage state value and each network state value of each selected network category.

C. Implementation With Two Network State Categories

58. A method of implementing a policy for a communications device's use of a network service of an access network, the method comprising:
obtaining network state information;
determining a set of current state values of the access network based on the network state information, each current state value associated with a respective network state category, each network state category having a plurality of network state values;
using the set of current state values to access an array of policies;
retrieving, from the array, a first policy that corresponds to the set of current state values;
receiving one or more packets of data traffic associated with the communications device during the current state of the access network; and
applying, by a policy implementation element, the first policy to the one or more packets of the data traffic.

59. The method of claim 58, wherein using the current state values to access an array of policies includes:
comparing the set of current state values to one or more network state configurations to determine a network state configuration that matches to the set of current state values, each network state configuration associated with one or more policies.

60. The method of claim 59, wherein the comparing is performed in a specified order, the method further comprising:
retrieving the one or more policies associated with the first network state configuration that matches to the set of current state values.

61. The method of claim 58, further comprising:
converting one or more of the current state values to a corresponding predetermined network state value of a respective network state category.

62. The method of claim 61, wherein the respective network state category corresponds to network congestion, and wherein the predetermined network state values correspond to different levels of congestion.

63. The method of claim 58, further comprising:
converting the set of current state values to a network state index of an indexed array of policies; and
using the network state index to retrieve the first policy.

64. The method of claim 63, wherein the first policy is retrieved from a multidimensional array, wherein each of the selected network state categories corresponds to a dimension of the multidimensional array.

65. The method of claim 63, wherein the indexed array contains pointers to the policies.

66. The method of claim 63, further comprising:
detecting when the network state information changes, wherein the converting the network state information to a network state index of an indexed array of policies occurs when the network state information changes.

67. The method of claim 58, wherein the respective network state categories include congestion state, location of the network, type of network, and network routing identifier.

68. The method of claim 67, wherein the network state values for the location of the network include home and at least one roaming network.

69. The method of claim 67, wherein the network state values for the congestion state are based on at least one of time of day, a device measure of network congestion, and a network measure of network congestion.

70. The method of claim 69, wherein the network state values are based on a measure of network congestion, the measure of network congestion including at least one of traffic delay, delay jitter, and network packet error rate.

71. The method of claim 67, wherein the network state values for the type of network include at least two or more selected from a group consisting of: 2G, 3G, 4G, and Wi Fi.

IV. Design of a Policy: Events

A. Event Associated with 2 of 3 Policies

72. A method for designing a service plan including one or more network services to be provided by an access network to one or more communications devices, the method comprising:

providing, by a service design system to a user, an interface mechanism to provide input defining an event associated with a use of the access network according to the service plan;

receiving, from the user, the input defining the event;

receiving, from the user, a plurality of service policies associated with the event, the service policies including at least two of an access policy that defines rights to access a network service, a charging policy that defines charges for using the network service, and a notification policy that defines when to provide notifications corresponding to the network service; and creating the service plan based on the event and the plurality of service policies; and translating the service plan into instructions capable of being used to program one or more policy implementation elements to implement the service policies when the event is detected for a communications device's use of the access network, the communications device subscribing to the service plan.

73. The method of clam 72, further comprising:

identifying a first group of remote communications devices to be bound to the service plan; and providing the instructions to a second group of policy implementation elements capable of implementing the policy for the first group of remote communications devices.

74. The method of clam 72, wherein the interface mechanism includes one or more picklists for defining the event, each picklist including a plurality of options.

75. The method of clam 74, wherein the one or more picklists include:

a first picklist that includes at least one option that corresponds to a measure for an amount of usage of a network service; and one or more second picklists that include options for specifying the amount of usage.

B. Event and Device State Provides Notification

76. A method for designing a service plan including one or more network services to be provided by an access network to one or more communications devices, the method comprising:

providing, by a service design system to a user, a first interface mechanism to provide input defining one or more events associated with a use of the access network according to the service plan;

receiving, from the user, the input defining the one or more events;

providing a second interface mechanism for specifying one or more device states of a communications device, a device state being a property of only the communications device;

receiving the one or more device states;

receiving a notification policy associated with the one or more events and the one or more device states, the notification policy defining a conditional relationship between the one or more events and the one or more device states such that a notification message is displayed to a user of a communications device subscribing to the service plan;

creating the service plan based on the one or more events, the one or more device states, and the notification policy; and translating the service plan into instructions capable of being used to program one or more policy implementation elements to implement the notification policy when the one or more events are detected for the communications device's use of the access network and the conditional relationship exists, the communications device subscribing to the service plan.

77. The method of claim 76, wherein the one or more events include a classification of data traffic of the communications device into a first type of data traffic, the classification being determined by one or more filters of the service plan.

78. The method of claim 76, wherein a device state includes an application presently running on the device, a location of the device, 79. The method of claim 76, wherein the one or more events is only one event, and the conditional relationship includes the one or more device states being present when the only one event is detected.

80. The method of claim 76, wherein the conditional relationship specifies one or more window criteria between when one or more of the events was detected and when one of the device states was last present on the communications device.

81. The method of claim 80, wherein the window criteria includes a time and/or a usage amount.

82. The method of claim 76, wherein the conditional relationship specifies an order of the events.

83. The method of claim 76, wherein the conditional relationship specifies an order for when the device states were present on the communications device.

C. Implementation of Event and Device State Induced Notification

84. A method of implementing a notification policy for a communications device's use of a network service of an access network, the method comprising:

detecting one or more events associated with a communications device's use of the access network according to the service plan;

identifying one or more current or recent device states of the communications device, a device state being a property of only the communications device;

determining whether a conditional relationship exists between the one or more events and the one or more current or recent device states according to a notification policy of a service plan subscribed to by the communications device; and sending a notification request to a notification agent on the communications device when the conditional relationship is satisfied.

85. The method of claim 84, wherein the notification request is sent from a network element to the notification agent on the communications device.

86. The method of claim 84, wherein the notification request is sent from a policy implementation agent on the communications device to the notification agent on the communications device.

We claim:

1. A network service plan provisioning system communicatively coupled to a wireless end-user device over a wireless access network, the network service plan provisioning system comprising one or more network elements configured to:

obtain and store a first service plan component and a second service plan component, the first service plan component comprising (1) information specifying a first traffic classification filter for filtering a traffic event in a network traffic inspection system, the traffic event being associated with the wireless end-user device and (2) a first network policy enforcement action that is triggered in a network policy enforcement system when the traffic event possesses a characteristic that matches the first traffic classification filter, and the second service plan component comprising (a) information specifying a second traffic classification filter for filtering the traffic event in the network traffic inspection system, and (b) a second network policy enforcement action that is triggered in the network policy enforcement system when the traffic event possesses a characteristic that matches the second traffic classification filter;

process the first service plan component and the second service plan component to create a network provisioning instruction set in accordance with a prioritization of the first traffic classification filter over the second traffic classification filter, the network provisioning instruction set comprising one or more traffic inspection provisioning instructions for the network traffic inspection system and one or more policy enforcement provisioning instructions for the network policy enforcement system, the network traffic inspection system and the network policy enforcement system implementing one or more policies applicable to the wireless end-user device;

provide the one or more traffic inspection provisioning instructions to the network traffic inspection system; and provide the one or more policy enforcement provisioning instructions to the network policy enforcement system.

2. The network service plan provisioning system of claim 1, wherein process the first service plan component and the second service plan component to create a network provisioning instruction set in accordance with a prioritization of the first traffic classification filter over the second traffic classification filter comprises order traffic inspection comparison operations in the one or more traffic inspection provisioning instructions such that the one or more traffic inspection provisioning instructions direct the network traffic inspection system to determine whether the traffic event possesses the characteristic that matches the first traffic classification filter before determining whether the traffic event possesses the characteristic that matches the second traffic classification filter.

3. The network service plan provisioning system of claim 2, wherein process the first service plan component and the second service plan component to create a network provisioning instruction set in accordance with a prioritization of the first traffic classification filter over the second traffic classification filter further comprises include in the network provisioning instruction set one or more instructions directing the network traffic inspection system to determine whether the traffic event possesses the characteristic that matches the second traffic classification filter only if the traffic event does not possess the characteristic that matches the first traffic classification filter.

4. The network service plan provisioning system of claim 2, wherein process the first service plan component and the second service plan component to create a network provisioning instruction set in accordance with a prioritization of the first traffic classification filter over the second traffic classification filter further comprises include in the network provisioning instruction set one or more instructions directing the network traffic inspection system to determine whether the traffic event also possesses the characteristic that matches the second traffic classification filter if the traffic event possesses the characteristic that matches the first traffic classification filter.

5. The network service plan provisioning system of claim 1, further comprising:

a policy enforcement priority rule datastore including a policy enforcement priority rule for determining whether the traffic event possesses the characteristic that matches the first traffic classification filter before determining whether the traffic event possesses the characteristic that matches the second traffic classification filter, and wherein process the first service plan component and the second service plan component to create a network provisioning instruction set in accordance with a prioritization of the first traffic classification filter over the second traffic classification filter comprises include the policy enforcement priority rule in the network provisioning instruction set.

6. The network service plan provisioning system of claim 5, wherein the policy enforcement priority rule comprises a priority order for a plurality of traffic classification filters, the plurality of traffic classification filters including the first traffic classification filter and the second traffic classification filter.

7. The network service plan provisioning system of claim 5, wherein the policy enforcement priority rule comprises a priority specification for one or both of the first service plan component and the second service plan component.

8. The network service plan provisioning system of claim 1, wherein at least one of the one or more policies is dependent on a network state.

9. The network service plan provisioning system of claim 8, wherein the network state comprises a congestion state of the wireless access network, a network location, a type of the wireless access network, whether the wireless access network is a roaming network, a routing identifier associated with the wireless access network, or a combination of these.

10. The network service plan provisioning system of claim 9, wherein the congestion state is based on a time of day, a measure of network congestion, a measure of a delay, a measure of a jitter, a packet error rate, or a combination of these.

11. The network service plan provisioning system of claim 5, wherein the one or more network elements are further configured to provide a user interface for a service plan design environment that provides for entering the policy enforcement priority rule in the design environment by entering a priority assignment for the first service plan component, entering a priority assignment for the second service plan component, positioning the first and second service plan components in a priority ordering, defining the first or second service plan component as belonging to a service type that has an implied or literal ordering, or a combination of these.

12. The network service plan provisioning system of claim 1, wherein the information specifying the first traffic classification filter comprises an inspection criterion selected from a group of inspection criteria consisting of: specific device application, a specific network destination, a specific network source, a specific traffic type, a specific content type, a specific traffic protocol, and a combination of two or more of the inspection criteria.

13. The network service plan provisioning system of claim 1, wherein the first or second policy enforcement action is an action selected from a group of actions consisting of: apply a traffic control policy; apply a service usage accounting, charging, or billing policy; apply a service notification policy; and a combination of two or more of the actions.

14. The network service plan provisioning system of claim 1, wherein the one or more network elements are further configured to include in the network provisioning instruction set an instruction to assist in enforcing a sponsored charging policy.

15. The network service plan provisioning system of claim 1, wherein the one or more network elements are further configured to include in the network provisioning instruction set an instruction to assist in enforcing a classification-based charging policy, wherein the classification is selected from the group of classification categories consisting of: application, destination, network, time of day, congestion state, quality of service, content type, and a combination of two or more of the classification categories.

16. The network service plan provisioning system of claim 1, wherein the one or more network elements are further configured to include in the network provisioning instruction set an instruction to assist in presenting a service buy page notification with an actionable response.

17. The network service plan provisioning system of claim 1, wherein the one or more network elements are further configured to include in the network provisioning instruction set an instruction to assist in generating a usage notification in response to a device state or a network state.

18. The network service plan provisioning system of claim 1, wherein the one or more network elements are further configured to include in the network provisioning instruction set an instruction to assist in generating a marketing intercept offer notification specific to a device or a network state.

19. The network service plan provisioning system of claim 1, wherein the one or more network elements are further configured to include in the network provisioning instruction set an instruction to assist in generating a roaming notification specific to a device or a network state.

20. The network service plan provisioning system of claim 1, wherein the one or more network elements are further configured to provide a user interface for a service plan design environment that provides for a hierarchical definition and display of one or more of: the first service plan component, the second service plan component, the first traffic classification filter, the second traffic classification filter, the first policy enforcement action, or the second policy enforcement action.

21. The network service plan provisioning system of claim 1, wherein the one or more network elements are further configured to facilitate reuse of the first service plan component, the second service plan component, the first traffic classification filter, the second traffic classification filter, the first policy enforcement action, or the second policy enforcement action in a plurality of service plans by storing the first service plan component, the second service plan component, the first traffic classification filter, the second traffic classification filter, the first policy enforcement action, and the second policy enforcement action as one or more objects in a catalog.

22. The network service plan provisioning system of claim 1, wherein the first service plan component further comprises an additional policy enforcement action to augment the first policy enforcement action, and wherein the second service plan component further comprises the additional policy enforcement action to augment the second policy enforcement action.

23. The network service plan provisioning system of claim 1, wherein the first service plan component further comprises an additional policy enforcement action to over-ride the first policy enforcement action, and wherein the second service plan component further comprises the additional policy enforcement action to over-ride the second policy enforcement action.

24. The network service plan provisioning system of claim 1, wherein the one or more network elements are further configured to facilitate grouping of the first and second service plan components and provide for grouping of the first and second service plan components into a larger service plan object definition.

25. The network service plan provisioning system of claim 1, wherein the one or more network elements are further configured to facilitate grouping of the first and second service plan components and provide for an additional policy enforcement action applied at a service plan group level that augments the first policy enforcement action and the second policy enforcement action.

26. The network service plan provisioning system of claim 1, wherein the one or more network elements are further configured to facilitate grouping of the first and second service plan components and provide for an additional policy enforcement action applied at a service plan group level that over-rides the first policy enforcement action and the second policy enforcement action.

27. The network service plan provisioning system of claim 1, wherein the one or more network elements are further configured to facilitate grouping of the first and second service plan components and provide one or more service plan component group policy enforcement priority rules comprising a specification for how to resolve one or more policy enforcement ambiguities at a service plan component group level.

28. The network service plan provisioning system of claim 1, wherein the one or more network elements are further configured to obtain service plan parameters for multiple service plans, combine one or more service policies for the multiple service plans into one composite-plan policy set, and provision the network policy enforcement system to enforce the composite policies for the multiple service plans.

29. The network service plan provisioning system of claim 28, wherein the one or more network elements are further configured to provide a composite-plan policy enforcement priority rule comprising a specification for how to resolve one or more policy enforcement ambiguities between traffic classification or policy enforcement instructions for two or more composite-plans.

30. The network service plan provisioning system of claim 1, wherein the first service plan component is associated with a first priority, and wherein the second service plan component is associated with a second priority, the second priority being lower than the first priority, and wherein process the first service plan component and the second service plan component to create a network provisioning instruction set in accordance with a prioritization of the first traffic classification filter over the second traffic classification filter comprises include in the network provisioning instruction set one or more first instructions directing the network traffic inspection system to determine whether the traffic event possesses the characteristic that matches the first traffic classification filter and to determine whether the traffic event possesses the characteristic that matches the second traffic classification filter, and one or more second instructions directing the network policy enforcement system to enforce the first network policy enforcement action when the traffic event possesses both the characteristic that matches the first traffic classification filter and the characteristic that matches the second traffic classification filter.

31. The network service plan provisioning system of claim 1, wherein the first service plan component is associated with a first priority, and wherein the second service plan component is associated with a second priority, the second priority being lower than the first priority, and wherein process the first service plan component and the second service plan component to create a network provisioning instruction set in accordance with a prioritization of the first traffic classification filter over the second traffic classification filter comprises include in the network provisioning instruction set one or more first instructions directing the network traffic inspection system to determine whether the traffic event possesses the characteristic that matches the first traffic classification filter, and one or more second instructions directing the network policy enforcement system to enforce only the first network policy enforcement action when the traffic event possesses the characteristic that matches the first traffic classification filter.

32. The network service plan provisioning system of claim 1, wherein the first service plan component is associated with a first priority, and wherein the second service plan component is associated with a second priority, the second priority being lower than the first priority, and wherein process the first service plan component and the second service plan component to create a network provisioning instruction set in accordance with a prioritization of the first traffic classification filter over the second traffic classification filter comprises include in the network provisioning instruction set one or more first instructions directing the network traffic inspection system to determine whether the traffic event possesses the characteristic that matches the first traffic classification filter and to determine whether the traffic event possesses the characteristic that matches the second traffic classification filter, and one or more second instructions directing the network policy enforcement system to enforce the first network policy enforcement action and the second network policy enforcement action when the traffic event possesses both the characteristic that matches the first traffic classification filter and the characteristic that matches the second traffic classification filter.

33. The network service plan provisioning system of claim 1, wherein process the first service plan component and the second service plan component to create a network provisioning instruction set in accordance with a prioritization of the first traffic classification filter over the second traffic classification filter comprises order one or more first instructions associated with the first traffic classification filter and one or more second instructions associated with the second traffic classification filter so that the first traffic classification filter is applied to the traffic event before the second traffic classification filter is applied to the traffic event.

34. The network service plan provisioning system of claim 1, wherein process the first service plan component and the second service plan component to create a network provisioning instruction set in accordance with a prioritization of the first traffic classification filter over the second traffic classification filter comprises include one or more instructions directing the network traffic inspection system to trap a match of the first traffic classification filter in a kernel until the second traffic classification filter is matched.

35. The network service plan provisioning system of claim 1, wherein process the first service plan component and the second service plan component to create a network provisioning instruction set in accordance with a prioritization of the first traffic classification filter over the second traffic classification filter comprises apply an explicit priority rule.

36. The network service plan provisioning system of claim 1, wherein process the first service plan component and the second service plan component to create a network provisioning instruction set in accordance with a prioritization of the first traffic classification filter over the second traffic classification filter comprises configure the one or more traffic inspection provisioning instructions so that the network traffic inspection system determines whether the traffic event possesses the characteristic that matches the first traffic classification filter before determining whether the traffic event possesses the characteristic that matches the second traffic classification filter.

37. The network service plan provisioning system of claim 1, wherein process the first service plan component and the second service plan component to create a network provisioning instruction set in accordance with a prioritization of the first traffic classification filter over the second traffic classification filter comprises configure the one or more policy enforcement provisioning instructions so that the network policy enforcement system applies the first policy enforcement action before applying the second policy enforcement action.

38. The network service plan provisioning system of claim 1, wherein process the first service plan component and the second service plan component to create a network provisioning instruction set in accordance with a prioritization of the first traffic classification filter over the second traffic classification filter comprises configure the one or more traffic inspection provisioning instructions so that when the traffic event possesses the characteristic that matches the first traffic classification filter, the network policy enforcement system applies the first policy enforcement action, and the network traffic inspection system does not determine whether the traffic event possesses the characteristic that matches the second traffic classification filter.

39. The network service plan provisioning system of claim 1, wherein process the first service plan component and the second service plan component to create a network provisioning instruction set in accordance with a prioritization of the first traffic classification filter over the second traffic classification filter comprises configure the network provisioning instruction set so that when the traffic event possesses the characteristic that matches the first traffic classification filter and the characteristic that matches the second traffic classification filter, the first policy enforcement action has a higher priority than the second policy enforcement action.

40. The network service plan provisioning system of claim 1, wherein process the first service plan component and the second service plan component to create a network provisioning instruction set in accordance with a prioritization of the first traffic classification filter over the second traffic classification filter comprises configure the one or more traffic inspection provisioning instructions so that when the network traffic inspection system determines that the traffic event possesses the characteristic that matches the first traffic classification filter and the characteristic that matches the second traffic classification filter, the network policy enforcement system applies the first policy enforcement action but does not apply the second policy enforcement action.

41. The network service plan provisioning system of claim 1, wherein process the first service plan component and the second service plan component to create a network provisioning instruction set in accordance with a prioritization of the first traffic classification filter over the second traffic classification filter comprises configure the one or more traffic inspection provisioning instructions so that when the network traffic inspection system determines that the traffic event possesses the characteristic that matches the first traffic classification filter and the characteristic that matches the second traffic classification filter, the network policy enforcement system applies the first policy enforcement action before applying the second policy enforcement action.

42. The network service plan provisioning system of claim 1, wherein the network policy enforcement system comprises a policy decision element.

43. The network service plan provisioning system of claim 1, wherein the network policy enforcement system or the network traffic inspection system comprises a gateway.

44. The network service plan provisioning system of claim 1, wherein at least a portion of the network policy enforcement system is on the wireless end-user device.

45. The network service plan provisioning system of claim 1, wherein at least a portion of the network policy enforcement system is in a network system communicatively coupled to the wireless end-user device over the wireless access network.

46. The network service plan provisioning system of claim 1, wherein the network traffic inspection system or the network policy enforcement system comprises a programmable element.

47. The network service plan provisioning system of claim 1, wherein the network policy enforcement system or the network traffic inspection system comprises a modem or an agent on the wireless end-user device.

48. The network service plan provisioning system of claim 1, wherein the network policy enforcement system comprises a charging element, a billing element, or a mediation element.

49. The network service plan provisioning system of claim 1, wherein the network policy enforcement system implements a charging function.

50. The network service plan provisioning system of claim 1, wherein the one or more policies comprise a charging policy.

51. The network service plan provisioning system of claim 50, wherein the charging policy is associated with a sponsor entity subsidizing a network service usage associated with the wireless end-user device.

52. The network service plan provisioning system of claim 50, wherein the charging policy is inherited from a service plan associated with the first service plan component and the second service plan component.

53. The network service plan provisioning system of claim 50, wherein the charging policy is based on an amount of usage, a time, an overage allowance, or a combination of these.

54. The network service plan provisioning system of claim 50, wherein the charging policy is associated with a rate or a charging code.

55. The network service plan provisioning system of claim 50, wherein the charging policy is associated with a cycle specified by a duration, a frequency, a usage amount, or a combination of these.

56. The network service plan provisioning system of claim 50, wherein the charging policy assists in implementing a pre-paid billing or a post-paid billing.

57. The network service plan provisioning system of claim 1, wherein the network policy enforcement system comprises a notification element.

58. The network service plan provisioning system of claim 1, wherein the network policy enforcement system implements a notification function.

59. The network service plan provisioning system of claim 58, wherein the one or more network elements are further configured to:

obtain notification information, the notification information at least assisting to specify or identify a notification content, a notification trigger, or a notification offer; and
determine at least a portion of the policy enforcement provisioning instructions based on the notification information.

60. The network service plan provisioning system of claim 1, wherein the one or more policies comprise a notification policy.

61. The network service plan provisioning system of claim 60, wherein the one or more policy enforcement provisioning instructions assist in causing a notification to be delivered to a subscriber or to the wireless end-user device.

62. The network service plan provisioning system of claim 61, wherein the notification comprises a selection option for providing feedback or instructions.

63. The network service plan provisioning system of claim 61, wherein the notification indicates that a usage of a service plan has reached a particular percentage of a limit, or that a requested network activity has been capped because a policy limit has been reached.

64. The network service plan provisioning system of claim 61, wherein the notification provides information about a service plan limit or an overage.

65. The network service plan provisioning system of claim 61, wherein the notification provides information about an offer.

66. The network service plan provisioning system of claim 65, wherein the offer is an offer to allow an overage, an offer for a new service plan, or an offer to block an ongoing usage.

67. The network service plan provisioning system of claim 61, wherein the notification provides information about a plan expiration.

68. The network service plan provisioning system of claim 61, wherein the notification provides information about an activity of the wireless end-user device that has been blocked, or an activity of the wireless end-user device that is not allowed.

69. The network service plan provisioning system of claim 61, wherein the notification provides a message or an offer based on a current activity or a status of the wireless end-user device.

70. The network service plan provisioning system of claim 69, wherein the current activity or the status of the wireless end-user device is based on the traffic event.

71. The network service plan provisioning system of claim 61, wherein the notification is an actionable notification enabling a user of the wireless end-user device to provide a response to the notification.

72. The network service plan provisioning system of claim 71, wherein the response comprises a directive to dismiss the notification, a directive to cancel the notification, an acknowledgment of the notification, a request for information, or a request to make a purchase.

73. The network service plan provisioning system of claim 61, wherein the one or more network elements are further configured to obtain, from a designer, information specifying the notification.

74. The network service plan provisioning system of claim 73, wherein the information specifying the notification specifies a title, a subtitle, text, an icon, a button, an action, whether to present the notification in a foreground, whether to present the notification in a background, or a combination of these.

75. The network service plan provisioning system of claim 1, wherein the one or more policies comprise a notification policy, and wherein the one or more network elements are further configured to obtain information specifying the notification policy from a designer.

76. The network service plan provisioning system of claim 75, wherein the information specifying the notification policy comprises a name, a description, a notification destination, an interaction associated with the notification, whether to present the notification in a foreground or in a background, a specification of selection options associated with the notification, or a combination of these.

77. The network service plan provisioning system of claim 76, wherein the notification destination is a subscriber or a server.

78. The network service plan provisioning system of claim 76, wherein the interaction associated with the notification comprises a number of times the notification is presented, an option enabling a user to suppress the notification, or a combination of these.

79. The network service plan provisioning system of claim 75, wherein the one or more network elements are further configured to present, through a user interface of the network service plan provisioning system, a representation of the notification for presentation on the wireless end-user device.

80. The network service plan provisioning system of claim 61, wherein the notification comprises an upsell offer.

81. The network service plan provisioning system of claim 80, wherein the upsell offer is based on a network state, a device state, or a subscriber state.

82. The network service plan provisioning system of claim 81, wherein the network state is based on a congestion level of the wireless access network, a number of failed attempts to authenticate on the wireless access network, a time of day, a location, a type of network, a roaming status, or a combination of these.

83. The network service plan provisioning system of claim 80, wherein the upsell offer is based on a current usage or an historical usage.

84. The network service plan provisioning system of claim 80, wherein the upsell offer provides an offer for a service at no cost to the subscriber.

85. The network service plan provisioning system of claim 61, wherein the notification comprises information about a purchase, a data usage, an application, an amount of data, a percentage, or a combination of these.

86. The network service plan provisioning system of claim 61, wherein the notification comprises information to assist a subscriber in activating the wireless end-user device, selecting a service plan for the wireless end-user device, setting a preference, or a combination of these.

87. The network service plan provisioning system of claim 1, wherein the one or more policies comprise a traffic control policy.

88. The network service plan provisioning system of claim 87, wherein the control policy specifies to allow, block, throttle, delay, or defer the traffic event.

89. The network service plan provisioning system of claim 87, wherein the traffic control policy is based on a network state, a device state, a service-plan-usage state, or a combination of these.

90. The network service plan provisioning system of claim 1, wherein the traffic event is associated with a particular destination, a particular application on the wireless end-user device, a content type, a protocol, a port, or an operating system of the wireless end-user device.

91. The network service plan provisioning system of claim 1, wherein the traffic event is associated with a specified remote destination, a specified application, a specified operating system, a specified content, a specified protocol, or a specified port number.

92. The network service plan provisioning system of claim 91, wherein the specified remote destination is identified by a domain or an Internet protocol (IP) address.

93. The network service plan provisioning system of claim 91, wherein the specified application is identified by a name, a hash, a certificate, or a signature.

94. The network service plan provisioning system of claim 1, wherein the first network policy enforcement action or the second network policy enforcement action comprises sending a notification to a notification destination.

95. The network service plan provisioning system of claim 1, wherein the first network policy enforcement action or the second network policy enforcement action comprises trapping a match at a kernel level.

96. The network service plan provisioning system of claim 1, wherein the first service plan component or the second service plan component comprises a carrier component, a network protection component, an application component, a sponsored component, a subscriber-paid component, a marketing interceptor component, a parental control component, a bulk component, a post-bulk component, or an end-of-life component.

97. The network service plan provisioning system of claim 1, wherein the one or more network elements are further configured to obtain, through a user interface of the network service plan provisioning system, a hierarchical arrangement of the first service plan component and the second service plan component, the hierarchical arrangement specifying whether the first service plan component has a higher priority than the second service plan component.

98. The network service plan provisioning system of claim 1, wherein the first service plan component or the second service plan component is associated with a service class.

99. The network service plan provisioning system of claim 98, wherein the service class is paid, marketing intercept, carrier, network protection, sponsored, parental control, open access, bulk, post-bulk, or a combination of these.

100. The network service plan provisioning system of claim 1, wherein the first service plan component is associated with a first service class, and the second service plan component is associated with a second service class, and wherein the one or more network elements are further configured to obtain, through a user interface of the network service plan provisioning system, a specification of whether the first service class has a higher priority than the second service class.

101. The network service plan provisioning system of claim 1, wherein the one or more network elements are further configured to obtain, from a designer, information identifying the wireless end-user device.

102. The network service plan provisioning system of claim 101, wherein the information identifying the wireless end-user device comprises an international mobile subscriber identity (IMSI), a phone number, a device type, an international mobile equipment identity (IMEI), a device name, a subscriber group, an owner name, a locale, an operating system version, subscriber information, or a combination of these.

103. The network service plan provisioning system of claim 1, wherein the wireless end-user device is a first wireless end-user device, and wherein the one or more network elements are further configured to obtain, from a designer, information identifying a plurality of wireless end-user devices, the plurality of wireless end-user devices including the first wireless end-user device.

104. The network service plan provisioning system of claim 103, wherein each wireless end-user device in the plurality of wireless end-user devices is a particular type of device, has a particular device characteristic, or is associated with a particular demographic characteristic.

105. The network service plan provisioning system of claim 1, wherein the one or more network elements are configured to obtain the information specifying the first traffic classification filter or the information specifying the second traffic classification filter from a designer.

106. The network service plan provisioning system of claim 1, wherein the one or more network elements are configured to obtain at least a portion of the first service plan component and at least a portion of the second service plan component from a designer.

107. The network service plan provisioning system of claim 106, wherein the designer is associated with a role.

108. The network service plan provisioning system of claim 107, wherein the role establishes one or more network service plan provisioning system capabilities available to the designer.

109. The network service plan provisioning system of claim 106, wherein the designer is associated with a carrier, an enterprise, an application developer, or a mobile virtual network operator.

110. The network service plan provisioning system of claim 1, wherein the first service plan component and the second service plan component are associated with a service plan, and wherein the one or more network elements are further configured to obtain, from a designer, information about the service plan.

111. The network service plan provisioning system of claim 110, wherein the information about the service plan comprises an icon, a name, a description, a version, a type, whether the service plan is a default plan, whether a user of the wireless end-user device is able to repurchase the service plan, a price, a charging policy, a billing policy, a charging code, or a combination of these.

112. The network service plan provisioning system of claim 1, wherein the information specifying the first traffic classification filter or the information specifying the second traffic classification filter comprises a name, a description, a filtering parameter, a launch mechanism, or a combination of these.

113. The network service plan provisioning system of claim 112, wherein the filter parameter specifies filtering the traffic event by destination, by application, by operating system, by protocol, or by port.

114. The network service plan provisioning system of claim 1, wherein the one or more network elements are further configured to assist a designer in customizing a branding for presentation through a user interface of the wireless end-user device.

115. The network service plan provisioning system of claim 1, wherein the one or more network elements are further configured to provide access to a service design sandbox.

116. The network service plan provisioning system of claim 115, wherein the service design sandbox provides for policy definition for a subset of subscribers of the network service plan provisioning system.

117. The network service plan provisioning system of claim 115, wherein the service design sandbox is available to an enterprise, a mobile virtual network operator (MVNO), or an application developer.

118. The network service plan provisioning system of claim 115, wherein the service design sandbox provides for definition of a subscriber group, a service plan, a notification, the first service plan component, the second service plan component, a service activity, a report, or a combination of these.

119. The network service plan provisioning system of claim 115, wherein the one or more network elements are further configured to provide access to a service design sandbox through a secure login environment.

120. The network service plan provisioning system of claim 1, wherein the one or more policies comprise a policy associated with a tethering function.

121. The network service plan provisioning system of claim 1, wherein the one or more policies comprise a policy associated with a web page, a domain, an application, a roaming network, an e-mail service, a networking service, a music download service, a video game service, a multimedia service, or a combination of these.

* * * * *

UNITED STATES PATENT AND TRADEMARK OFFICE
CERTIFICATE OF CORRECTION

PATENT NO. : 8,924,543 B2
APPLICATION NO. : 13/248025
DATED : December 30, 2014
INVENTOR(S) : Raleigh et al.

Page 1 of 1

It is certified that error appears in the above-identified patent and that said Letters Patent is hereby corrected as shown below:

In the claims

In column 60, line 59, (the fourth line of claim 12) the word --a-- should be inserted after "consisting of:"

Signed and Sealed this
Fourteenth Day of June, 2016

Michelle K. Lee
*Director of the United States Patent and Trademark Office*